(12) United States Patent
Tanaka et al.

(10) Patent No.: US 8,254,215 B1
(45) Date of Patent: Aug. 28, 2012

(54) THERMALLY-ASSISTED MAGNETIC RECORDING HEAD

(75) Inventors: Kosuke Tanaka, Tokyo (JP); Susumu Aoki, Tokyo (JP); Kei Hirata, Tokyo (JP); Makoto Isogai, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/282,943

(22) Filed: Oct. 27, 2011

(51) Int. Cl.
*G11B 11/00* (2006.01)

(52) U.S. Cl. .................. 369/13.33; 369/112.27

(58) Field of Classification Search ............... 369/13.33, 369/13.32, 13.24, 13.14, 13.03, 13.02, 13.12, 369/112.27, 112.09, 112.14; 360/59, 125.31, 360/125.74

See application file for complete search history.

(56) References Cited

U.S. PATENT DOCUMENTS

| | | | |
|---|---|---|---|
| 8,045,422 B2 * | 10/2011 | Komura et al. | 369/13.33 |
| 8,149,653 B2 * | 4/2012 | Shimazawa et al. | 369/13.33 |
| 2010/0172220 A1 | 7/2010 | Komura et al. | |

OTHER PUBLICATIONS

U.S. Appl. No. 13/297,375, filed Nov. 16, 2011 in the name of Komura et al.

* cited by examiner

*Primary Examiner* — Ali Neyzari
(74) *Attorney, Agent, or Firm* — Oliff & Berridge, PLC

(57) ABSTRACT

A thermally-assisted magnetic recording head includes a main pole, a waveguide, and a plasmon generator. The main pole has a front end face including first and second ends that are opposite in a track width direction. An arbitrary cross section of the main pole that passes through an arbitrary point on the front end face and is perpendicular to a medium facing surface and to the track width direction has a length in a direction perpendicular to the medium facing surface. When the arbitrary point on the front end face is located at a center of the front end face in the track width direction, the length of the arbitrary cross section is smaller than that when the arbitrary point is located at the first end and that when the arbitrary point is located at the second end.

11 Claims, 34 Drawing Sheets

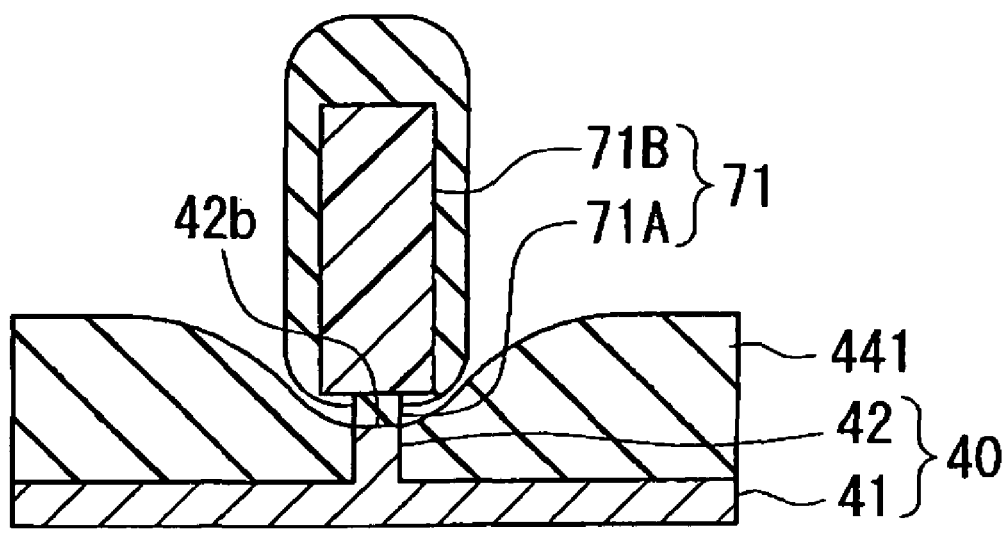
FIG. 14
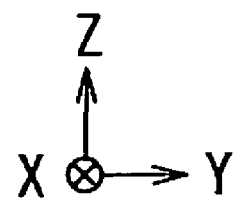
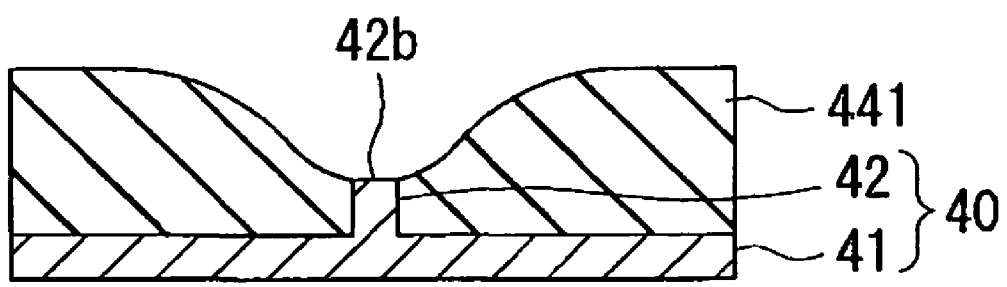
FIG. 15
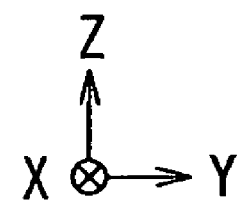

THERMALLY-ASSISTED MAGNETIC RECORDING HEAD

BACKGROUND OF THE INVENTION

1. Field of the Invention

The present invention relates to a thermally-assisted magnetic recording head for use in thermally-assisted magnetic recording where a magnetic recording medium is irradiated with near-field light to lower the coercivity of the magnetic recording medium for data writing.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the magnetic recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near field light from plasmons excited by irradiation with laser light. The laser light to be used for generating the near-field light is typically guided through a waveguide, which is provided in the slider, to the plasmon generator disposed near a medium facing surface of the slider.

U.S. Patent Application Publication No. 2010/0172220 A1 discloses a technology for coupling the light that propagates through the waveguide with the plasmon generator in surface plasmon mode via a buffer part, thereby exciting surface plasmons on the plasmon generator.

For a thermally-assisted magnetic recording head having the aforementioned waveguide and plasmon generator and a main pole for producing a write magnetic field, it is required that the main pole, a part of the core of the wave guide, and the plasmon generator be disposed in a very small region in the vicinity of the medium facing surface.

To meet the aforementioned requirement, the thermally-assisted magnetic recording head may be configured such that the plasmon generator and the core are disposed to align in the direction of travel of the magnetic recording medium, the core has an end face that faces toward the medium facing surface and that is located away from the medium facing surface, and the main pole is interposed between the end face of the core and the medium facing surface. In this configuration, the main pole may be in the shape of a rectangular solid. The main pole in this case has a rectangular front end face, which is the end face located in the medium facing surface.

To employ the aforementioned configuration, it is further required that the light propagating through the core be efficiently transformed into near-field light. To this end, it is preferred that the end face of the core facing toward the medium facing surface be as close to the medium facing surface as possible in order to allow the plasmon generator to excite surface plasmons at the nearest possible point to the medium facing surface. As the end face of the core is brought closer to the medium facing surface, the main pole decreases in length in a direction perpendicular to the medium facing surface. In this case, it is preferable to increase the width of the main pole in the track width direction to some extent so that the magnetic flux in the main pole will not be saturated at a small amount.

However, when the above configuration was employed and the width of the main pole in the track width direction was increased to some extent, the following problem was found to occur. A write magnetic field is a magnetic field leaking from the front end face of the main pole toward a recording medium. One of the known general properties of the main pole is that, when the main pole has an edge, the magnetic field leaking from the main pole tends to be strong in the vicinity of the edge. Therefore, when the width of the main pole in the track width direction is increased to some extent, magnetic fields that are generated from the vicinities of opposite track-widthwise ends of the front end face of the main pole are strong whereas a magnetic field that is generated from the vicinity of the track-widthwise center of the front end face of the main pole is weak. In this case, when an attempt is made to generate a write magnetic field of sufficient magnitude, the magnetic fields generated from the vicinities of opposite track-widthwise ends of the front end face of the main pole become excessively strong, and the excessively strong magnetic fields may cause a phenomenon that, when a signal is being written on a certain track, signals stored on one or more tracks adjacent to the track targeted for writing are erased or attenuated (this phenomenon will hereinafter be referred to as adjacent track erasure). To achieve higher recording densities, it is required to prevent the occurrence of adjacent track erasure.

OBJECT AND SUMMARY OF THE INVENTION

It is an object of the present invention to provide a thermally-assisted magnetic recording head configured so that a plasmon generator and the core of a waveguide are disposed to align in the direction of travel of a magnetic recording medium with a main pole interposed between the medium facing surface and an end face of the core facing toward the medium facing surface, the thermally-assisted magnetic recording head being capable of enhancing a magnetic field that is generated from the vicinity of the track widthwise center of the front end face of the main pole located in the medium facing surface, while preventing the occurrence of adjacent track erasure, and to provide a head gimbal assembly and a magnetic recording device that each include the thermally-assisted magnetic recording head.

A thermally-assisted magnetic recording head of the present invention includes: a medium facing surface that faces a magnetic recording medium; a main pole that has a front end face located in the medium facing surface and produces a write magnetic field for writing data on the magnetic recording medium; a waveguide including a core and a cladding, the core allowing light to propagate therethrough; and a plasmon generator having a near-field light generating part located in the medium facing surface, the plasmon generator being configured so that a surface plasmon is excited on the plasmon generator based on the light propagating through the core and the near-field light generating part generates near-field light based on the surface plasmon.

The plasmon generator and the core are disposed to align in the direction of travel of the magnetic recording medium. The core has an end face that faces toward the medium facing surface and that is located away from the medium facing surface. The main pole is interposed between the end face of the core and the medium facing surface.

The front end face of the main pole includes a first end and a second end that are opposite to each other in a track width direction which is a direction parallel to the medium facing surface and perpendicular to the direction of travel of the magnetic recording medium. In a region sandwiched between a first virtual plane passing through the first end and perpendicular to the medium facing surface and to the track width direction and a second virtual plane passing through the second end and perpendicular to the medium facing surface and to the track width direction, an arbitrary cross section of the main pole that passes through an arbitrary point on the front end face and is perpendicular to the medium facing surface and to the track width direction has a length in a direction perpendicular to the medium facing surface.

A third length is smaller than a first length and a second length and is a minimum of the length of the arbitrary cross section obtained with the arbitrary point on the front end face varied, where the first length is the length of the arbitrary cross section when the arbitrary point is located at the first end, the second length is the length of the arbitrary cross section when the arbitrary point is located at the second end, and the third length is the length of the arbitrary cross section when the arbitrary point is located at a center of the front end face in the track width direction.

According to the thermally-assisted magnetic recording head of the present invention, the main pole of the above-described shape allows the magnetic flux in the main pole to be more easily saturated in the vicinity of the track-widthwise center of the front end face than in the case where the main pole is rectangular-solid shaped. This makes it possible to enhance the magnetic field generated from the vicinity of the track widthwise center of the front end face without causing the enhancement of the magnetic fields generated from the vicinities of the first and second ends of the front end face.

In the thermally-assisted magnetic recording head of the present invention, the main pole may include two portions located on opposite sides of the center of the front end face in the track width direction. In the two portions, the length of the aforementioned arbitrary cross section increases with increasing distance between the arbitrary point on the front end face and the center of the front end face in the track width direction. In this case, the two portions may be in contact with each other at the center of the front end face in the track width direction. The length of the arbitrary cross section may increase as the arbitrary point on the front end face shifts toward the first end from the center of the front end face in the track width direction, and may increase as the arbitrary point on the front end face shifts toward the second end from the center of the front end face in the track width direction.

In the thermally-assisted magnetic recording head of the present invention, the main pole and the plasmon generator may be disposed such that a virtual straight line passing through the center of the front end face in the track width direction and parallel to the direction of travel of the magnetic recording medium passes through the near-field light generating part.

In the thermally-assisted magnetic recording head of the present invention, in the region sandwiched between the first virtual plane and the second virtual plane, the distance between the medium facing surface and an arbitrary point on the end face of the core may vary as the arbitrary point on the end face of the core shifts along the track width direction. In this case, the main pole may further have a rear end face that is opposite to the front end face and has a shape defined by the end face of the core.

In the thermally-assisted magnetic recording head of the present invention, the front end face may have a length of 60 nm or more in the track width direction.

In the thermally-assisted magnetic recording head of the present invention, the first length and the second length may be equal. In this case, the third length is preferably 30% or more and less than 100% of the first and second lengths, more preferably 30% or more and no more than 75% of the first and second lengths, and still more preferably 37.5% or more and no more than 50% of the first and second lengths.

A head gimbal assembly of the present invention includes the thermally-assisted magnetic recording head of the present invention, and a suspension that supports the thermally-assisted magnetic recording head. A magnetic recording device of the present invention includes a magnetic recording medium, the thermally-assisted magnetic recording head of the present invention, and a positioning device that supports the thermally-assisted magnetic recording head and positions the same with respect to the magnetic recording medium.

In the thermally-assisted magnetic recording head, the head gimbal assembly, and the magnetic recording device of the present invention, the magnetic flux in the main pole is more easily saturated in the vicinity of the track-widthwise center of the front end face than in the case where the main pole is rectangular-solid shaped, as described above. This makes it possible to enhance the magnetic field generated from the vicinity of the track-widthwise center of the front end face without causing the enhancement of the magnetic fields generated from the vicinities of the first and second ends of the front end face. Consequently, according to the present invention, it is possible to enhance the magnetic field generated from the vicinity of the track-widthwise center of the front end face of the main pole while preventing the occurrence of adjacent track erasure.

Other and further objects, features and advantages of the present invention will appear more fully from the following description.

BRIEF DESCRIPTION OF THE DRAWINGS

FIG. 14 is a cross-sectional view showing a step that follows the step shown in FIG. 13.

FIG. 15 is a cross-sectional view showing a step that follows the step shown in FIG. 14.

DETAILED DESCRIPTION OF THE PREFERRED EMBODIMENTS

First Embodiment

Figure 6:
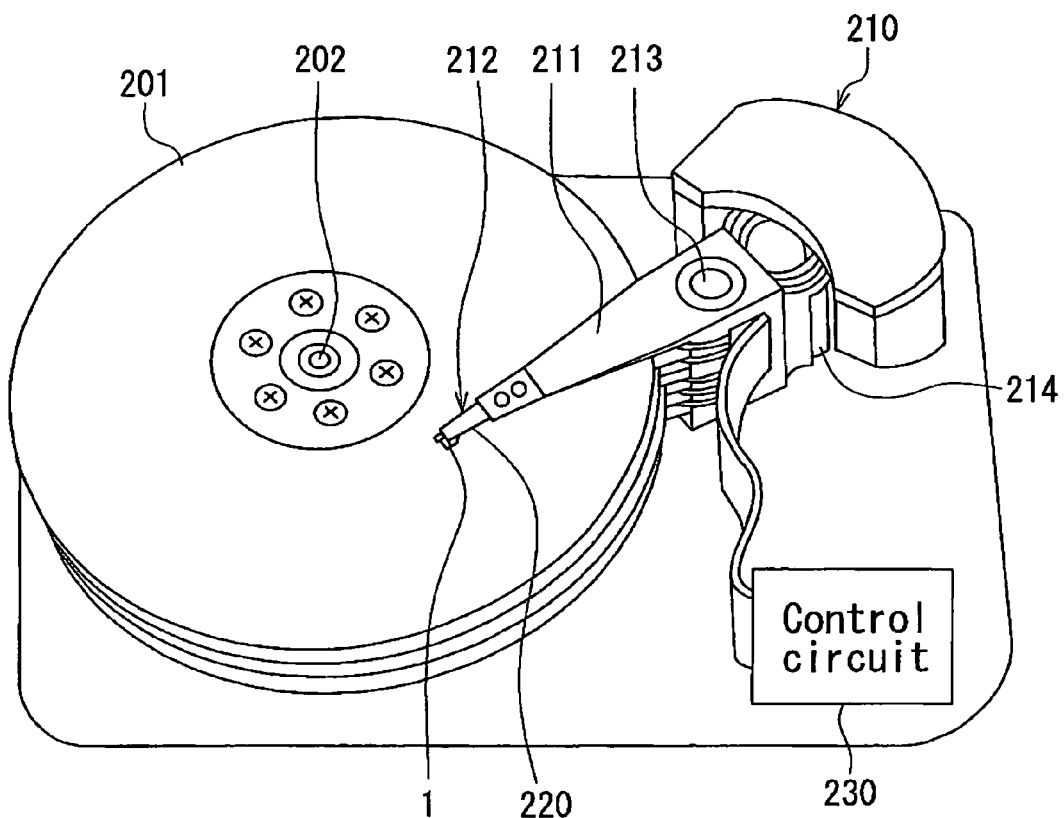
FIG. 6 is a perspective view showing a magnetic recording device according to the first embodiment of the invention.

Preferred embodiments of the present invention will now be described in detail with reference to the drawings. First, reference is made to FIG. 6 to describe a magnetic disk drive that functions as a magnetic recording device according to a first embodiment of the invention. As shown in FIG. 6, the magnetic disk drive includes a plurality of magnetic disks 201 as a plurality of magnetic recording media, and a spindle motor 202 for rotating the magnetic disks 201. The magnetic disks 201 of the present embodiment are for use in perpendicular magnetic recording. Each magnetic disk 201 has such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the present embodiment, and a suspension 220 that supports the thermally-assisted magnetic recording head 1.

The assembly carriage device 210 is a device for positioning each thermally-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 7:
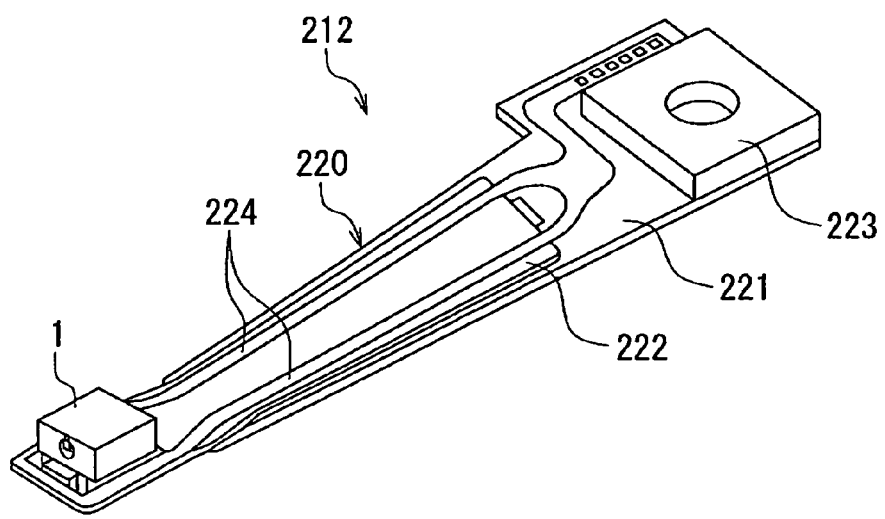
FIG. 7 is a perspective view showing a head gimbal assembly according to the first embodiment of the invention.

FIG. 7 is a perspective view showing the head gimbal assembly 212 of FIG. 6. As described above, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to one having the configuration shown in FIG. 7. For example, the head gimbal assembly of the present invention may have an IC chip for driving the head that is mounted somewhere along the suspension 220.

Figure 8:
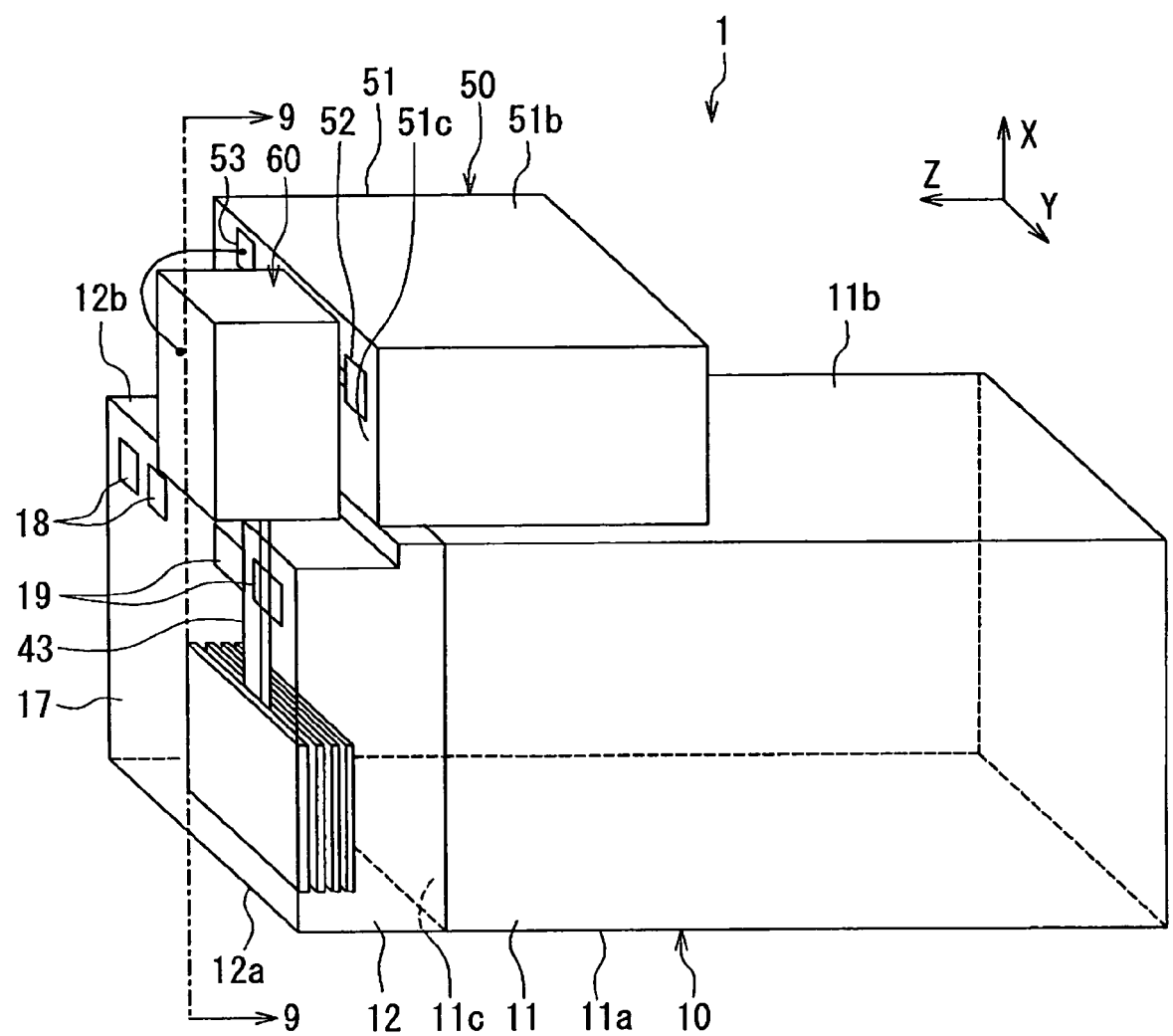
FIG. 8 is a perspective view showing the thermally-assisted magnetic recording head according to the first embodiment of the invention.
Figure 9:
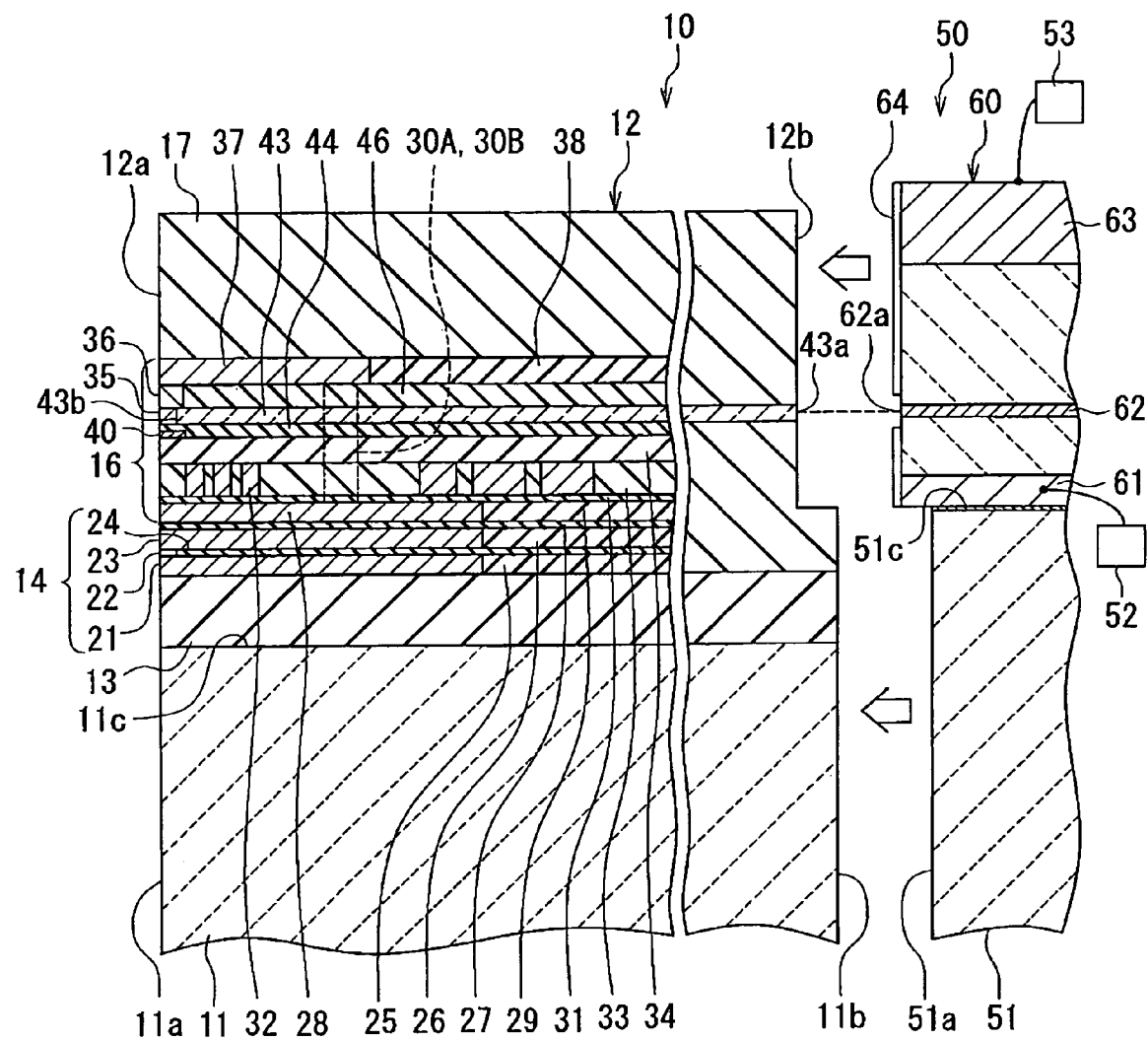
FIG. 9 shows a cross section taken along line 9-9 of FIG. 8.

The configuration of the thermally-assisted magnetic recording head 1 according to the present embodiment will now be described with reference to FIG. 8 and FIG. 9. FIG. 8 is a perspective view showing the thermally-assisted magnetic recording head 1. FIG. 9 shows a cross section taken along line 9-9 of FIG. 8. The thermally-assisted magnetic recording head 1 includes a slider 10 and a light source unit 50. FIG. 9 shows a state where the slider 10 and the light source unit 50 are separated from each other.

The slider 10 includes a slider substrate 11 and a head section 12. The slider substrate 11 is in the shape of a rectangular solid and is made of a ceramic material such as aluminum oxide-titanium carbide ($Al_2O_3$—TiC).

The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head section 12 is disposed on the element-forming surface 11c. The medium facing surface 11a is processed so as to obtain an appropriate flying height of the slider 10 from the magnetic disk 201. The head section 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head section 12 are concerned, with respect to a reference position, a position located in a direction that extends perpendicular to the element-forming surface 11c and away from the element-forming surface 11c is defined as "above", and a position located in a direction opposite to the aforementioned direction is defined as "below". Where the layers included in the head section 12 are concerned, the surface closer to the element-forming surface 11c is defined as a "bottom surface," and the surface farther from the element-forming surface 11c as a "top surface."

Moreover, X direction, Y direction, Z direction, −X direction, −Y direction, and −Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 9. The Z direction is a direction that extends perpendicular to the element-forming surface 11c and away from the element-forming surface 11c. The −X direction, the −Y direction, and the −Z direction are opposite to the X direction, the Y direction, and the Z direction, respectively. As viewed from the slider 10, the magnetic disk 201 travels in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is a direction parallel to the Y direction, and is parallel to the medium facing surface 12a and perpendicular to the direction of travel of the magnetic disk 201.

The light source unit 50 includes a laser diode 60 serving as a light source for emitting laser light, and a support member 51 that is in the shape of a rectangular solid and supports the laser diode 60. The support member 51 is made of, for example, a ceramic material such as aluminum oxide-titanium carbide ($Al_2O_3$—TiC). The support member 51 has a bond surface 51a, a rear surface 51b opposite to the bond surface 51a, and four surfaces connecting the bond surface 51a to the rear surface 51b. One of the four surfaces connecting the bond surface 51a to the rear surface 51b is a light source mount surface 51c. The bond surface 51a is the surface to be bonded to the rear surface 11b of the slider substrate 11. The light source mount surface 51c is perpendicular to the bond surface 51a and parallel to the element-forming surface 11c. The laser diode 60 is mounted on the light source mount surface 51c. The support member 51 may function as a heat sink for dissipating heat generated by the laser diode 60, as well as serving to support the laser diode 60.

As shown in FIG. 9, the head section 12 includes an insulating layer 13 disposed on the element-forming surface 11c, and also includes a read head section 14, a write head section 16, and a protective layer 17 that are stacked in this order on the insulating layer 13. The insulating layer 13 and the protective layer 17 are each made of an insulating material such as $Al_2O_3$ (hereinafter, also referred to as alumina).

The read head section 14 includes: a bottom shield layer 21 disposed on the insulating layer 13; an MR element 22 disposed on the bottom shield layer 21; a top shield layer 23 disposed on the MR element 22; an insulating layer 24 disposed between the bottom shield layer 21 and the top shield layer 23 and surrounding the MR element 22; an insulating layer 25 disposed around the bottom shield layer 21; and an insulating layer 26 disposed around the top shield layer 23. The bottom shield layer 21 and the top shield layer 23 are each made of a soft magnetic material. The insulating layers 24 to 26 are each made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. If the MR element 22 is a TMR element or a CPP-type GMR element, the bottom shield layer 21 and the top shield layer 23 may also serve as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head section 12 further includes an insulating layer 27 disposed over the top shield layer 23 and the insulating layer 26. The insulating layer 27 is made of an insulating material such as alumina.

The write head section 16 is for use in perpendicular magnetic recording. The write head section 16 includes a return yoke layer 28 disposed on the insulating layer 27, and an insulating layer 29 disposed on the insulating layer 27 and surrounding the return yoke layer 28. The return yoke layer 28 is made of a soft magnetic material. The return yoke layer 28 has an end face located in the medium facing surface 12a. The top surfaces of the return yoke layer 28 and the insulating layer 29 are even with each other.

The write head section 16 further includes: two coupling portions 30A and 30B located away from the medium facing surface 12a and disposed on part of the return yoke layer 28; an insulating layer 31 disposed over another part of the return yoke layer 28 and the insulating layer 29; and a coil 32 disposed on the insulating layer 31. The coupling portions 30A and 30B are made of a soft magnetic material. Each of the coupling portions 30A and 30B includes a first layer disposed on the return yoke layer 28, and a second and a third layer stacked in this order on the first layer. The first layer of the coupling portion 30A and the first layer of the coupling portion 30B are arranged to align in the track width direction TW. The coil 32 is planar spiral-shaped and wound around the first layers of the coupling portions 30A and 30B. The coil 32 produces a magnetic field corresponding to data to be written on the magnetic disk 201. The coil 32 is made of a conductive material such as copper.

The write head section 16 further includes an insulating layer 33 disposed around the coil 32 and in the space between every adjacent turns of the coil 32, and an insulating layer 34 disposed over the coil 32 and the insulating layer 33. The first layers of the coupling portions 30A and 30B are embedded in the insulating layers 31 and 33. The second layers of the coupling portions 30A and 30B are embedded in the insulating layer 34.

The write head section 16 further includes a plasmon generator 40 disposed on the insulating layer 34 in the vicinity of the medium facing surface 12a. The plasmon generator 40 is made of a conductive material such as a metal. For example, the plasmon generator 40 may be made of one element selected from the group consisting of Au, Ag, Cu, and Al, or of an alloy composed of two or more of these elements. The plasmon generator 40 will be described in more detail later.

The write head section 16 further includes a main pole 35 disposed above the plasmon generator 40, and a coupling layer 36 disposed on the main pole 35. Each of the main pole 35 and the coupling layer 36 has a front end face located in the medium facing surface 12a, a rear end face opposite to the front end face, a bottom surface, a top surface, and two side surfaces. The bottom surface of the coupling layer 36 is in contact with the top surface of the main pole 35. The main pole 35 is made of a soft magnetic material, or a magnetic metal material in particular. The coupling layer 36 is made of a soft magnetic material. The main pole 35 will be described in more detail later.

The write head section 16 further includes a waveguide including a core 43 and a cladding. The core 43 extends in the direction perpendicular to the medium facing surface 12a (the X direction). The core 43 has an incidence end 43a and an end face 43b. The end face 43b faces toward the medium facing surface 12a and is located away from the medium facing surface 12a. The core 43 propagates laser light that is emitted from the laser diode 60 and incident on the incidence end 43a. The plasmon generator 40 and the core 43 are disposed to align in the direction of travel of the magnetic disk 201 (the Z direction). The main pole 35 is interposed between the end face 43b of the core 43 and the medium facing surface 12a.

Figure 3:
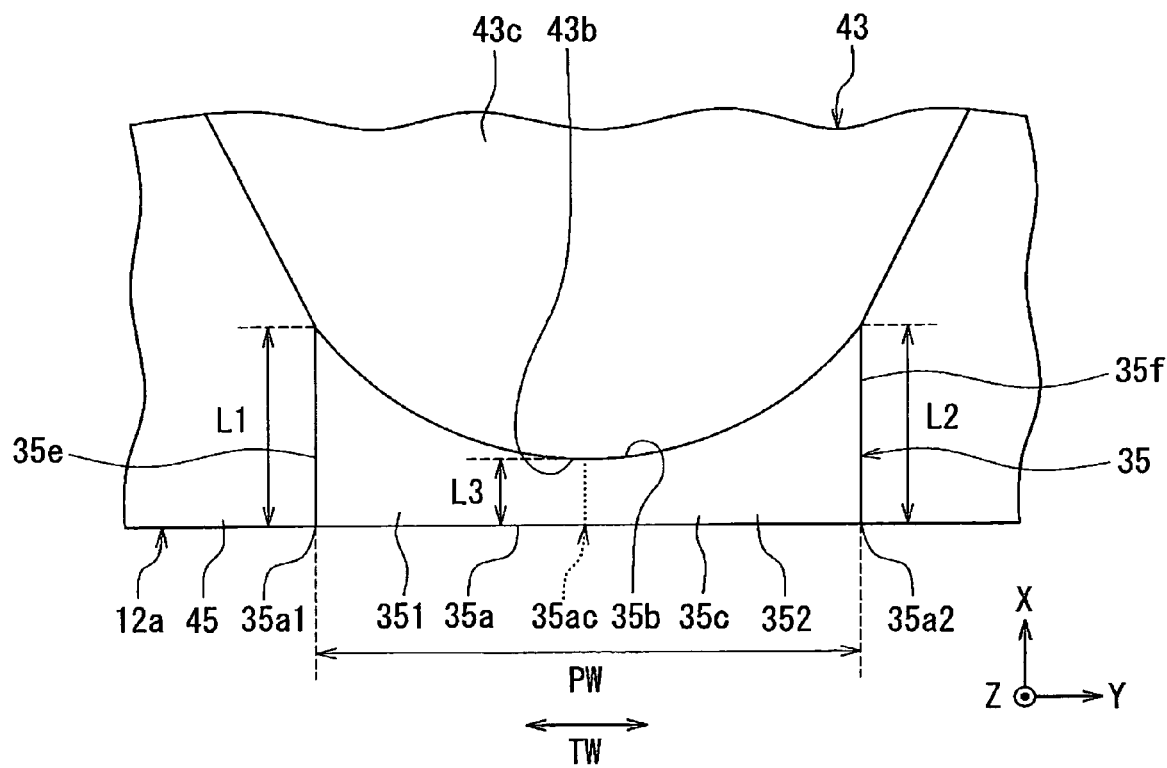
FIG. 3 is a plan view showing the top surfaces of a main pole and a core of a waveguide of the first embodiment.

The cladding includes cladding layers 44, 45, and 46. The cladding layer 44 is disposed on the insulating layer 34 to cover the plasmon generator 40. The main pole 35 and the core 43 are disposed on the cladding layer 44. The cladding layer 45 is disposed on the cladding layer 44 and surrounds the main pole 35 and the core 43. The cladding layer 45 is not shown in FIG. 9 but is shown in FIG. 3, which will be described later. The cladding layer 46 is disposed over the core 43 and the cladding layer 45 and surrounds the coupling layer 36.

The core 43 is made of a dielectric material that transmits the laser light. Each of the cladding layers 44, 45 and 46 is made of a dielectric material and has a refractive index lower than that of the core 43. For example, if the laser light has a wavelength of 600 nm and the core 43 is made of $Al_2O_3$ (refractive index n=1.63), the cladding layers 44, 45 and 46 may be made of $SiO_2$ (refractive index n=1.46). If the core 43 is made of tantalum oxide such as $Ta_2O_5$ (n=2.16), the cladding layers 44, 45 and 46 may be made of $SiO_2$ (n=1.46) or $Al_2O_3$ (n=1.63). The core 43 will be described in more detail later.

The third layers of the coupling portions 30A and 30B are embedded in the cladding layers 44, 45, and 46. The third layer of the coupling portion 30A and the third layer of the coupling portion 30B are located on opposite sides of the core 43 in the track width direction TW, each being spaced from the core 43.

The write head section 16 further includes a yoke layer 37 and an insulating layer 38. The yoke layer 37 is disposed over the coupling portions 30A and 30B, the coupling layer 36 and the cladding layer 46. The yoke layer 37 is in contact with the top surface of the coupling layer 36 at a position near the medium facing surface 12a, and in contact with the top surfaces of the coupling portions 30A and 30B at a position away from the medium facing surface 12a. The insulating layer 38 is disposed on the cladding layer 46 and surrounds the yoke layer 37. The yoke layer 37 is made of a soft magnetic material.

In the write head section 16, a magnetic path for passing a magnetic flux corresponding to the magnetic field produced by the coil 32 is formed by the return yoke layer 28, the coupling portions 30A and 30B, the yoke layer 37, the coupling layer 36, and the main pole 35. The main pole 35 has the front end face located in the medium facing surface 12a. The main pole 35 allows the magnetic flux corresponding to the magnetic field produced by the coil 32 to pass, and produces a write magnetic field for writing data on the magnetic disk 201.

As shown in FIG. 9, the protective layer 17 is disposed to cover the write head section 16. As shown in FIG. 8, the head section 12 further includes a pair of terminals 18 that are disposed on the top surface of the protective layer 17 and electrically connected to the MR element 22, and another pair of terminals 19 that are disposed on the top surface of the protective layer 17 and electrically connected to the coil 32. These terminals 18 and 19 are electrically connected to the plurality of pad-shaped terminals of the wiring member 224 shown in FIG. 7.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quarternary mixed crystal laser diode having an emittable wavelength range of 1.2 to 1.67 μm, for example.

As shown in FIG. 9, the laser diode 60 has a multilayer structure including a lower electrode 61, an active layer 62, and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a.

The light source unit 50 further includes a terminal 52 disposed on the light source mount surface 51c and electrically connected to the lower electrode 61, and a terminal 53 disposed on the light source mount surface 51c and electrically connected to the upper electrode 63. These terminals 52 and 53 are electrically connected to the plurality of pad-shaped terminals of the wiring member 224 shown in FIG. 7. When a predetermined voltage is applied to the laser diode 60 through the terminals 52 and 53, laser light is emitted from the emission center 62a of the laser diode 60. The laser light emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 5 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is secured to the slider 10 by bonding the bond surface 51a of the support member 51 to the rear surface 11b of the slider substrate 11, as shown in FIG. 9. The laser diode 60 and the core 43 are positioned with respect to each other so that the laser light emitted from the laser diode 60 will be incident on the incidence end 43a of the core 43.

Figure 1:
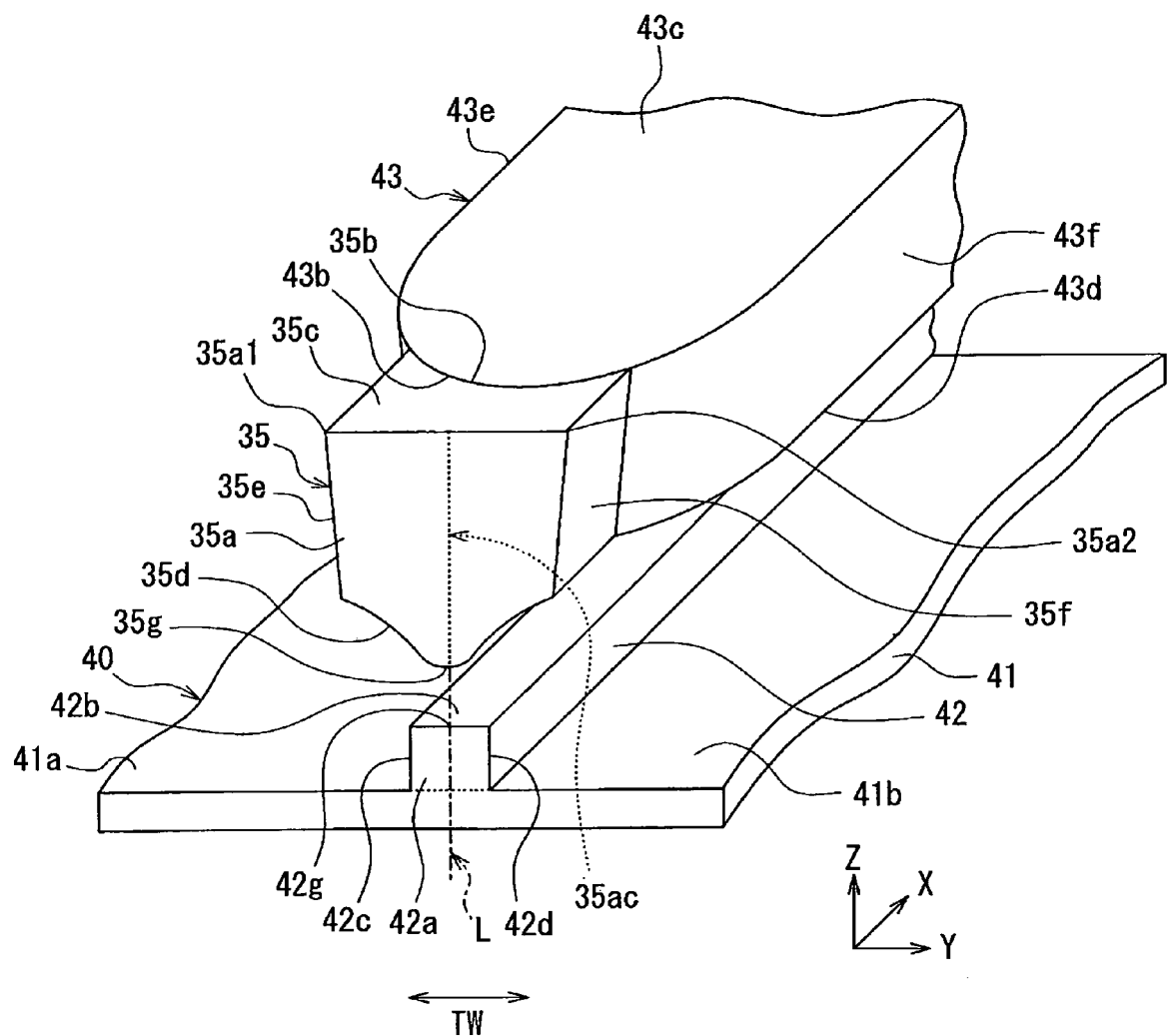
FIG. 1 is a perspective view showing the main part of a thermally-assisted magnetic recording head according to a first embodiment of the invention.
Figure 2:
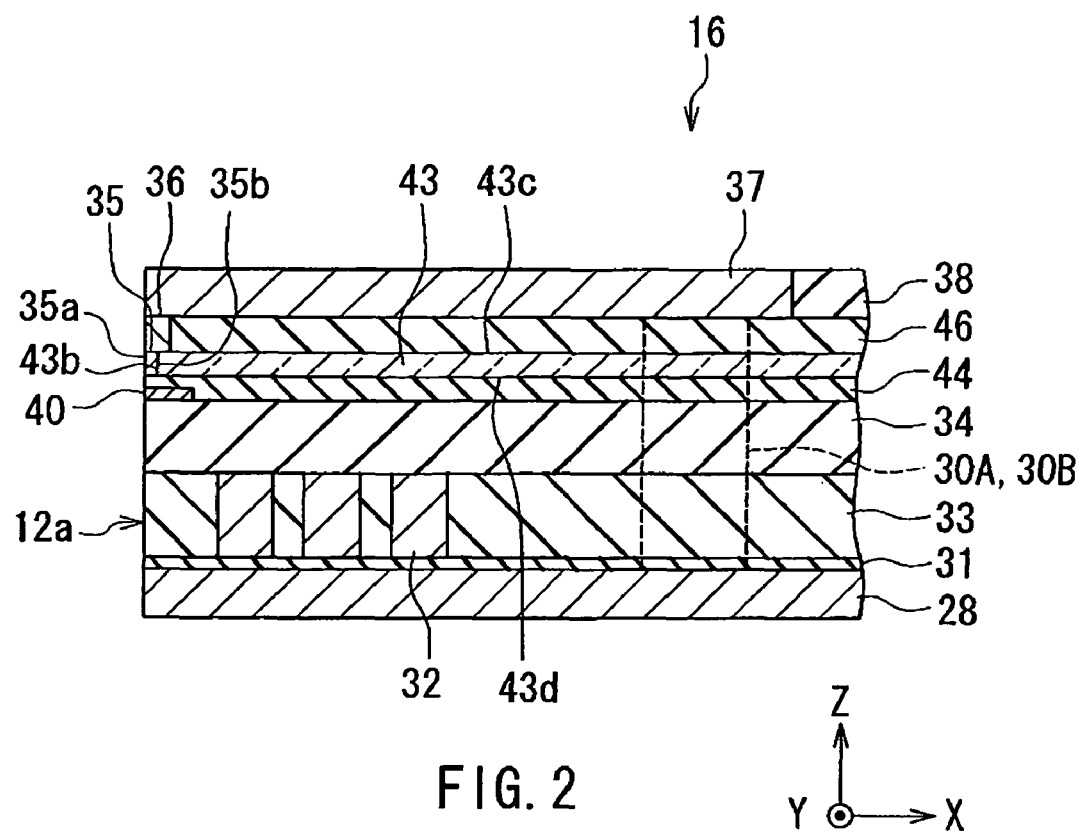
FIG. 2 is a cross-sectional view showing a write head section of the thermally-assisted magnetic recording head according to the first embodiment of the invention.

Reference is now made to FIG. 1 to FIG. 3 to describe the main pole 35, the plasmon generator 40, and the core 43 in detail. FIG. 1 is a perspective view showing the main part of the thermally-assisted magnetic recording head 1. FIG. 2 is a cross-sectional view showing the write head section 16. Note that FIG. 2 shows a cross section perpendicular to the element-forming surface 11c (see FIG. 9) and the medium facing surface 12a. FIG. 3 is a plan view showing the top surfaces of the main pole 35 and the core 43.

The plasmon generator 40 will be described first. The plasmon generator 40 includes a base part 41, and a protruding part 42 that protrudes upward (in the Z direction) from a central portion of the base part 41 including the center of the base part 41 in the track width direction TW. The base part 41 is shaped like a flat plate, for example. In FIG. 1, the boundary between the base part 41 and the protruding part 42 is shown by a dotted line.

The protruding part 42 has: a front end face 42a located at an end in the direction perpendicular to the medium facing surface 12a; a flat surface 42b shaped like a band, the flat surface 42b facing upward, being parallel to the element-forming surface 11c and being elongated in the direction perpendicular to the medium facing surface 12a; and two side surfaces 42c and 42d. In the example shown in FIG. 1, the side surfaces 42c and 42d are perpendicular to the element-forming surface 11c. The side surfaces 42c and 42d may be inclined with respect to the direction perpendicular to the element-forming surface 11c.

The front end face 42a of the protruding part 42 includes a near-field light generating part 42g that generates near-field light. More specifically, the near-field light generating part 42g is an end of the front end face 42a intersecting the flat surface 42b, or refers to this end and a part therearound.

The base part 41 has two base surfaces 41a and 41b that face upward and are located on opposite sides of the protruding part 42 in the track width direction TW. The difference in level between the flat surface 42b and each of the base surfaces 41a and 41b in the direction perpendicular to the element-forming surface 11c (the Z direction) falls within the range of 20 to 60 nm, for example. The flat surface 42b has a width in the track width direction TW (the Y direction) of, for example, 5 to 50 nm.

The base part 41 has a dimension in the X direction (length) of, for example, 0.8 to 2.0 μm. In the present embodiment, the protruding part 42 has a dimension in the X direction (length) equal to that of the base part 41. The base part 41 has a dimension in the Y direction (width) of, for example, 0.3 to 30 μM. The base part 41 has a dimension in the Z direction (thickness) of, for example, 0 to 300 nm. The plasmon generator 40 need not necessarily include the base part 41, and this is the reason why the range of the dimension in the Z direction (thickness) of the base part 41 includes 0 nm.

The core 43 will now be described. The core 43 has a top surface 43c, an evanescent light generating surface 43d which is a bottom surface, and two side surfaces 43e and 43f, in addition to the incidence end 43a and the end face 43b shown in FIG. 9. The evanescent light generating surface 43d generates evanescent light based on the light propagating through the core 43.

As described previously, the end face 43b is located away from the medium facing surface 12a. In the present embodiment, at least in a region sandwiched between a first virtual plane and a second virtual plane to be described later, the distance between the medium facing surface 12a and an arbitrary point on the end face 43b varies as the arbitrary point on the end face 43b shifts along the track width direction TW. In the present embodiment, as shown in FIG. 1 and FIG. 3, the end face 43b is a curved surface protruding toward the medium facing surface 12a such that the center of the end face 43b in the track width direction TW is closest to the medium facing surface 12a. The distance between the medium facing surface 12a and an arbitrary point on the end face 43b is smallest when the arbitrary point on the end face 43b is located at the center of the end face 43b in the track width direction TW. This distance increases with increasing distance between the arbitrary point on the end face 43b and the center of the end face 43b in the track width direction TW.

In the present embodiment, although not illustrated, at least part of the evanescent light generating surface 43d in the vicinity of the plasmon generator 40 is a curved surface protruding downward (in the −Z direction) such that the center of the part of the evanescent light generating surface 43d in the track width direction TW is closest to the element-forming surface 11c. In the vicinity of the plasmon generator 40, the distance between the element-forming surface 11c and an arbitrary point on the evanescent light generating surface 43d is smallest when the arbitrary point on the evanescent light generating surface 43d is located at the center of the evanescent light generating surface 43d in the track width direction TW. This distance increases with increasing distance between the arbitrary point on the evanescent light generating surface 43d and the center of the evanescent light generating surface 43d in the track width direction TW.

As described previously, the plasmon generator 40 and the core 43 are disposed to align in the direction of travel of the magnetic disk 201 (the Z direction). In the present embodiment, the core 43 is located forward of the plasmon generator 40 along the direction of travel of the magnetic disk 201 (the Z direction). In the present embodiment, in particular, the core 43 is disposed above the plasmon generator 40 such that a part of the evanescent light generating surface 43d that is closest to the element-forming surface 11c is opposed to the flat surface 42b of the plasmon generator 40 with the cladding layer 44 therebetween.

A part of the core 43 in the vicinity of the plasmon generator 40 has a dimension in the Y direction (width) of, for example, 0.3 to 1 μm. The remaining part of the core 43 may have a width greater than that of the part of the core 43 in the vicinity of the plasmon generator 40. The part of the core 43 in the vicinity of the plasmon generator 40 has a dimension in the Z direction (thickness) of, for example, 0.3 to 0.6 μm. The distance between the evanescent light generating surface 43d and the flat surface 42b of the plasmon generator 40 falls within the range of 10 to 80 nm, for example.

The main pole 35 will now be described. The main pole 35 has a front end face 35a located in the medium facing surface 12a, a rear end face 35b opposite to the front end face 35a, a top surface 35c, a bottom surface 35d, and two side surfaces 35e and 35f. The front end face 35a includes a bottom end 35g which is closest to the end face of the return yoke layer 28 located in the medium facing surface 12a.

In the present embodiment, the shape of the rear end face 35b is defined by the end face 43b of the core 43. More specifically, the shape of the rear end face 35b conforms to the shape of the end face 43b of the core 43. In the present embodiment, in particular, the rear end face 35b is in contact with the end face 43b. The rear end face 35b is a curved surface that is concaved toward the medium facing surface 12a such that the center of the rear end face 35b in the track width direction TW is closest to the medium facing surface 12a. The rear end face 35b need not necessarily be in direct contact with the end face 43b. For example, a thin insulating film or part of the cladding layer 45 may be present between the end face 43b and the rear end face 35b.

In the present embodiment, as shown in FIG. 1, the bottom surface 35d is a curved surface protruding downward such that the center of the bottom surface 35d in the track width direction TW is closest to the element-forming surface 11c. The distance between the element-forming surface 11c and an arbitrary point on the bottom surface 35d is smallest when the arbitrary point on the bottom surface 35d is located at the center of the bottom surface 35d in the track width direction TW. This distance increases with increasing distance between the arbitrary point on the bottom surface 35d and the center of the bottom surface 35d in the track width direction TW. The bottom end 35g lies at an end of the part of the bottom surface 35d closest to the element-forming surface 11c.

As described previously, the main pole 35 is interposed between the end face 43b of the core 43 and the medium facing surface 12a. As shown in FIG. 1, the main pole 35 and the plasmon generator 40 are disposed such that a virtual straight line L passing through the center 35ac of the front end face 35a in the track width direction TW and parallel to the direction of travel of the magnetic disk 201 (the Z direction) passes through the near-field light generating part 42g. The main pole 35 is located forward of the plasmon generator 40 along the direction of travel of the magnetic disk 201 (the Z direction). In the present embodiment, in particular, the main pole 35 is disposed above the plasmon generator 40 such that the part of the bottom surface 35d closest to the element-forming surface 11c is opposed to the flat surface 42b of the plasmon generator 40 with the cladding layer 44 therebetween.

In the example shown in FIG. 1, the side surfaces 35e and 35f are inclined with respect to the direction perpendicular to the element-forming surface 11c such that the distance between the side surfaces 35e and 35f increases with increasing distance from the element-forming surface 11c. However, the side surfaces 35e and 35f may each be a flat surface perpendicular to the element-forming surface 11c.

The front end face 35a further includes first and second ends 35a1 and 35a2 that are opposite to each other in the track width direction TW. The first end 35a1 lies at an end of the ridge between the top surface 35c and the side surface 35e. The second end 35a2 lies at an end of the ridge between the top surface 35c and the side surface 35f.

Here, a virtual plane that passes through the first end 35a1 and is perpendicular to the medium facing surface 12a and to the track width direction TW will be defined as a first virtual plane, and a virtual plane that passes through the second end 35a2 and is perpendicular to the medium facing surface 12a and to the track width direction TW will be defined as a second virtual plane. The first virtual plane is a plane passing through a straight line denoted by 35e in FIG. 3 and perpendicular to the plane of the drawing. The second virtual plane is a plane passing through a straight line denoted by 35f in FIG. 3 and perpendicular to the plane of the drawing. In a region sandwiched between the first virtual plane and the second virtual plane, an arbitrary cross section of the main pole 35 that passes through an arbitrary point on the front end face 35a and is perpendicular to the medium facing surface 12a and to the track width direction TW (cross section perpendicular to the plane of FIG. 3) has a length in the direction perpendicular to the medium facing surface 12a.

As shown in FIG. 3, the length of the aforementioned arbitrary cross section when the arbitrary point on the front end face 35a is located at the first end 35a1 will be defined as a first length and represented by the symbol L1. The length of the aforementioned arbitrary cross section when the arbitrary point on the front end face 35a is located at the second end 35a2 will be defined as a second length and represented by the symbol L2. The length of the aforementioned arbitrary cross section when the arbitrary point on the front end face 35a is located at the center 35ac of the front end face 35a in the track width direction TW will be defined as a third length and represented by the symbol L3. The third length L3 is the minimum of the length of the aforementioned arbitrary cross section obtained with the arbitrary point on the front end face 35a varied, and is smaller than the first length L1 and the second length L2.

The main pole 35 further includes two portions 351 and 352 located on opposite sides of the center 35ac. In each of the two portions 351 and 352, the length of the aforementioned arbitrary cross section increases with increasing distance between the center 35ac and the arbitrary point.

In the present embodiment, in particular, the two portions 351 and 352 are in contact with each other at the center 35ac. In FIG. 3, the boundary between the two portions 351 and 352 is shown by a dotted line. The length of the aforementioned arbitrary cross section increases as the arbitrary point on the front end face 35a shifts toward the first end 35a1 from the center 35ac, and increases as the arbitrary point on the front end face 35a shifts toward the second end 35a2 from the center 35ac.

In the present embodiment, the first length L1 and the second length L2 are equal. The first and second lengths L1 and L2 are in the range of 100 to 500 nm, for example. The third length L3 is preferably 30% or more and less than 100% of the first and second lengths L1 and L2, more preferably 30% or more and no more than 75% of the first and second lengths L1 and L2, and still more preferably 37.5% or more and no more than 50% of the first and second lengths L1 and L2. The reason for this will be described in detail later.

The length PW of the front end face 35a in the track width direction TW is preferably large to some extent so as to prevent the saturation of magnetic flux in the main pole 35. As will be described in detail later, the effect of the shape of the main pole 35 of the present embodiment is significantly high when the length PW is 60 nm or more. Therefore, in the present embodiment the length PW is preferably 60 nm or more.

The shape of the main pole 35 is not limited to the example that has been described with reference to FIG. 1 to FIG. 3. For example, the main pole 35 may include, in addition to the two portions 351 and 352, a central portion located between the two portions 351 and 352 and having a predetermined width in the Y direction. In this central portion, the length of the aforementioned cross section takes on a constant value equal to L3 (the minimum value) regardless of the position along the Y direction. In this case, a portion of the rear end face 35b that corresponds to the central portion is a flat surface.

Figure 4:
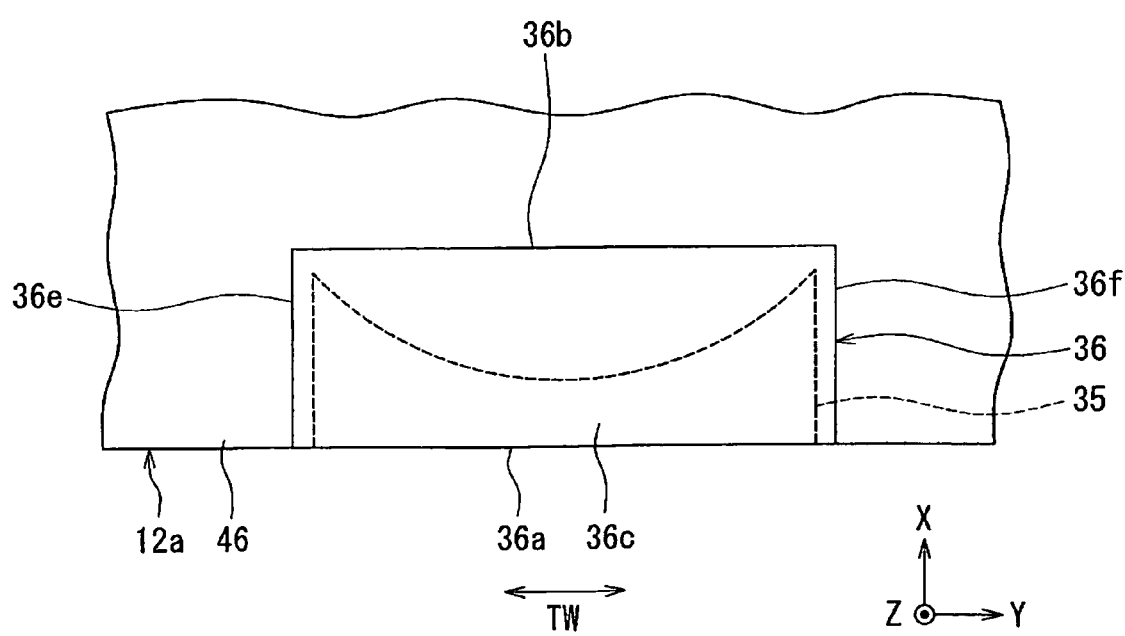
FIG. 4 is a plan view showing the top surface of a coupling layer of the first embodiment.
Figure 5:
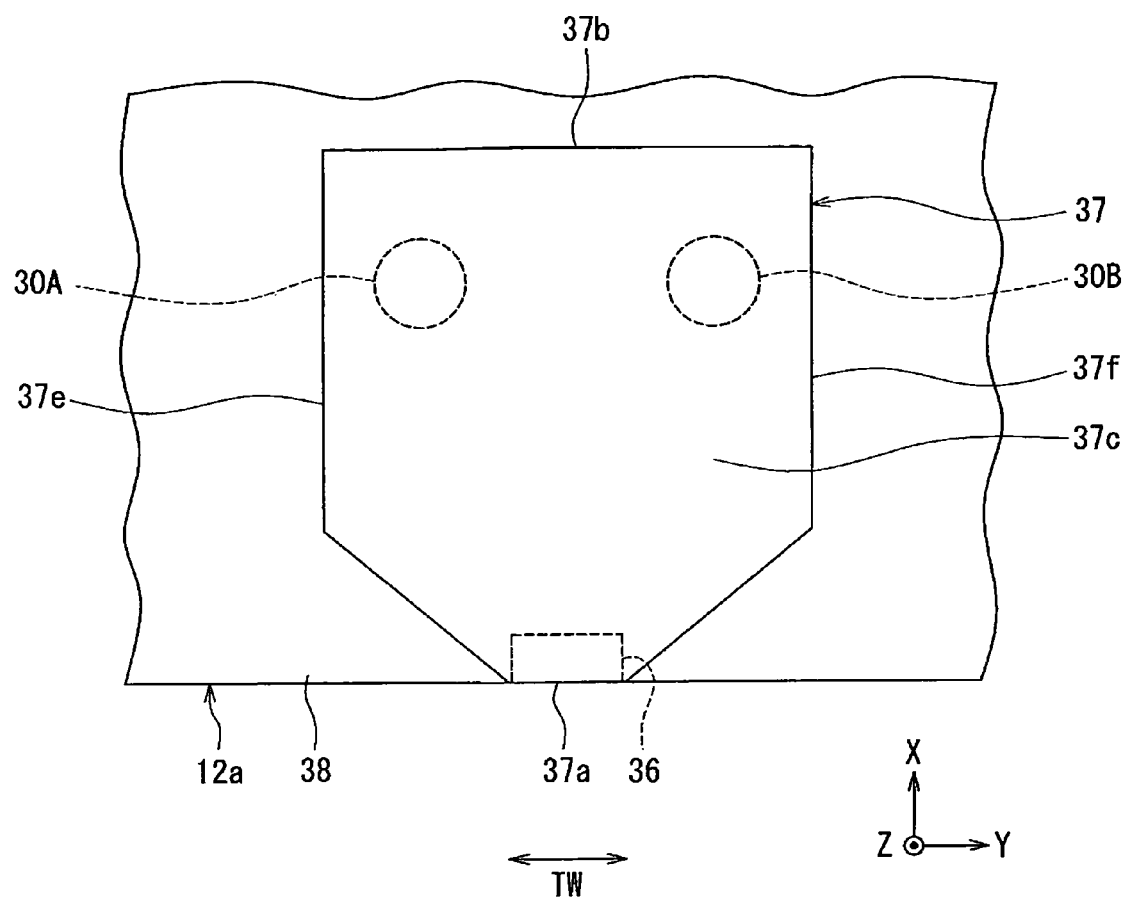
FIG. 5 is a plan view showing the top surface of a yoke layer of the first embodiment.

Reference is now made to FIG. 2, FIG. 4, and FIG. 5 to describe the shapes of the coupling layer 36 and the yoke layer 37. FIG. 4 is a plan view showing the top surface of the coupling layer 36. FIG. 5 is a plan view showing the top surface of the yoke layer 37.

The coupling layer 36 has a front end face 36a located in the medium facing surface 12a, a rear end face 36b opposite to the front end face 36a, a top surface 36c, a bottom surface, and two side surfaces 36e and 36f. In the example shown in FIG. 4, the rear end face 36b is parallel to the medium facing surface 12a. However, the rear end face 36b may be a curved surface concaved toward the medium facing surface 12a like the rear end face 35b of the main pole 35, or may be a curved surface protruding away from the medium facing surface 12. Where the rear end face 36b is a curved surface concaved toward the medium facing surface 12a, it is possible to reduce the area of contact between the bottom surface of the coupling layer 36 and the top surface 43c of the core 43 to prevent the laser light propagating through the core 43 from leaking to the coupling layer 36. Where the rear end face 36b is a curved surface protruding away from the medium facing surface 12a, the coupling layer 36 has a larger volume and therefore it is possible to introduce a larger amount of magnetic flux to the main pole 35 through the coupling layer 36.

As shown in FIG. 5, the yoke layer 37 has a front end face 37a located in the medium facing surface 12a, a rear end face 37b opposite to the front end face 37a, a top surface 37c, a bottom surface, and two side surfaces 37e and 37f. The width of the top surface 37c in the track width direction TW gradually increases with increasing distance from the medium facing surface 12a and then becomes constant.

Reference is now made to FIG. 9 to describe the principle of generation of near-field light in the present embodiment and the principle of thermally-assisted magnetic recording using the near-field light. Laser light emitted from the laser diode 60 propagates through the core 43 of the waveguide to reach the vicinity of the plasmon generator 40. Here, the laser light is totally reflected at the evanescent light generating surface 43d. This causes evanescent light to occur from the evanescent light generating surface 43d to permeate into the cladding layer 44. Then, surface plasmons are excited on at least the flat surface 42b of the plasmon generator 40 through coupling with the evanescent light. The surface plasmons propagate along the flat surface 42b to the near-field light generating part 42g. Consequently, the surface plasmons concentrate at the near-field light generating part 42g, and near-field light is generated from the near-field light generating part 42g based on the surface plasmons.

The near-field light is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the main pole 35 for data writing.

Figure 10:
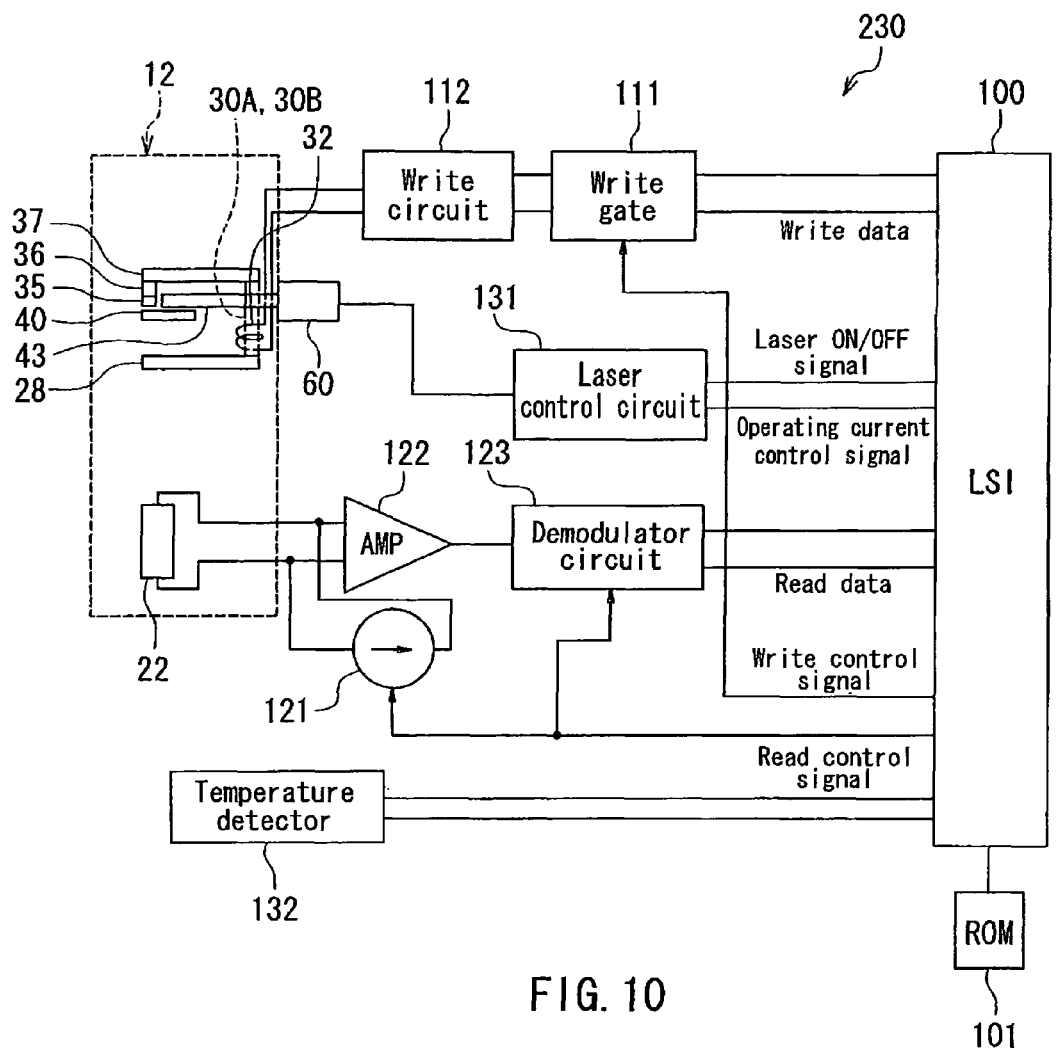
FIG. 10 is a block diagram showing the circuit configuration of the magnetic recording device according to the first embodiment of the invention.

Reference is now made to FIG. 10 to describe the circuit configuration of the control circuit 230 shown in FIG. 6 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 32.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 32. Consequently, the main pole 35 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light propagates through the core 43. Then, according to the principle of generation of near-field light described previously, near-field light is generated from the near-field light generating part 42g of the plasmon generator 40. The near-field light heats a part of the magnetic recording layer of the magnetic disk 201, thereby lowering the coercivity of that part. When writing, the part of the magnetic recording layer with the lowered coercivity is subjected to the write magnetic field produced by the main pole 35 for data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60.

The control table may further contain data that indicates the relationship between the operating current value and a temperature increase of the magnetic recording layer heated by the near-field light, and data that indicates the temperature dependence of the coercivity of the magnetic recording layer.

As shown in FIG. 10, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the control circuit 230 may have any other configuration than the configuration shown in FIG. 10.

Now, a description will be given of a method of manufacturing the thermally-assisted magnetic recording head 1 according to the present embodiment. The method of manufacturing the thermally-assisted magnetic recording head 1 includes the steps of manufacturing the slider 10; and securing the light source unit 50 onto the slider 10. Here, a method of manufacturing the slider 10 will be described briefly. The method of manufacturing the slider 10 includes the steps of fabricating a substructure by forming components of a plurality of sliders 10, except the slider substrates 11, on a substrate that includes portions to become the slider substrates 11 of the plurality of sliders 10, the substructure including a plurality pre-slider portions aligned in a plurality of rows, the plurality of pre-slider portions being intended to become individual sliders 10 later; and producing the plurality of sliders 10 by cutting the substructure to separate the plurality of pre-slider portions from each other. In the step of producing the plurality of sliders 10, the cut surfaces are polished into the medium facing surfaces 11a and 12a.

The method of manufacturing the thermally-assisted magnetic recording head 1 (the method of manufacturing the slider 10) according to the present embodiment includes, in particular, the step of forming the plasmon generator 40 and the step of forming the main pole 35 and the core 43 of the waveguide 43 after the plasmon generator 40 is formed.

The step of forming the plasmon generator 40 and the step of forming the main pole 35 and the core 43 will now be described in detail with reference to FIG. 11 to FIG. 34. FIG. 11 to FIG. 16, FIG. 18, FIG. 21, FIG. 25, and FIG. 29 are cross-sectional views each showing part of a stack of layers formed in the process of manufacturing the thermally-assisted magnetic recording head 1. These drawings each show a cross section taken at the position where the medium facing surface 12a is to be formed (hereinafter referred to as the expected position of the medium facing surface). FIG. 17, FIG. 19, FIG. 20, FIG. 22 to FIG. 24, FIG. 26 to FIG. 28, and FIG. 30 to FIG. 34 are perspective views each showing part of a stack of layers formed in the process of manufacturing the thermally-assisted magnetic recording head 1.

Figure 11:
FIG. 11 is a cross-sectional view showing a step of a method of manufacturing the thermally-assisted magnetic recording head according to the first embodiment of the invention.

FIG. 11 shows a step of the method of manufacturing the thermally-assisted magnetic recording head 1. In this step, a metal film 40P is formed on the insulating layer 34 by sputtering, for example. The metal film 40P is to be provided with the base part 41 and the protruding part 42 later to thereby become the plasmon generator 40.

Figure 12:
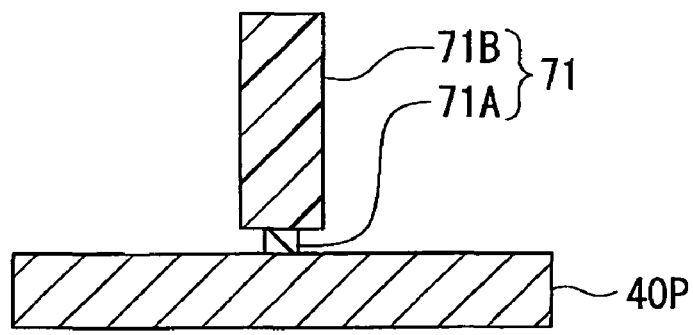
FIG. 12 is a cross-sectional view showing a step that follows the step shown in FIG. 11.

FIG. 12 shows the next step. In this step, a mask 71 is formed on the metal film 40P. The mask 71 is intended to be used for patterning the metal film 40P. The mask 71 is preferably formed into a shape having an undercut as shown in FIG. 12 so as to be easily removable later. An example of the mask 71 of the shape having an undercut is one consisting of a lower layer 71A and an upper layer 71B as shown in FIG.

12. The upper layer 71B is formed of a photoresist that is patterned by photolithography. The lower layer 71A is formed of, for example, a material soluble in a developing solution that is to be used when patterning the upper layer 71B.

Figure 13:
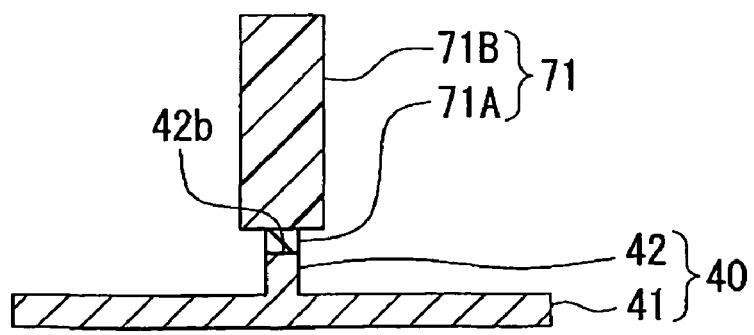
FIG. 13 is a cross-sectional view showing a step that follows the step shown in FIG. 12.

FIG. 13 shows the next step. In this step, part of the metal film 40P is etched by, for example, ion milling or reactive ion etching (hereinafter referred to as RIE) using the mask 71 as the etching mask, whereby the base part 41 and the protruding part 42 are formed. This makes the metal film 40P into the plasmon generator 40.

FIG. 14 shows the next step. In this step, with the mask 71 left unremoved, a dielectric layer 441 is formed over the entire top surface of the stack shown in FIG. 13 by sputtering, for example. The dielectric layer 441 is to later become a part of the cladding layer 44. The dielectric layer 441 is formed such that its top surface is at a higher level than the flat surface 42b, i.e., the top surface of the protruding part 42, at positions away from the protruding part 42. As shown in FIG. 14, a portion of the dielectric layer 441 adheres to the surfaces of the mask 71. Consequently, in the vicinity of the protruding part 42, the thickness of the dielectric layer 441 decreases toward the protruding part 42 due to the shadow cast by the mask 71 and the portion of the dielectric layer 441 adhering to the surfaces of the mask 71.

FIG. 15 shows the next step. In this step, the mask 71 is removed. At this time, the portion of the dielectric layer 441 adhering to the mask 71 is also removed together with the mask 71. The top surface of the stack shown in FIG. 15 includes the top surface of the dielectric layer 441 and the flat surface 42b of the protruding part 42. Due to the aforementioned shape of the dielectric layer 441, the top surface of this stack in the vicinity of the plasmon generator 40 is formed into a curved surface that is concave downward (in the –Z direction) such that the flat surface 42b is closest to the element-forming surface 11c (see FIG. 9).

Figure 16:
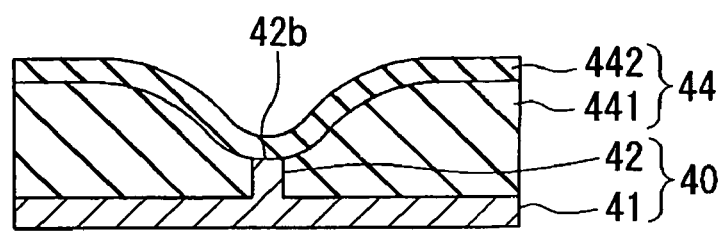
FIG. 16 is a cross-sectional view showing a step that follows the step shown in FIG. 15.
Figure 17:
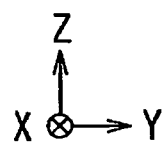
FIG. 17 is a perspective view showing the step of FIG. 16.
Figure 17:
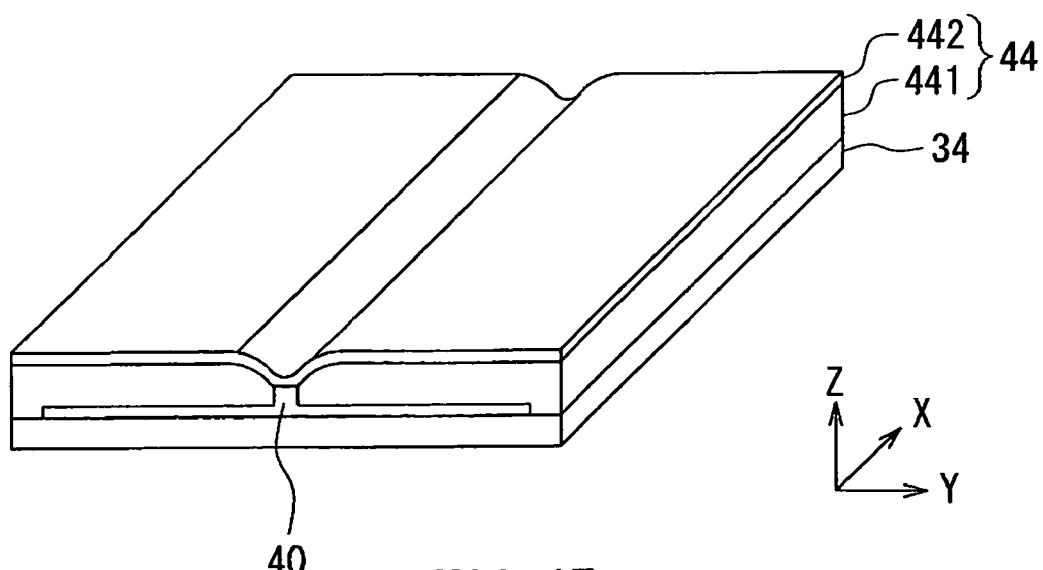

FIG. 16 and FIG. 17 show the next step. In this step, a dielectric layer 442 is formed by sputtering, for example. The dielectric layer 442 is formed to extend along the top surface of the stack of FIG. 15 (the top surface of the dielectric layer 441 and the flat surface 42b of the protruding part 42). The top surface of the dielectric layer 442 is formed into a curved surface that is concave downward such that a part of the top surface of the dielectric layer 442 that lies above the flat surface 42b is closest to the element-forming surface 11c. The dielectric layer 442 is to later become another part of the cladding layer 44. The formation of the dielectric layer 442 completes the cladding layer 44.

Figure 18:
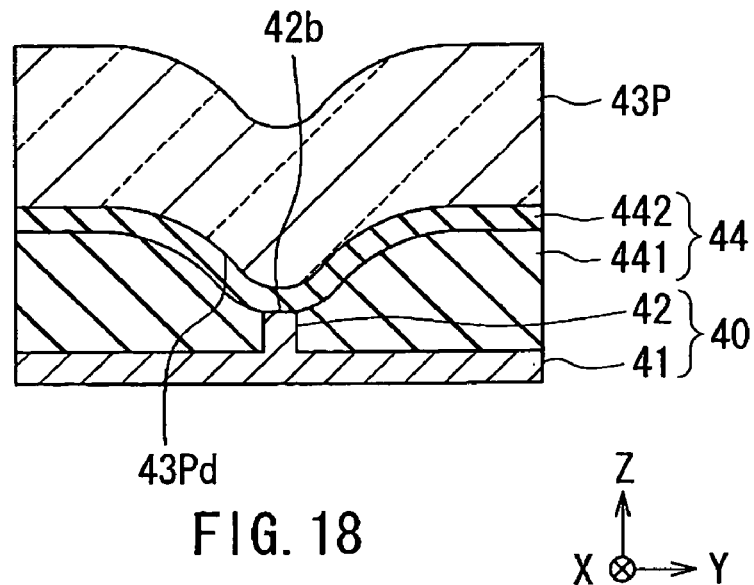
FIG. 18 is a cross-sectional view showing a step that follows the step shown in FIG. 16.
Figure 19:
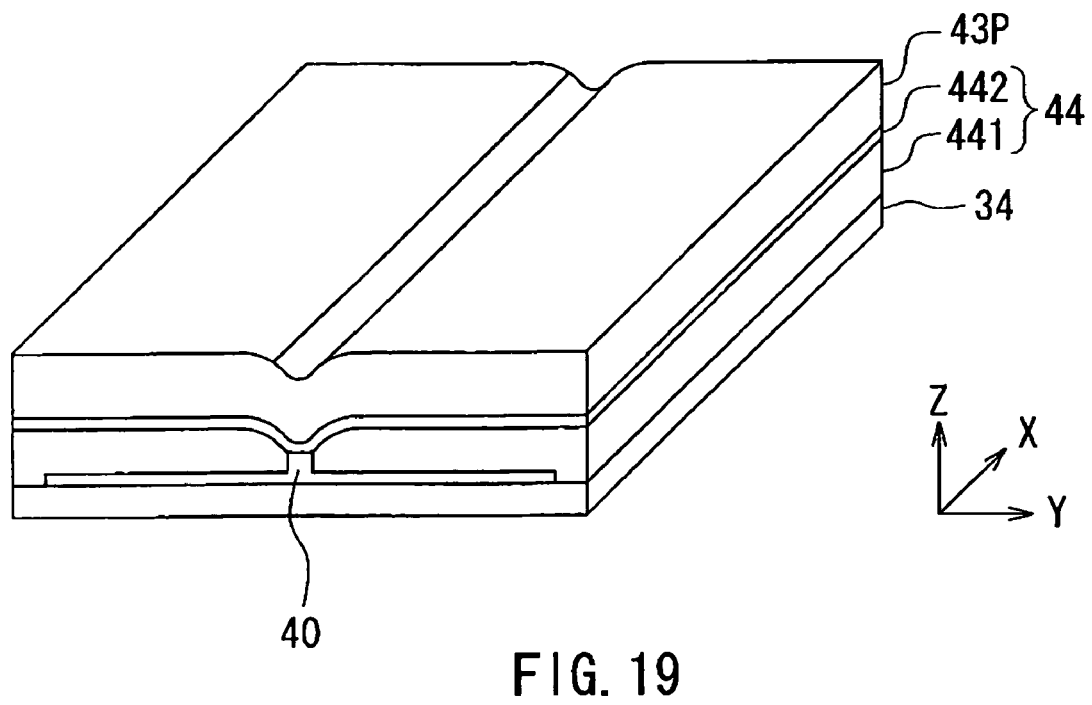
FIG. 19 is a perspective view showing the step of FIG. 18.

FIG. 18 and FIG. 19 show the next step. In this step, a dielectric layer 43P is formed over the entire top surface of the stack shown in FIG. 16 and FIG. 17 by sputtering, for example. The dielectric layer 43P is to be subjected to etching and polishing later to thereby become the core 43. The dielectric layer 43P has a bottom surface 43Pd that includes a portion to become the evanescent light generating surface 43d of the core 43. The shape of the bottom surface 43Pd is defined by the top surface of the dielectric layer 442. More specifically, the bottom surface 43Pd is formed along the aforementioned shape of the top surface the dielectric layer 442 into a curved surface protruding downward such that a part of the bottom surface 43Pd that lies above the flat surface 42b is closest to the element-forming surface 11c.

Figure 20:
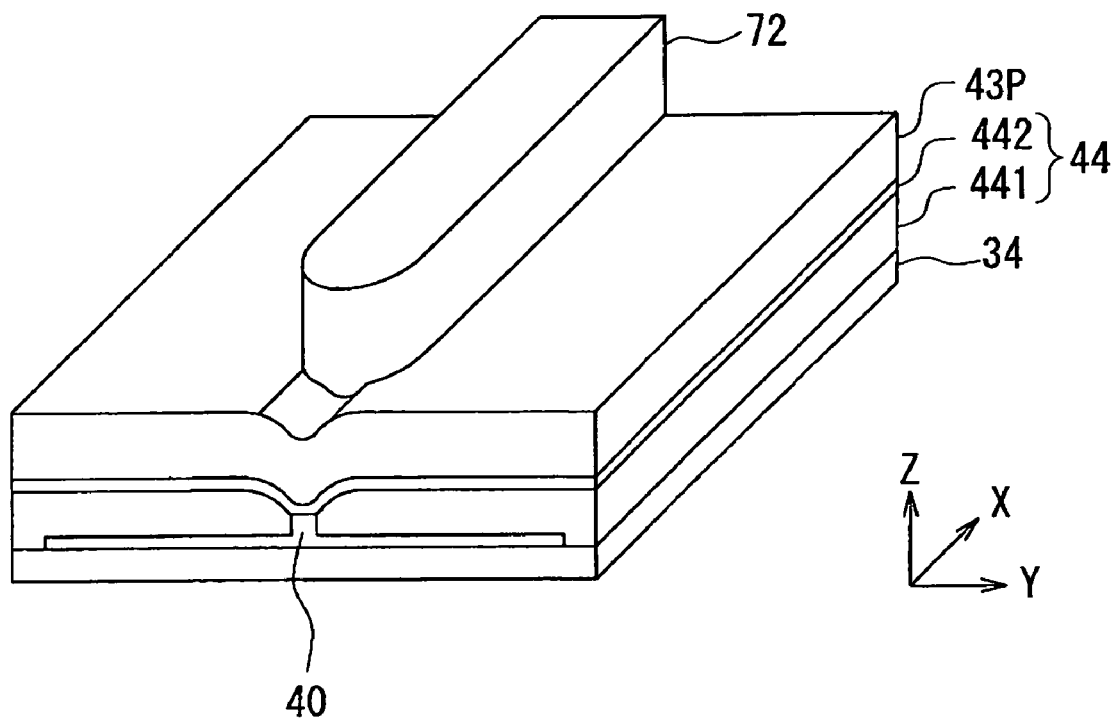
FIG. 20 is a perspective view showing a step that follows the step shown in FIG. 19.

FIG. 20 shows the next step. In this step, a photoresist mask 72 is formed on the dielectric layer 43P. The planar shape (shape viewed in the Z direction) of the photoresist mask 72 corresponds to the planar shape of the core 43. The photoresist mask 72 is formed by patterning a photoresist layer by photolithography.

Figure 21:
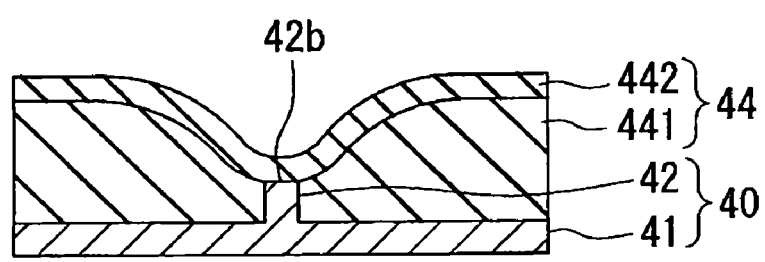
FIG. 21 is a cross-sectional view showing a step that follows the step shown in FIG. 20.
Figure 22:
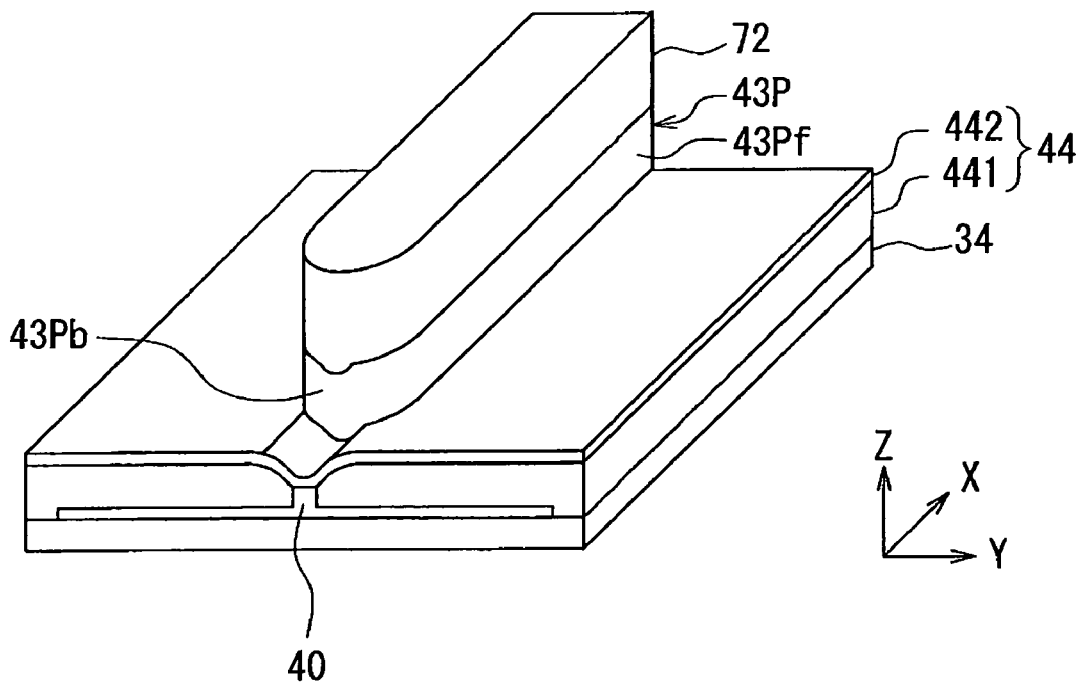
FIG. 22 is a perspective view showing the step of FIG. 21.
Figure 23:
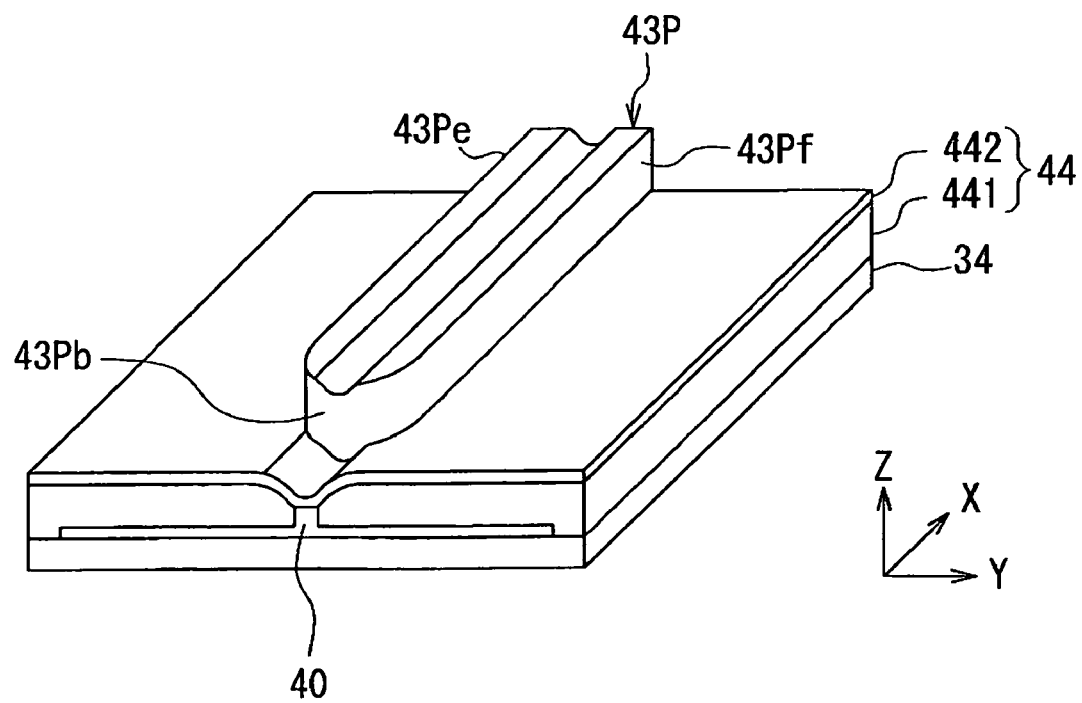
FIG. 23 is a perspective view showing a step that follows the step shown in FIG. 22.

FIG. 21 and FIG. 22 show the next step. In this step, the dielectric layer 43P except the portion thereof lying under the photoresist mask 72 is removed by, for example, RIE, using the photoresist mask 72. The photoresist mask 72 is then removed as shown in FIG. 23. The etching process shown in FIG. 21 and FIG. 22 provides the dielectric layer 43P with an end face 43Pb, a side surface 43Pe, and a side surface 43Pf. The end face 43Pb includes a portion to become the end face 43b of the core 43. The side surface 43Pe includes a portion to become the side surface 43e of the core 43. The side surface 43Pf includes a portion to become the side surface 43f of the core 43. The end face 43Pb faces toward the expected position of the medium facing surface and is located away from the expected position of the medium facing surface. The end face 43Pb is a curved surface protruding toward the expected position of the medium facing surface such that the center of the end face 43Pb in the direction parallel to the Y direction is closest to the expected position of the medium facing surface.

Figure 24:
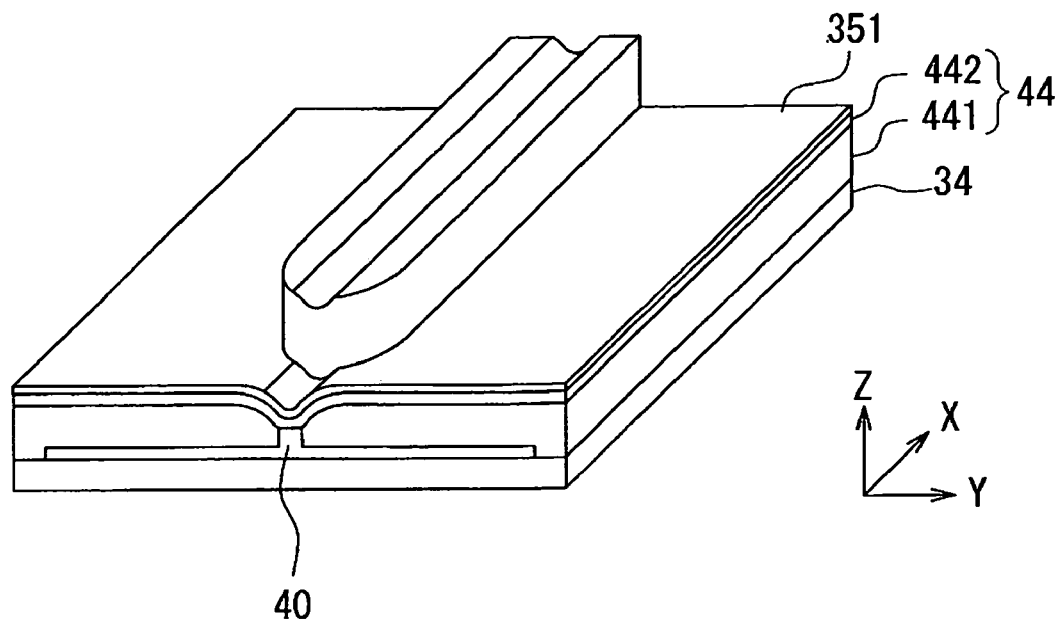
FIG. 24 is a perspective view showing a step that follows the step shown in FIG. 23.
Figure 25:
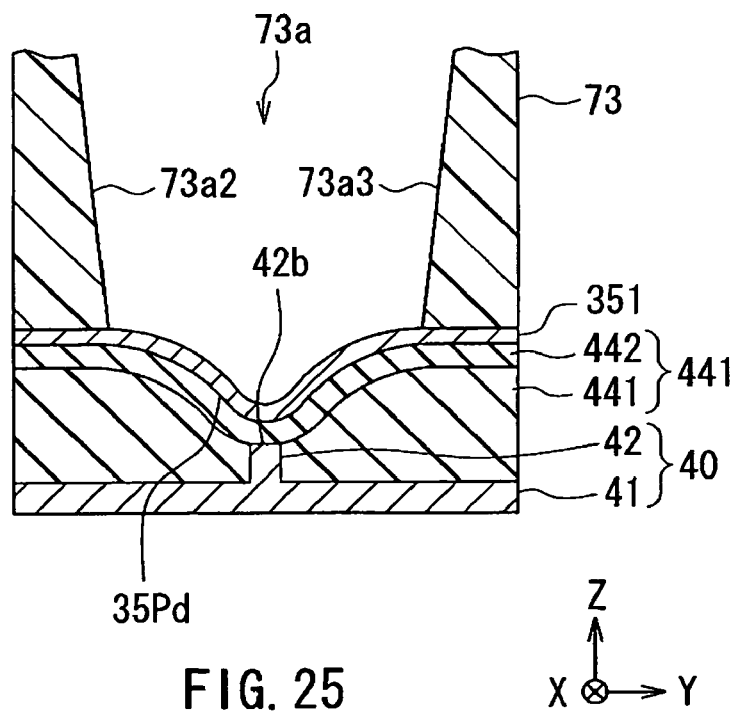
FIG. 25 is a cross-sectional view showing a step that follows the step shown in FIG. 24.

FIG. 24 shows the next step. In this step, an electrode film 351 is formed over the entire top surface of the stack shown in FIG. 23 by sputtering, for example. The electrode film 351 includes a portion that is to be etched later to become a portion of the main pole 35. This portion of the electrode film 351 is formed along the top surface of the dielectric layer 442 and the end face 43Pb of the dielectric layer 43P. The electrode film 351 further includes a pre-bottom-surface portion 35Pd that includes a portion to become the bottom surface 35d of the main pole 35. The pre-bottom-surface portion 35Pd is not shown in FIG. 24 but is shown in FIG. 25, which will be described later. The shape of the pre-bottom-surface portion 35Pd is defined by the top surface of the dielectric layer 442. More specifically, the pre-bottom-surface portion 35Pd is formed along the aforementioned shape of the top surface of the dielectric layer 442 into a curved surface protruding downward such that a part of the pre-bottom-surface portion 35Pd that lies above the flat surface 42b is closest to the element-forming surface 11c.

Although not illustrated, the electrode film 351 further includes a pre-rear-end-face portion that includes a portion to become the rear end face 35b of the main pole 35. The shape of the pre-rear-end-face portion is defined by the end face 43Pb of the dielectric layer 43P. More specifically, the pre-rear-end-face portion is formed along the aforementioned shape of the end face 43Pb into a curved surface that is concave toward the expected position of the medium facing surface such that a part of the pre-rear-end-face portion that is opposed to the center of the end face 43Pb in the direction parallel to the Y direction is closest to the expected position of the medium facing surface.

Figure 26:
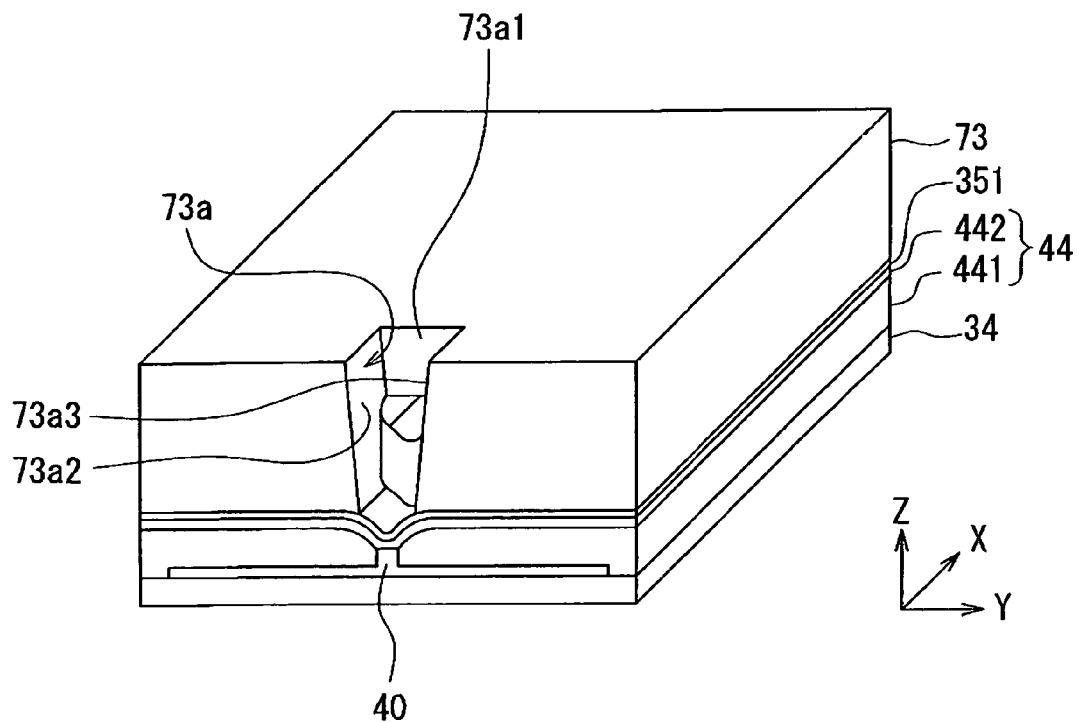
FIG. 26 is a perspective view showing the step of FIG. 25.

FIG. 25 and FIG. 26 show the next step. In this step, a photoresist mask 73 having an opening 73a is formed on the electrode film 351. The opening 73a includes a region where the main pole 35 is to be disposed later. The photoresist mask 73 is formed such that its top surface is at a level higher than the top surface of a part of the electrode film 351 that lies on the dielectric layer 43P. The photoresist mask 73 is formed by patterning a photoresist layer by photolithography.

The opening 73a has a wall face 73a1 facing toward the expected position of the medium facing surface, and two wall faces 73a2 and 73a3 that are perpendicular to the wall face 73a1 and inclined with respect to the direction perpendicular to the element-forming surface 11c. The wall face 73a1 is located farther from the expected position of the medium facing surface than is a position where the rear end face 35b of the main pole 35 is to be formed later. The wall face 73a2 defines the shape of the side surface 35e of the main pole 35. The wall face 73a3 defines the shape of the side surface 35f of the main pole 35.

Figure 27:
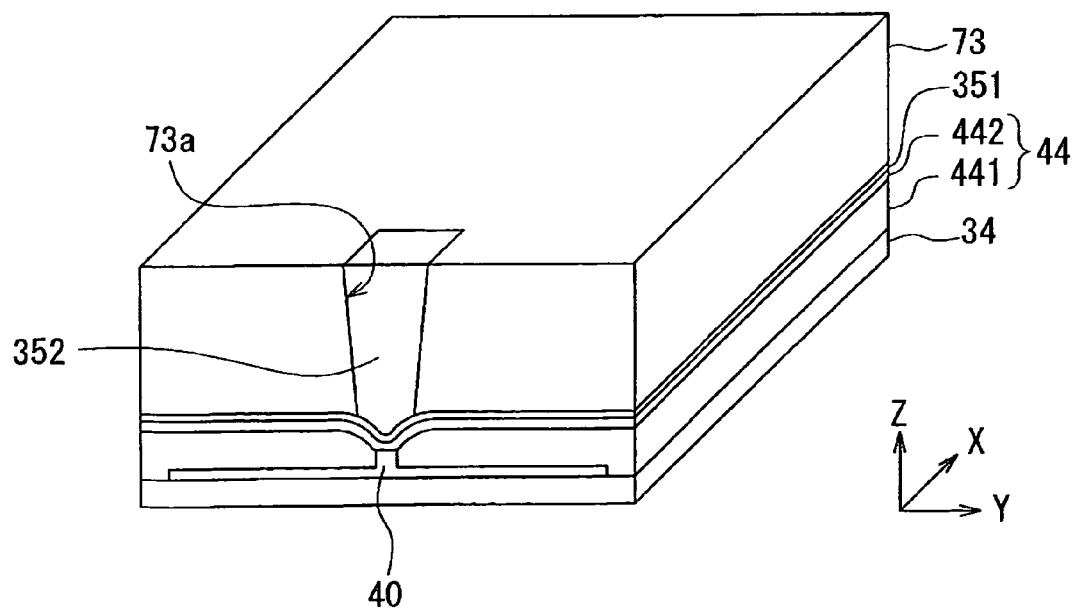
FIG. 27 is a perspective view showing a step that follows the step shown in FIG. 26.
Figure 28:
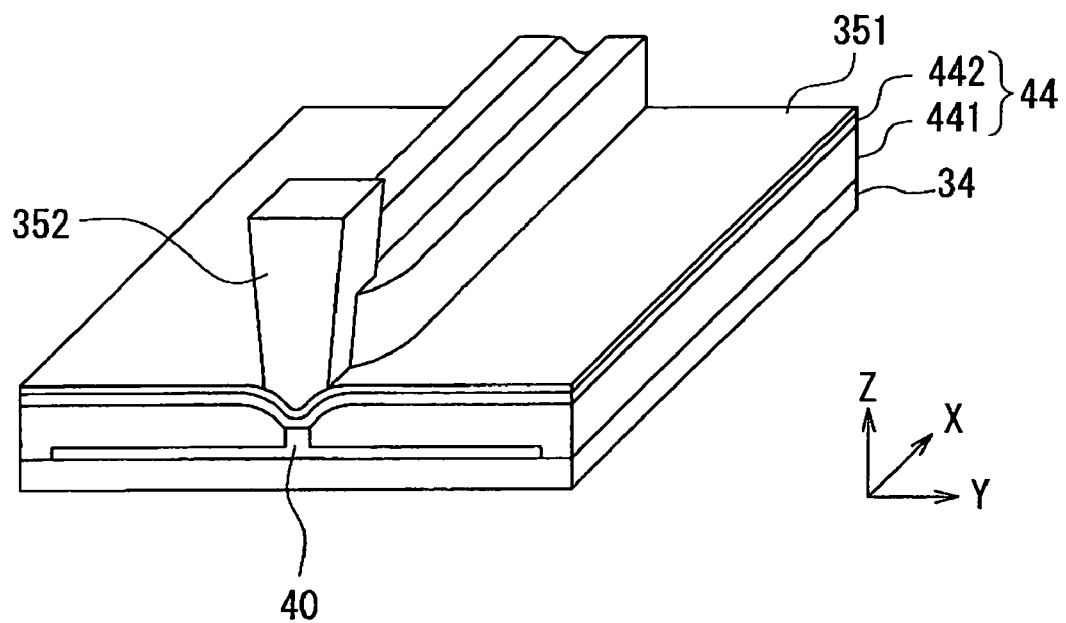
FIG. 28 is a perspective view showing a step that follows the step shown in FIG. 27.

FIG. 27 shows the next step. In this step, a plating film 352 is formed in the opening 73a of the photoresist mask 73 by plating using the electrode film 351 as the electrode. The plating film 352 is formed such that a part thereof is located on the part of the electrode film 351 lying on the dielectric layer 43P. The plating film 352 is to be polished later to become another portion of the main pole 35. Next, the photoresist mask 73 is removed as shown in FIG. 28.

Figure 29:
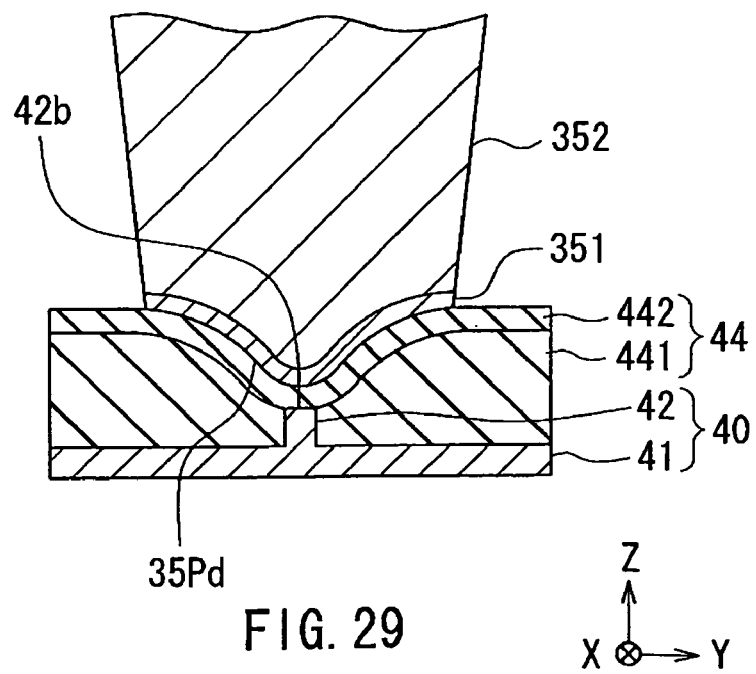
FIG. 29 is a cross-sectional view showing a step that follows the step shown in FIG. 28.
Figure 30:
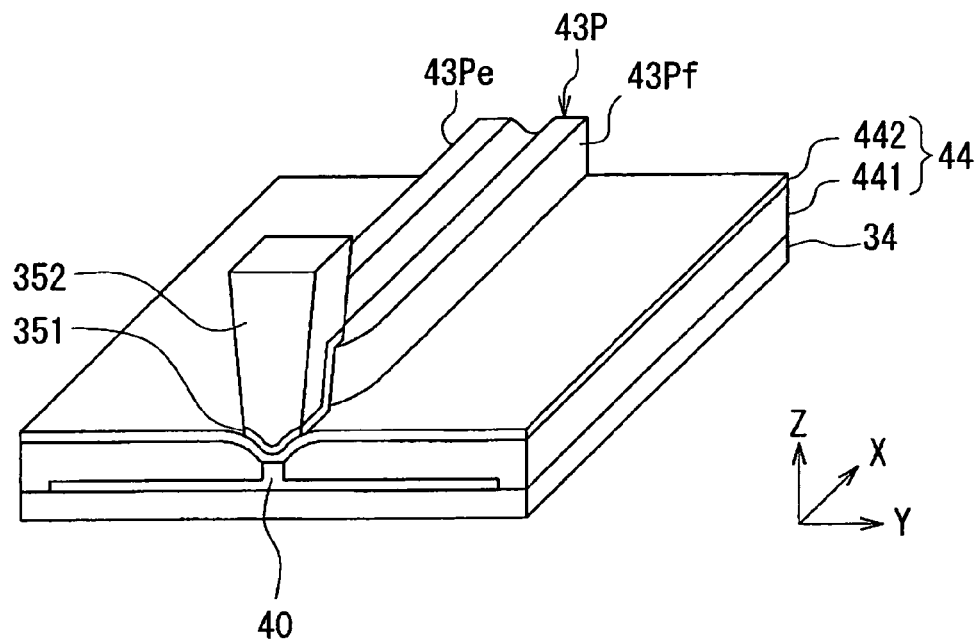
FIG. 30 is a perspective view showing the step of FIG. 29.

FIG. 29 and FIG. 30 show the next step. In this step, the electrode film 351 except the portion thereof lying under the plating film 352 is removed by ion milling, for example.

Figure 31:
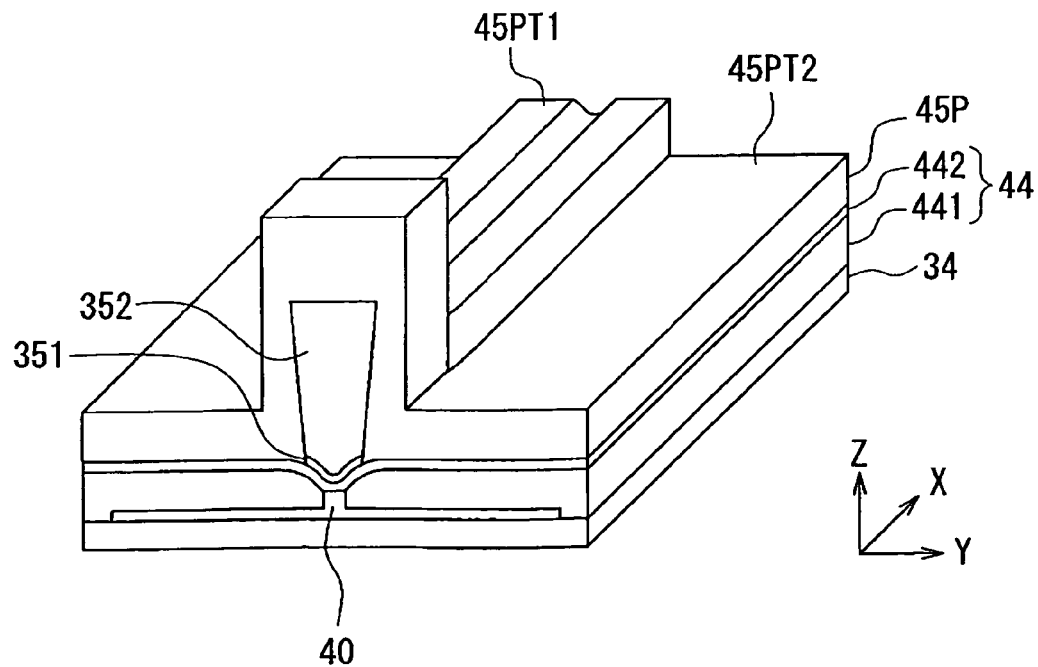
FIG. 31 is a perspective view showing a step that follows the step shown in FIG. 30.

FIG. 31 shows the next step. In this step, a dielectric layer 45P is formed over the entire top surface of the stack shown in FIG. 29 and FIG. 30 by sputtering, for example. The dielectric layer 45P is to be polished later to become the cladding layer 45. The dielectric layer 45P has a top surface including: a convex portion 45PT1 located above the dielectric layer 43P and the plating film 352; and peripheral portions 45PT2 located around the dielectric layer 43P and the plating film 352 and lower than the convex portion 45PT1.

Figure 32:
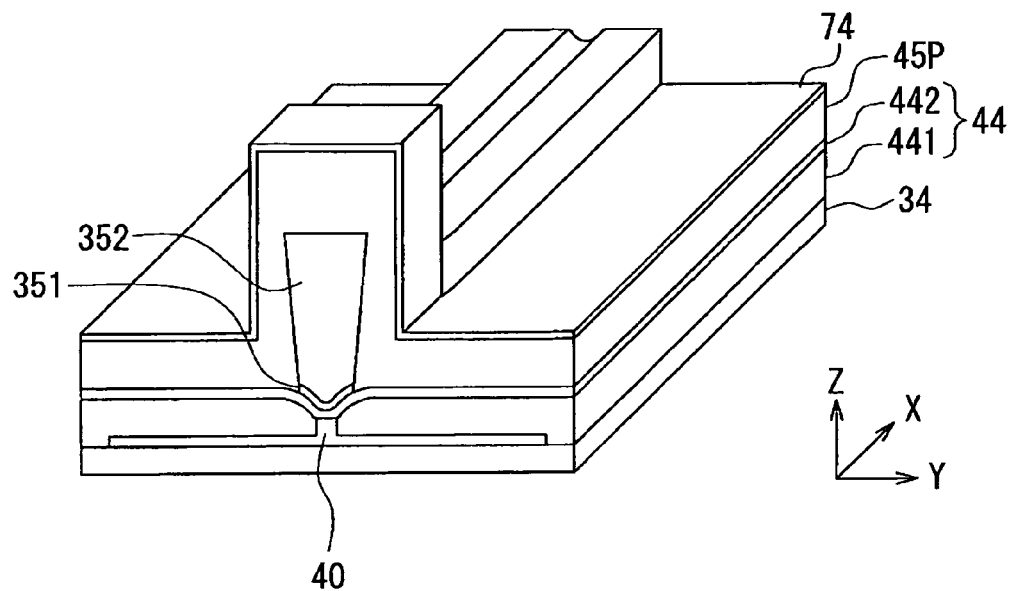
FIG. 32 is a perspective view showing a step that follows the step shown in FIG. 31.

FIG. 32 shows the next step. In this step, a stopper film 74 is formed on the dielectric layer 45P by sputtering, for example. The level of the top surfaces of portions of the stopper film 74 lying over the peripheral portions 45PT2 defines the level of the top surface 35c of the main pole 35 and the top surface 43c of the core 43 to be formed later. The stopper film 74 is formed of Ru, for example.

Figure 33:
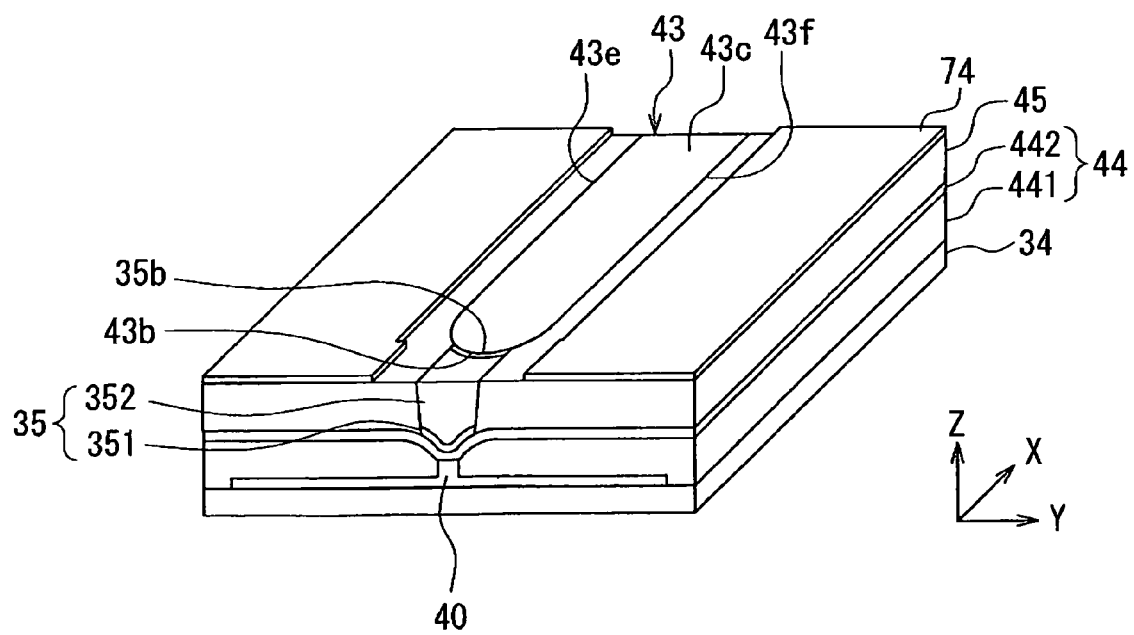
FIG. 33 is a perspective view showing a step that follows the step shown in FIG. 32.
Figure 34:
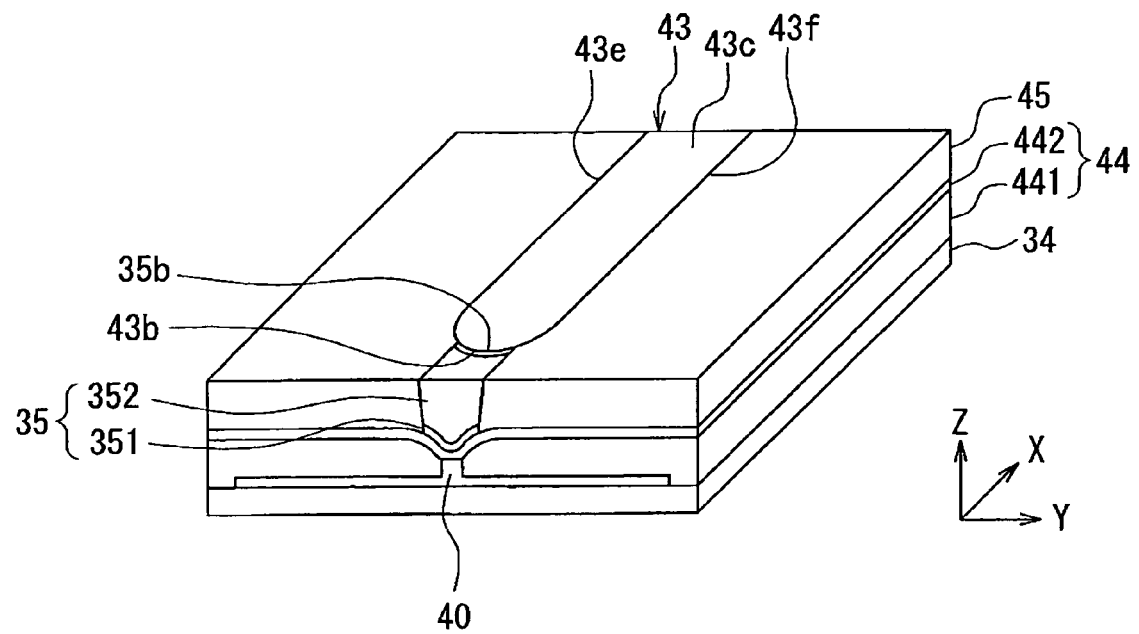
FIG. 34 is a perspective view showing a step that follows the step shown in FIG. 33.

FIG. 33 shows the next step. In this step, the plating film 352 and the dielectric layers 43P and 45P are polished by, for example, chemical mechanical polishing (hereinafter referred to as CMP), until the portions of the stopper film 74 lying over the peripheral portions 45TP2 are exposed. In this polishing process, the portions of the stopper film 74 lying over the peripheral portions 45TP2 function as a polishing stopper for stopping the polishing. This polishing process completes the main pole 35, the core 43, and the cladding layer 45. Next, as shown in FIG. 34, the stopper film 74 is removed by etching.

The effects of the thermally-assisted magnetic recording head 1 according to the present embodiment will now be described with reference to FIG. 1 to FIG. 3. In the present embodiment, the plasmon generator 40 and the core 43 are disposed to align in the direction of travel of the magnetic disk 201 (the Z direction). The core 43 has the end face 43b facing toward the medium facing surface 12a and located away from the medium facing surface 12a. The main pole 35 is interposed between the end face 43b of the core 43 and the medium facing surface 12a. The main pole 35 has the front end face 35a located in the medium facing surface 12a. The front end face 35a includes the first and second ends 35a1 and 35a2 opposite to each other in the track width direction TW. In a region sandwiched between a first virtual plane passing through the first end 35a1 and perpendicular to the medium facing surface 12a and to the track width direction TW and a second virtual plane passing through the second end 35a2 and perpendicular to the medium facing surface 12a and to the track width direction TW, an arbitrary cross section of the main pole 35 that passes through an arbitrary point on the front end face 35a and is perpendicular to the medium facing surface 12a and to the track width direction TW has a length in the direction perpendicular to the medium facing surface 12a.

The third length L3, i.e., the length of the aforementioned arbitrary cross section when the arbitrary point on the front end face 35a is located at the center 35ac of the front end face 35a in the track width direction TW, is the minimum of the length of the aforementioned arbitrary cross section obtained with the arbitrary point on the front end face 35a varied. The third length L3 is smaller than the first length L1, i.e., the length of the aforementioned arbitrary cross section when the arbitrary point on the front end face 35a is located at the first end 35a1, and than the second length L2, i.e., the length of the aforementioned arbitrary cross section when the arbitrary point on the front end face 35a is located at the second end 35a2.

According to the present embodiment, the main pole 35 of the above-described shape allows the magnetic flux in the main pole 35 to be more easily saturated in the vicinity of the center 35ac of the front end face 35a in the track width direction TW than in the case where the main pole 35 is rectangular-solid-shaped. This makes it possible to enhance the magnetic field generated from the vicinity of the aforementioned center 35ac without causing the enhancement of the magnetic fields generated from the vicinities of the first and second ends 35a1 and 35a2 of the front end face 35a. Furthermore, the present embodiment allows the magnetic field generated from the vicinity of the center 35ac to be stronger than the magnetic fields generated from the vicinities of the first and second ends 35a1 and 35a2 of the front end face 35a. Consequently, according to the present embodiment, it is possible to enhance the magnetic field generated from the vicinity of the center 35ac while preventing the occurrence of adjacent track erasure.

Where the first length L1 and the second length L2 are equal, the above-described effect is obtained when the third length L3 is smaller than the first and second lengths L1 and L2 even slightly, unless L3 is not excessively small. If L3 is excessively small, the magnetic flux may be saturated in the vicinity of the midpoint between the center 35ac and the first end 35a1 and in the vicinity of the midpoint between the center 35ac and the second end 35a2, and this may weaken the magnetic field generated from the vicinity of the center 35ac. In consideration of the results of a second simulation to be described later, the third length L3 is preferably 30% or more and less than 100% of the first and second lengths L1 and L2, more preferably 30% or more and no more than 75% of the first and second lengths L1 and L2, and still more preferably 37.5% or more and no more than 50% of the first and second lengths L1 and L2.

In the present embodiment, the length of the aforementioned arbitrary cross section of the main pole 35 is defined by the shape of the rear end face 35b of the main pole 35. The shape of the rear end face 35b is defined by the end face 43b of the core 43. In the region sandwiched between the first virtual plane and the second virtual plane, the distance between the medium facing surface 12a and an arbitrary point on the end face 43b of the core 43 varies as the arbitrary point on the end face 43b of the core 43 shifts along the track width direction TW. With such a configuration, the present embodiment allows the main pole 35, part of the core 43, and the plasmon generator 40 to be disposed in a very small area in the vicinity of the medium facing surface 12a, allows the main pole 35 to be formed into a shape that provides the above-described effect, and allows the end face 43b of the core 43 to be located as close to the medium facing surface 12a as possible so that surface plasmons are excited on the plasmon generator 40 at the nearest possible point to the medium facing surface 12a. Consequently, according to the present embodiment, it is possible to transform the laser light propagating through the core 43 into near-field light with efficiency.

The effect of the shape of the main pole 35 of the present embodiment is significantly high when the length PW of the front end face 35a in the track width direction TW is 60 nm or more. This will now be described with reference to FIG. 35 and FIG. 36.

Figure 35:
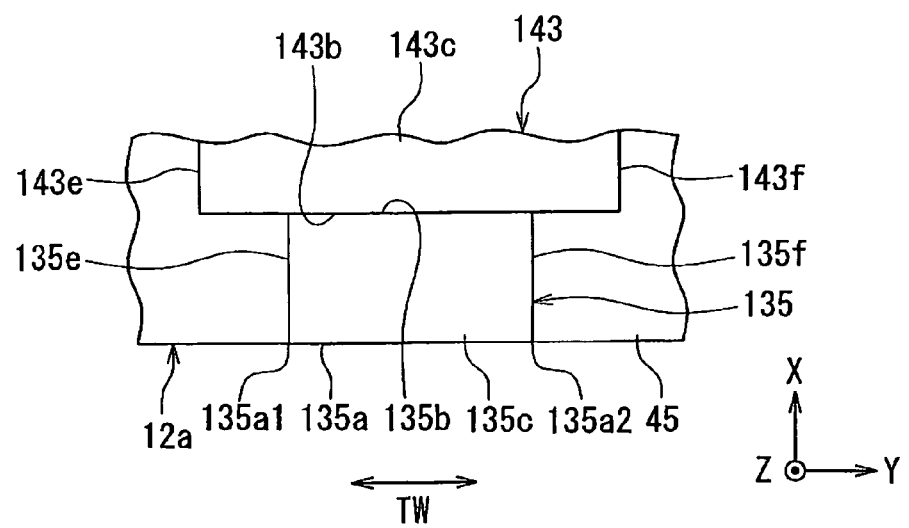
FIG. 35 is a plan view showing the top surfaces of a main pole and a core of a wave guide of a comparative example.

First, with reference to FIG. 35, a description will be given of the shapes of a main pole and a core of a comparative example. FIG. 35 is a plan view showing the top surfaces of the main pole and the core of the comparative example. The core 143 of the comparative example has an end face 143b facing toward the medium facing surface 12a and located away from the medium facing surface 12a. The core 143 further has a top surface 143c, an evanescent light generating surface which is a bottom surface, and two side surfaces 143e and 143f. The end face 143b is a flat surface parallel to the medium facing surface 12a.

The main pole 135 of the comparative example is rectangular-solid-shaped. The main pole 135 has a front end face 135a located in the medium facing surface 12a, a rear end face 135b opposite to the front end face 135a, a top surface 135c, a bottom surface, and two side surfaces 135e and 135f. The rear end face 135b is a flat surface parallel to the medium facing surface 12a. The front end face 135a includes first and second ends 135a1 and 135a2 opposite to each other in the track width direction TW. The first end 135a1 lies at an end of the ridge between the top surface 135c and the side surface 135e. The second end 135a2 lies at an end of the ridge between the top surface 135c and the side surface 135f.

An arbitrary cross section of the main pole 135 that passes through an arbitrary point on the front end face 135a and is perpendicular to the medium facing surface 12a and to the track width direction TW has a length in the direction perpendicular to the medium facing surface 12a. The length of the aforementioned arbitrary cross section is constant regardless of where the arbitrary point on the front end face 135a is located.

Figure 36:
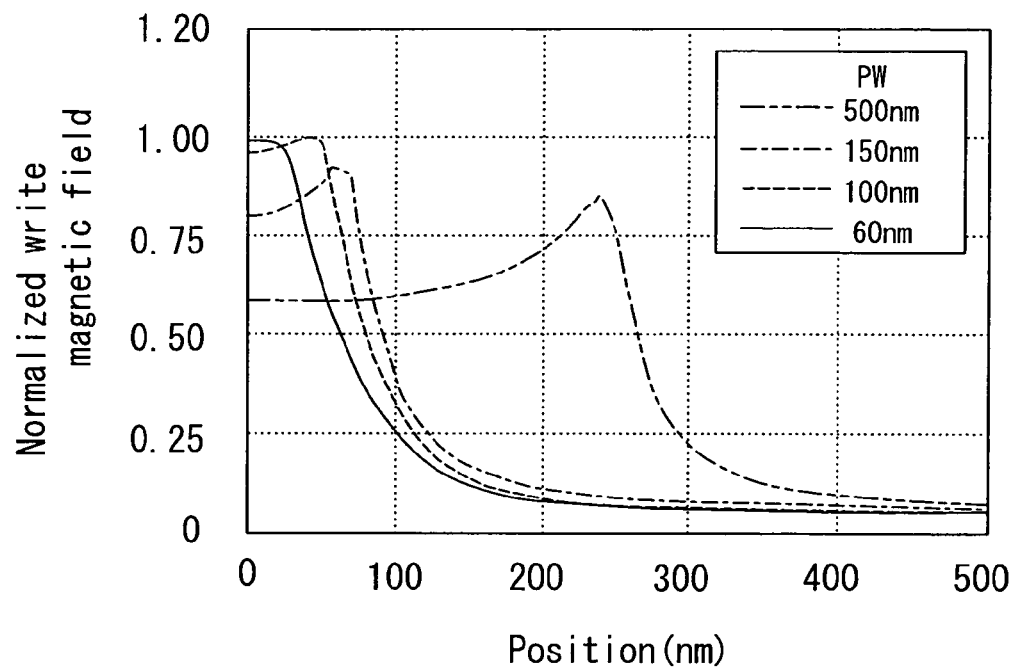
FIG. 36 is a characteristic chart showing the relationship between a position along the track width direction in the medium facing surface and a normalized write magnetic field, determined by a first simulation.

Next, the magnetic field generated from the front end face 135a of the main pole 135 of the comparative example will be described. FIG. 36 is a characteristic chart showing the relationship between a position along the track width direction TW in the medium facing surface 12a and a normalized write magnetic field, determined by a first simulation. The normalized write magnetic field in the first simulation is the magnitude of the magnetic field directed from a position along the track width direction TW in the medium facing surface 12a toward the magnetic disk 201 divided by the maximum value of the magnetic field directed toward the magnetic disk 201 obtained by the first simulation. In FIG. 36, the horizontal axis represents the position on a straight line along the track width direction TW passing through the front end face 135a, and the vertical axis represents the normalized write magnetic field. In FIG. 36, the position on the horizontal axis is represented by the distance from the center of the front end face 135a in the track width direction TW. In the first simulation, the magnitude of the magnetic field directed toward the magnetic disk 201 was determined with the length PW of the front end face 135a in the track width direction TW varied among 60 nm, 100 nm, 150 nm, and 500 nm. The length of the aforementioned arbitrary cross section of the main pole 135 of the comparative example was set to 100 nm.

As shown in FIG. 36, when the length PW is 60 nm, the magnetic field generated from the front end face 135a (the normalized write magnetic field) has almost the same magnitude in the vicinity of the center (0 nm) of the front end face 135a in the track width direction TW and in the vicinity of an end of the front end face 135a in the track width direction TW (the vicinity of the first end 135a1 or the second end 135a2). When the length PW is 100 nm or more, the magnetic field generated from the front end face 135a has a greater magnitude in the vicinity of an end of the front end face 135a in the track width direction TW than in the vicinity of the center of the front end face 135a in the track width direction TW. Although not illustrated, when the length PW is less than 60 nm, the magnetic field generated from the front end face 135a has the maximum magnitude in the vicinity of the center of the front end face 135a in the track width direction TW. As can be seen from the results of the first simulation, for the main pole 135 of the comparative example, magnetic fields generated from the vicinities of two ends of the front end face 135a that are opposite in the track width direction TW (the vicinities of the first and second ends 135a1 and 135a2) are enhanced when the length PW is 60 nm or more, and the enhanced magnetic fields may cause adjacent track erasure to occur.

As will be seen from a second simulation to be described later, the present embodiment allows the ratio of the magnitude of the magnetic field generated from the vicinity of the center 35ac of the front end face 35a to the magnitude of the magnetic fields generated from the vicinities of the first and second ends 35a1 and 35a2 to be higher than in the case of a rectangular-solid-shaped main pole like the comparative example. According to the present embodiment, it is thus possible to enhance the magnetic field generated from the vicinity of the center 35ac without causing the enhancement of the magnetic fields generated from the vicinities of the first and second ends 35a1 and 35a2. Consequently, according to the present embodiment, it is possible to enhance the magnetic field generated from the vicinity of the center 35ac of the front end face 35a of the main pole 35 while preventing the occurrence of adjacent track erasure. This effect is significantly high under the conditions under which adjacent track erasure can occur, i.e., when the length PW of the front end face 35a in the track width direction TW is 60 nm or more, as can be seen from the results of the first simulation. Furthermore, the present embodiment makes it possible that, while adjacent track erasure is prevented from occurring, the main pole 35 can be increased in width in the track width direction TW to some extent so that the magnetic flux in the main pole 35 will not be saturated at a small amount.

Figure 37:
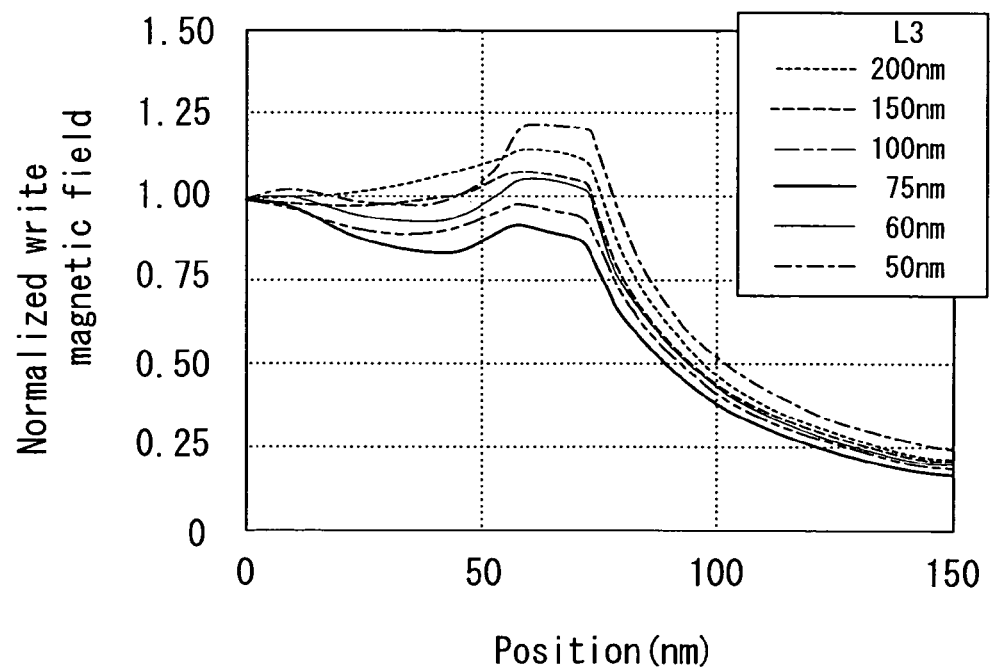
FIG. 37 is a characteristic chart showing the relationship between a position along the track width direction in the medium facing surface and a normalized write magnetic field, determined by a second simulation.

Reference is now made to FIG. 37 to describe the second simulation which was performed to verify the above-described effect of the present embodiment. In the second simulation, the magnitude of the magnetic field directed toward the magnetic disk 201 was determined for the main pole 35 of the present embodiment with the length PW of the front end face 35a in the track width direction TW set to 150 nm, L1 and L2 set to 200 nm, and L3 varied among 50 nm, 60 nm, 75 nm, 100 nm, 150 nm, and 200 nm. Where L3 is 200 nm, L1, L2, and L3 are equal to each other. The main pole 35 in this case is a main pole of a comparative example for the second simulation.

FIG. 37 is a characteristic chart showing the relationship between a position along the track width direction TW in the medium facing surface 12a and a normalized write magnetic field, determined by the second simulation. The normalized write magnetic field in the second simulation is the magnitude of the magnetic field directed from a position along the track width direction TW in the medium facing surface 12a toward the magnetic disk 201 divided by the magnitude of the magnetic field directed from the center 35ac of the front end face 35a toward the magnetic disk 201. In FIG. 37, the horizontal axis represents the position on a straight line along the track width direction TW passing through the front end face 35a, and the vertical axis represents the normalized write magnetic field. In FIG. 37, the position on the horizontal axis is represented by the distance from the center 35ac.

As shown in FIG. 37, when L3 is any of 60 nm, 75 nm, 100 nm, and 150 nm, the normalized write magnetic field in the vicinities of the first and second ends 35a1 and 35a2 is smaller than that when L3 is 200 nm. In other words, when L3 is any of 60 nm, 75 nm, 100 nm, and 150 nm, the ratio of the magnitude of the magnetic field generated from the vicinity of the center 35ac of the front end face 35a to the magnitude of the magnetic fields generated from the vicinities of the first and second ends 35a1 and 35a2 is higher than that when L3 is 200 nm. FIG. 37 also suggests that when L3 is 60 nm or more and less than 200 nm, the ratio of the magnitude of the magnetic field generated from the vicinity of the center 35ac of the front end face 35a to the magnitude of the magnetic fields generated from the vicinities of the first and second ends 35a1 and 35a2 would be higher than that when L3 is 200 nm. Therefore, from the results of the second simulation, it can be said that when L1 and L2 are 200 nm, the effect of the shape of the main pole 35 of the present embodiment can be obtained where L3 is 60 nm or more and less than 200 nm, i.e., where the ratio of L3 to L1 and L2 is 30% or more and less than 100%. Accordingly, the ratio of L3 to L1 and L2 is preferably 30% or more and less than 100%.

FIG. 37 also shows that when L3 is 60 to 150 nm, the normalized write magnetic field in the vicinities of the first and second ends 35a1 and 35a2 is significantly smaller than that when L3 is 200 nm, which shows that the effect of the shape of the main pole 35 of the present embodiment is significantly high. Therefore, the ratio of L3 to L1 and L2 is more preferably 30% or more and no more than 75%.

FIG. 37 also shows that when L3 is 75 to 100 nm, the magnetic field generated from the vicinity of the center 35ac is stronger than the magnetic fields generated from the vicinities of the first and second ends 35a1 and 35a2. In this case, the effect of the shape of the main pole 35 of the present embodiment is even higher. Therefore, the ratio of L3 to L1 and L2 is still more preferably 37.5% or more and no more than 50%.

The other effects provided by the present embodiment will now be described with reference to FIG. 1 and FIG. 9. The plasmon generator 40 of the present embodiment includes the base part 41 and the protruding part 42. Of these parts, it is the protruding part 42 that contributes to the excitation of surface plasmons. Heat is therefore generated at the protruding part 42. More specifically, a greater amount of heat is generated in an area of the protruding part 42 near the flat surface 42b. The base part 41 is contiguous with the protruding part 42 and extends in the Y direction more than the protruding part 42 does. Accordingly, the base part 41 functions as a heat sink for dissipating the heat generated at the protruding part 42 outward from the plasmon generator 40. This allows the plasmon generator 40 to be prevented from increasing in temperature.

In the present embodiment, the main pole 35 located near the protruding part 42 also functions as a heat sink for dissipating the heat generated at the protruding part 42 outward from the plasmon generator 40. This also allows the plasmon generator 40 to be prevented from increasing in temperature.

In the present embodiment, the front end face 35a of the main pole 35 includes the bottom end 35g that is closest to the end face of the return yoke layer 28 located in the medium facing surface 12a. The magnetic field generated from the front end face 35a tends to be strong at the bottom end 35g. It is therefore preferable to allow the positions of the center of the near-field light generating part 42g of the plasmon generator 40 and the bottom end 35g to be aligned with each other in the track width direction TW.

The method of forming the plasmon generator 40 and the main pole 35 of the present embodiment, which has been described with reference of FIG. 11 to FIG. 34, allows the positions of the center of the near-field light generating part 42g of the plasmon generator 40 and the bottom end 35g to be easily aligned with each other in the track width direction TW. More specifically, in the present embodiment, the series of steps shown in FIG. 12 to FIG. 15 forms the protruding part 42 of the plasmon generator 40 and forms the top surface of the stack having undergone the formation of the dielectric layer 441 into a curved surface concaved downward (in the −Z direction) such that the flat surface 42b of the protruding part 42 is closest to the element-forming surface 11c. After that, the main pole 35 is formed over the top surface of this stack with the dielectric layer 442 interposed therebetween. The main pole 35 is formed such that the bottom end 35g is automatically located immediately above the center of the near-field light generating part 42g in the track width direction TW. The position of the bottom end 35g does not vary even if the position of the plating film 352 is displaced in the track width direction TW depending on the accuracy of the photolithography performed to form the photoresist mask 73. The present embodiment thus allows the positions of the center of the near-field light generating part 42g of the plasmon generator 40 and the bottom end 35g to be easily aligned with each other in the track width direction TW.

Modification Example

Figure 38:
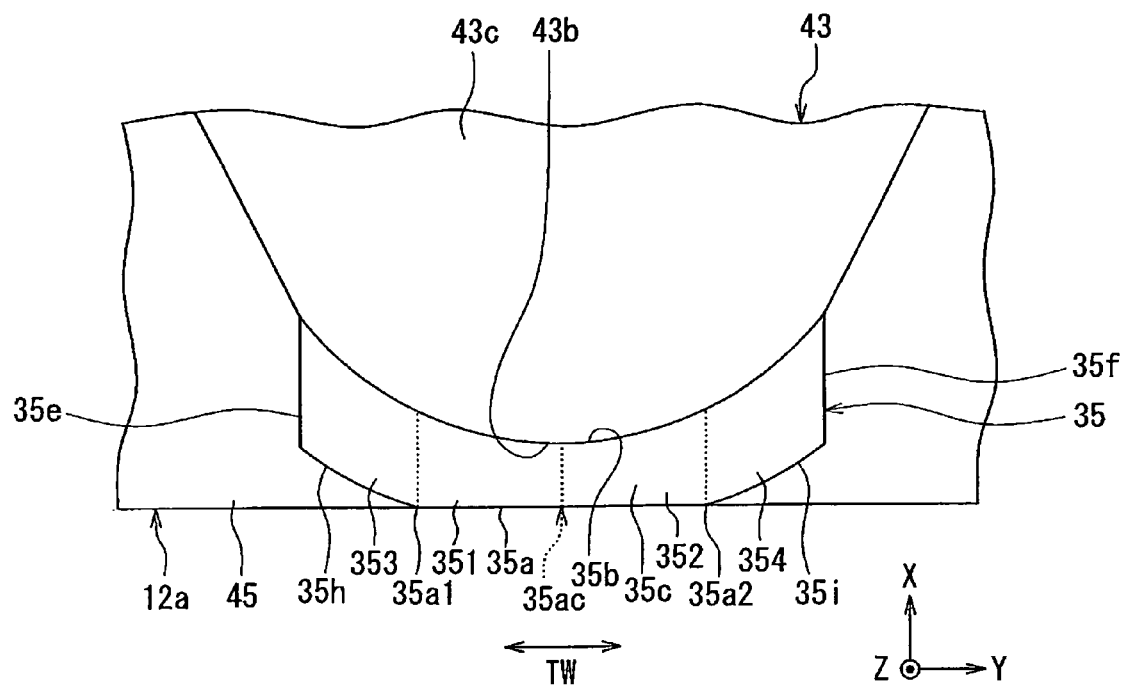
FIG. 38 is a plan view showing the top surface of a main pole of a modification example of the first embodiment of the invention and the top surface of the core of the wave guide.

Reference is now made to FIG. 38 to describe a main pole 35 of a modification example of the present embodiment. FIG. 38 is a plan view showing the top surface of the main pole 35 of the modification example and the top surface of the core 43 of the waveguide of the present embodiment. Like the main pole 35 shown in FIG. 1 and FIG. 3, the main pole 35 of the modification example has a front end face 35a, a rear end face 35b, a top surface 35c, a bottom surface 35d, and side surfaces 35e and 35f. In addition to these surfaces 35a to 35f, the main pole 35 of the modification example has two end faces 35h and 35i located on opposite sides of the front end face 35a in the track width direction TW.

The end face 35h connects the front end face 35a and the side surface 35e to each other. The distance between an arbitrary point on the end face 35h and the medium facing surface 12a increases with increasing distance between the front end face 35a and the arbitrary point on the end face 35h. The end face 35i connects the front end face 35a and the side surface 35f to each other. The distance between an arbitrary point on the end face 35i and the medium facing surface 12a increases with increasing distance between the front end face 35a and the arbitrary point on the end face 35i.

The main pole 35 includes, in addition to the two portions 351 and 352 located on opposite sides of the center 35ac of the front end face 35a in the track width direction TW, a portion 353 that is adjacent to the portion 351 and located farther from the center 35ac of the front end face 35a than is the portion 351, and a portion 354 that is adjacent to the portion 352 and located farther from the center 35ac of the front end face 35a than is the portion 352. The length of the portion 353 in the direction perpendicular to the medium facing surface 12a may vary depending on the distance from the portion 351 or may be constant regardless of the distance from the portion 351. Likewise, the length of the portion 354 in the direction perpendicular to the medium facing surface 12a may vary depending on the distance from the portion 352 or may be constant regardless of the distance from the portion 352.

As described previously, the main pole 35 functions as a heat sink for dissipating the heat generated at the protruding part 42 of the plasmon generator 40 outward from the plasmon generator 40. When the main pole 35 of the modification example and the main pole 35 shown in FIG. 1 and FIG. 3 are compared under the conditions under which the front end faces 35a are equal in length in the track width direction TW, the main pole 35 of the modification example can be greater in volume. The main pole 35 of the modification example is therefore capable of performing the function as a heat sink more effectively.

Second Embodiment

Figure 39:
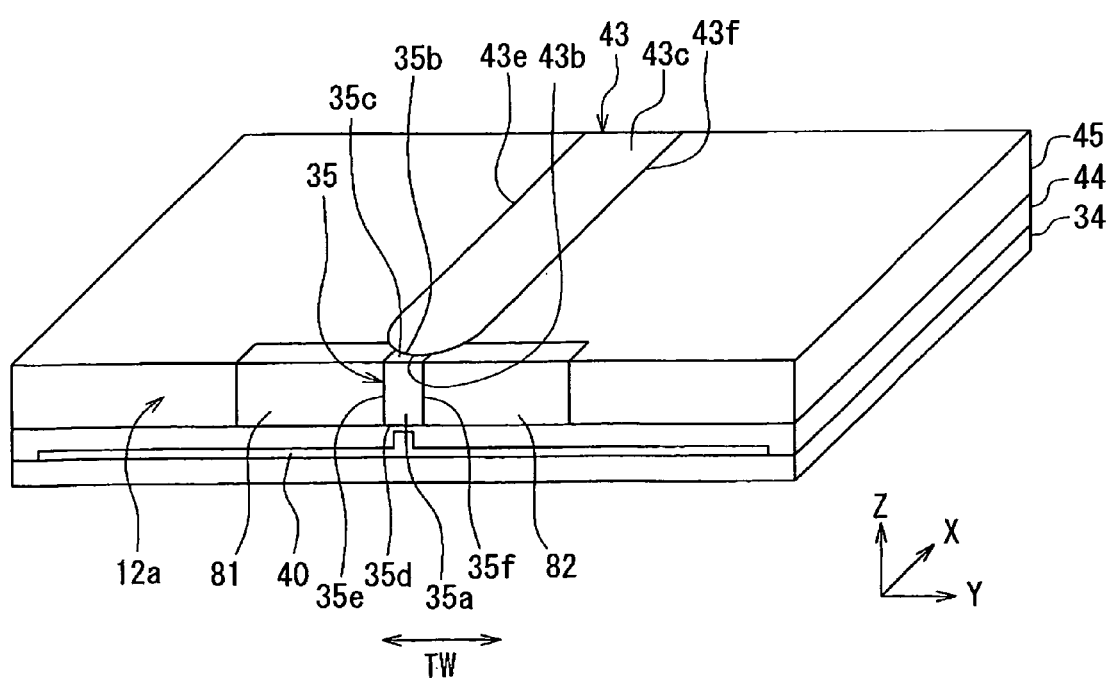
FIG. 39 is a perspective view showing the main part of a thermally-assisted magnetic recording head according to a second embodiment of the invention.
Figure 40:
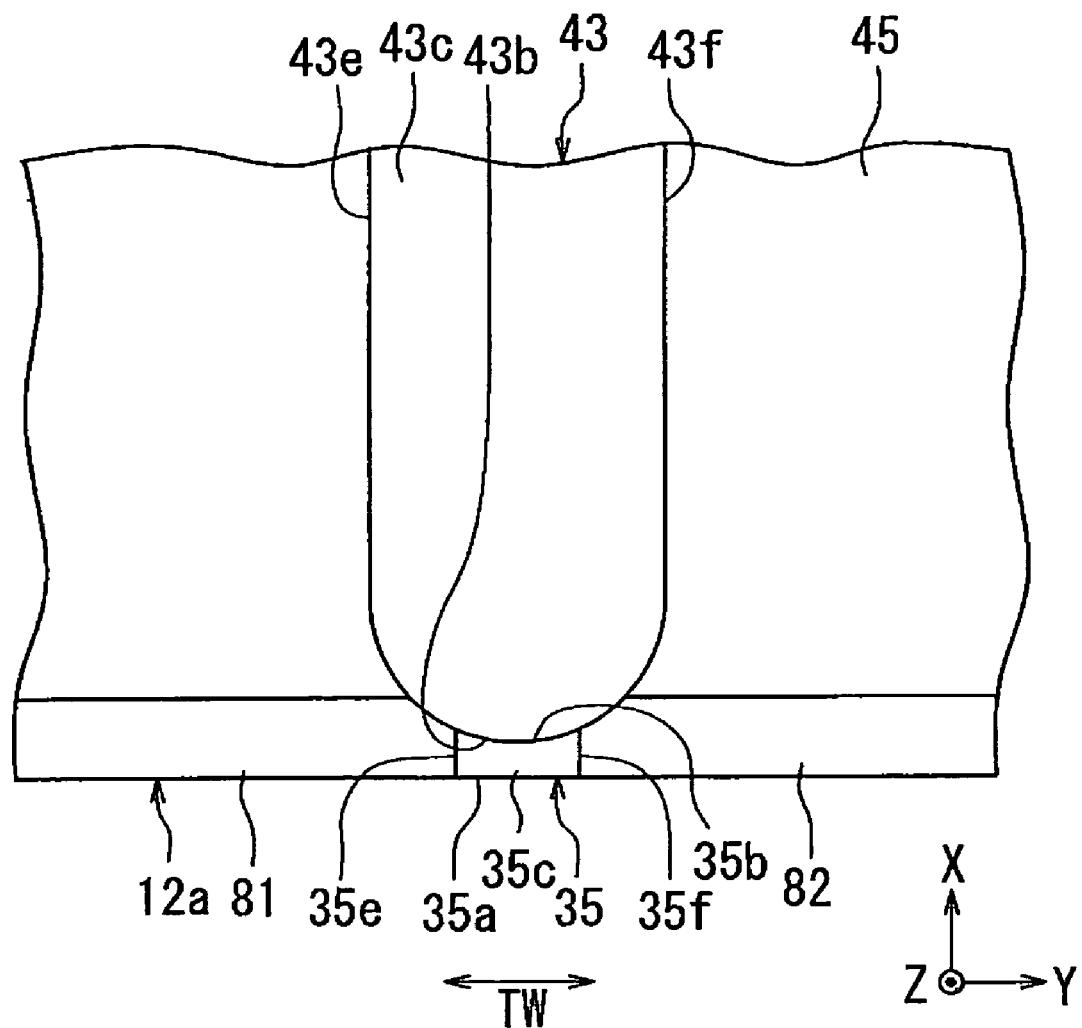
FIG. 40 is a plan view showing the top surfaces of a main pole, a core of a waveguide, and heat sinks of the second embodiment of the invention.

A second embodiment of the present invention will now be described with reference to FIG. 39 and FIG. 40. FIG. 39 is a perspective view showing the main part of the thermally-assisted magnetic recording head according to the present embodiment. FIG. 40 is a plan view showing the top surfaces of the main pole, the core of the waveguide, and heat sinks of the present embodiment.

The thermally-assisted magnetic recording head 1 according to the present embodiment has two heat sinks 81 and 82 disposed on opposite sides of the main pole 35 in the track width direction TW. The heat sink 81 has a front end face located in the medium facing surface, a rear end face opposite to the front end face, and a side surface in contact with the side surface 35e of the main pole 35. The heat sink 82 has a front end face located in the medium facing surface, a rear end face opposite to the front end face, and a side surface in contact with the side surface 35f of the main pole 35. In the example shown in FIG. 39 and FIG. 40, the heat sinks 81 and 82 are both generally rectangular-solid-shaped. In this example, the heat sinks 81 and 82 are also in contact with the end face 43b of the core 43.

Like the base part 41 of the plasmon generator 40, the main pole 35 and the heat sinks 81 and 82 function as heat sinks for dissipating the heat generated at the protruding part 42 of the plasmon generator 40 outward from the plasmon generator 40. The heat sinks 81 and 82 are made of a conductive material such as a metal. For example, the heat sinks 81 and 82 may be made of one element selected from the group consisting of Au, Ag, Cu, and Al, or of an alloy composed of two or more of these elements.

In the present embodiment, the top surface of the cladding layer 44 is a flat surface parallel to the element-forming surface 11c of the first embodiment shown in FIG. 9. The shape of the bottom surface 35d of the main pole 35 and the shape of the evanescent light generating surface 43d (not shown) of the core 43 are defined by the top surface of the cladding layer 44. Each of the bottom surface 35d and the evanescent light generating surface 43d is a flat surface parallel to the element-forming surface 11c. The two side surfaces 35e and 35f of the main pole 35 are perpendicular to the element-forming surface 11c and the medium facing surface 12a. The reminder of configuration of the thermally-assisted magnetic recording head 1 according to the present embodiment is the same as that of the first embodiment.

According to the present embodiment, it is possible to dissipate the heat generated at the protruding part 42 of the plasmon generator 40 outward from the plasmon generator 40 more effectively than in the case where the two heat sinks 81 and 82 are not provided.

Reference is now made to FIG. 41 to FIG. 59 to describe the process for forming the main pole 35 and the core 43 and the process for forming the heat sinks 81 and 82 in the present embodiment. FIG. 41 to FIG. 59 are perspective views each showing part of a stack of layers formed in the process of manufacturing the thermally-assisted magnetic recording head 1.

Figure 41:
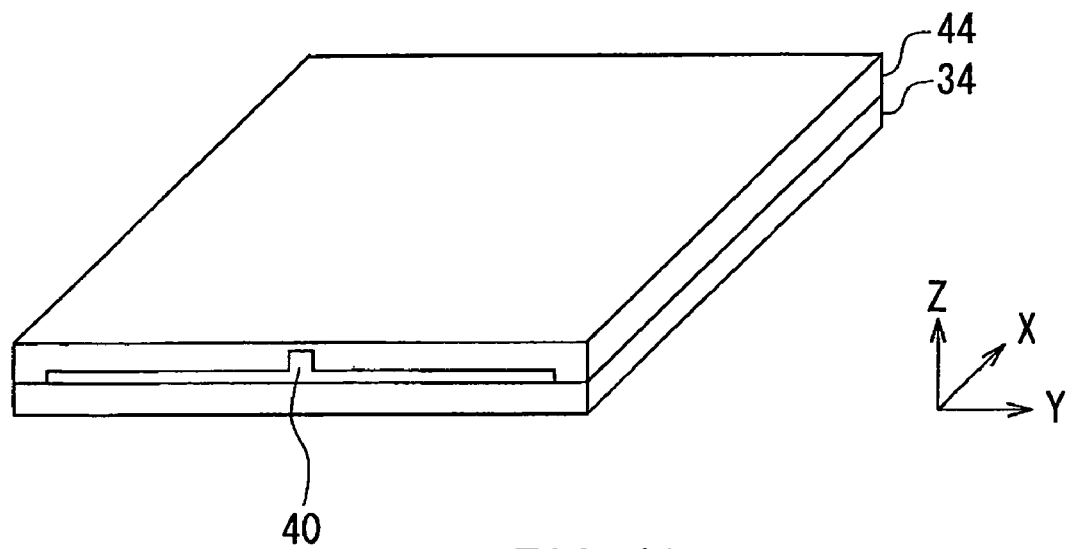
FIG. 41 is a perspective view showing a step of a method of manufacturing the thermally-assisted magnetic recording head according to the second embodiment of the invention.

The process for forming the plasmon generator 40 in the present embodiment is the same as the process shown in FIG. 11 to FIG. 13 in the first embodiment. FIG. 41 shows a step that follows the step of FIG. 13 of the first embodiment. In this step, first, the mask 71 shown in FIG. 13 of the first embodiment is removed. The cladding layer 44 is then formed to have a top surface parallel to the element-forming surface 11c.

Figure 42:
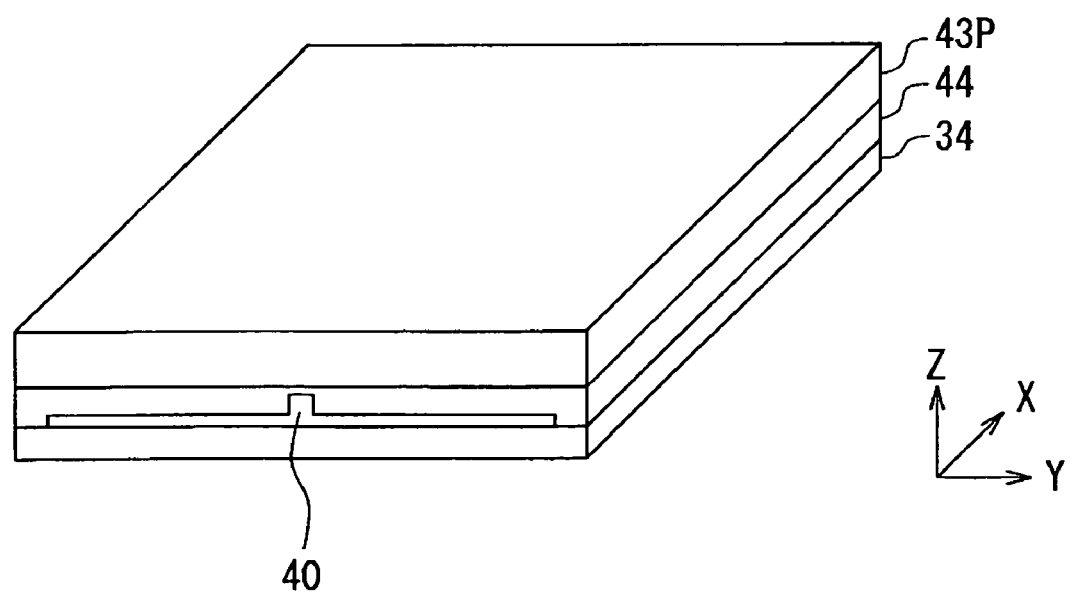
FIG. 42 is a perspective view showing a step that follows the step shown in FIG. 41.

FIG. 42 shows the next step. In this step, as in the step of FIG. 18 and FIG. 19 of the first embodiment, a dielectric layer 43P is formed over the entire top surface of the stack shown in FIG. 41. The dielectric layer 43P is to be subjected to etching and polishing later to become the core 43. The bottom surface of the dielectric layer 43P is a flat surface parallel to the element-forming surface 11c.

Figure 43:
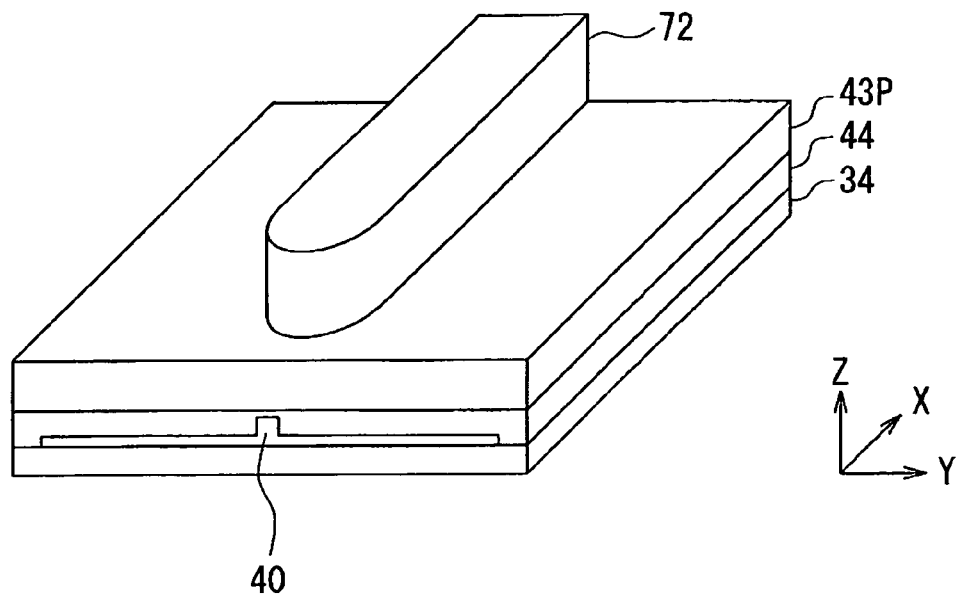
FIG. 43 is a perspective view showing a step that follows the step shown in FIG. 42.

FIG. 43 shows the next step. In this step, as in the step of FIG. 20 of the first embodiment, a photoresist mask 72 is formed on the dielectric layer 43P.

Figure 44:
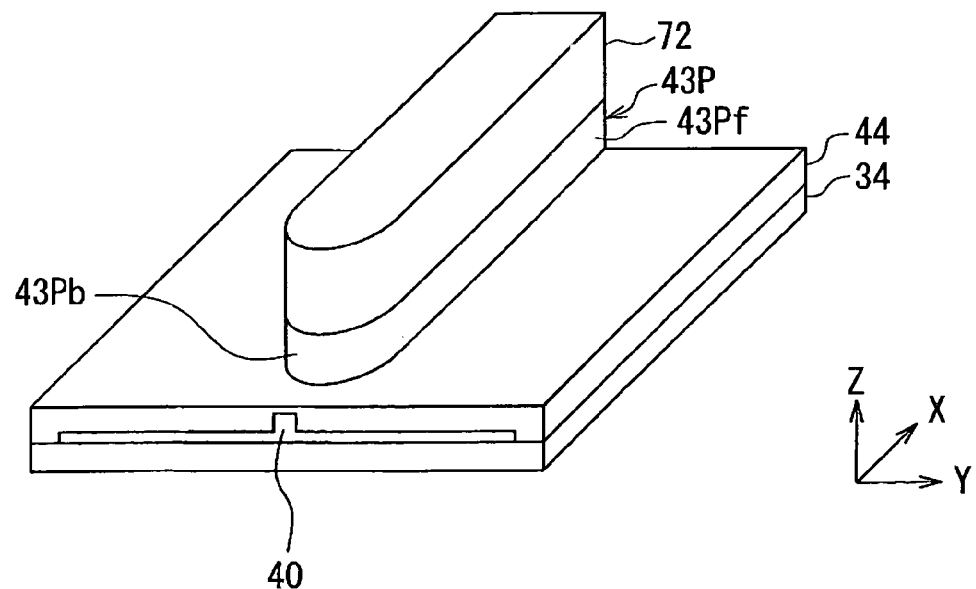
FIG. 44 is a perspective view showing a step that follows the step shown in FIG. 43.
Figure 45:
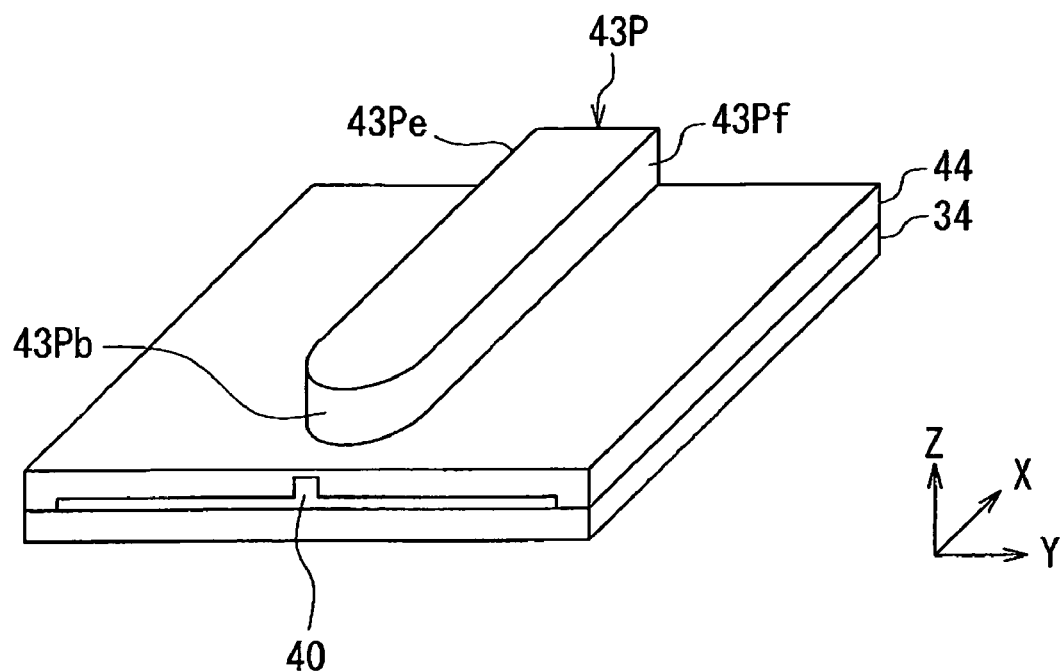
FIG. 45 is a perspective view showing a step that follows the step shown in FIG. 44.

FIG. 44 shows the next step. In this step, the dielectric layer 43P except the portion thereof lying under the photoresist mask 72 is removed by, for example, RIE, using the photoresist mask 72. The photoresist mask 72 is then removed as shown in FIG. 45. The etching process shown in FIG. 44 provides the dielectric layer 43P with an end face 43Pb and side surfaces 43Pe and 43Pf.

Figure 46:
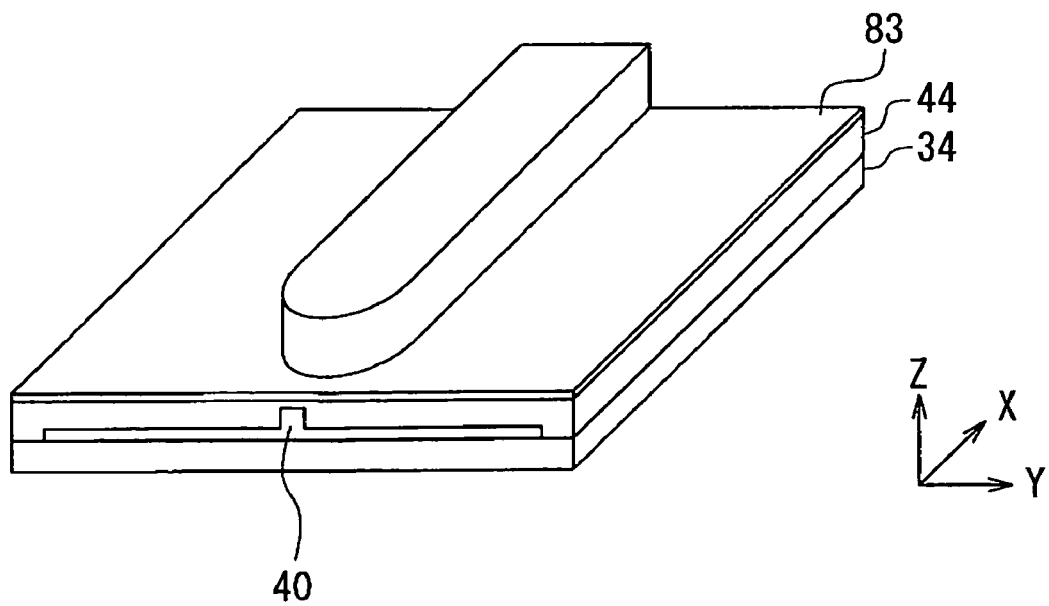
FIG. 46 is a perspective view showing a step that follows the step shown in FIG. 45.

FIG. 46 shows the next step. In this step, an electrode film 83 is formed over the entire top surface of the stack shown in FIG. 45 by sputtering, for example. The electrode film 83 is to be etched later to become portions of the heat sinks 81 and 82.

Figure 47:
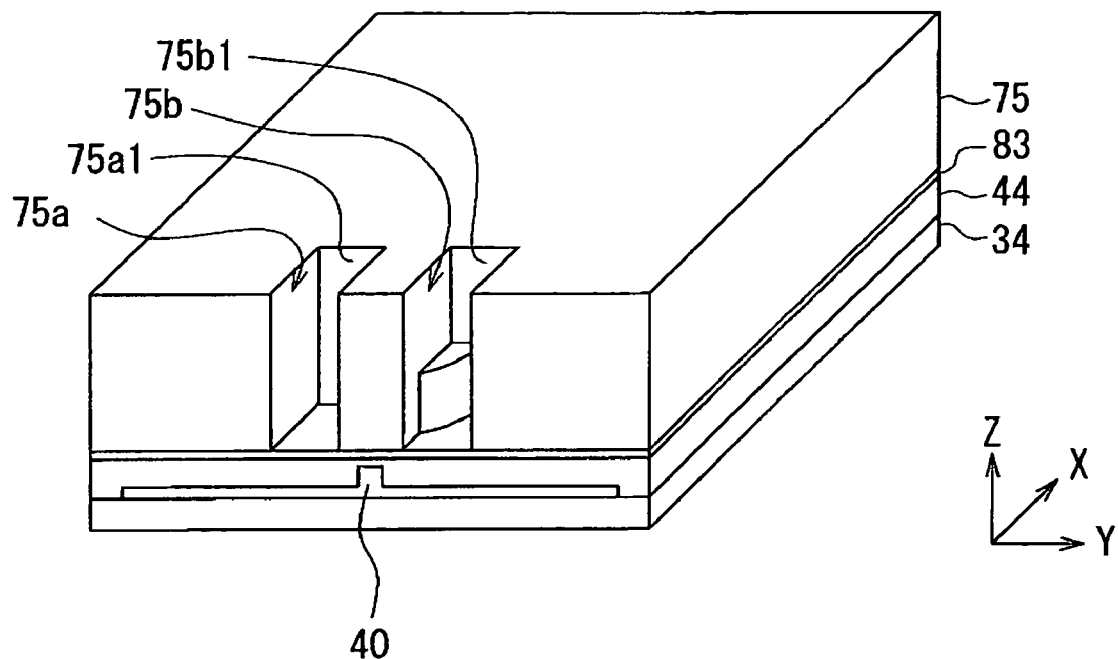
FIG. 47 is a perspective view showing a step that follows the step shown in FIG. 46.

FIG. 47 shows the next step. In this step, a photoresist mask 75 is formed on the electrode film 83. The photoresist mask 75 has an opening 75a having a shape corresponding to the planar shape of the heat sink 81 to be formed later and an opening 75b having a shape corresponding to the planar shape of the heat sink 82 to be formed later. The photoresist mask 75 is formed by patterning a photoresist layer by photolithography.

The opening 75a has a wall face 75a1 facing toward the expected position of the medium facing surface, and two wall faces perpendicular to the wall face 75a1 and the element-forming surface 11c. The opening 75b has a wall face 75b1 facing toward the expected position of the medium facing surface, and two wall faces perpendicular to the wall face 75b1 and the element-forming surface 11c. The wall faces 75a1 and 75b1 are located farther from the expected position of the medium facing surface than is a position where the rear end face 35b of the main pole 35 is to be formed later.

Figure 48:
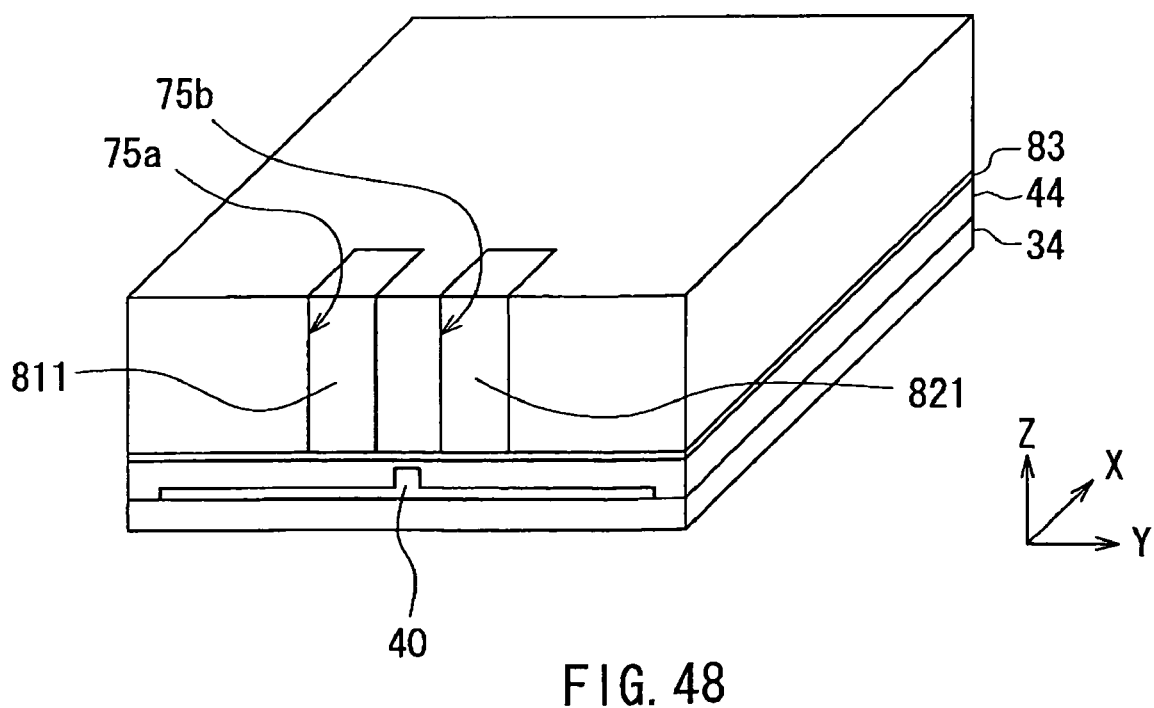
FIG. 48 is a perspective view showing a step that follows the step shown in FIG. 47.
Figure 49:
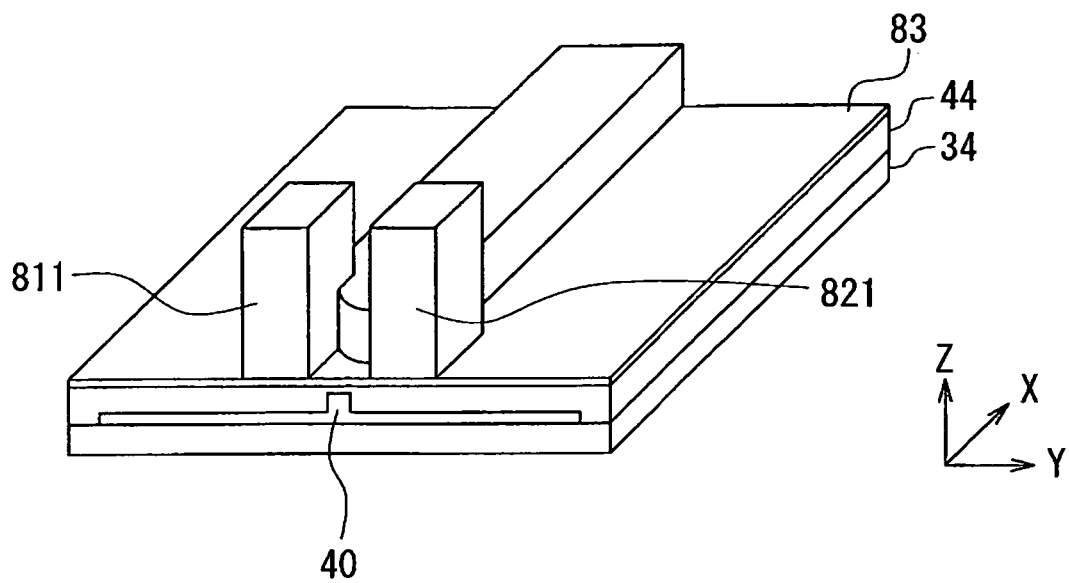
FIG. 49 is a perspective view showing a step that follows the step shown in FIG. 48.

FIG. 48 shows the next step. In this step, plating is performed using the electrode film 83 as the electrode to form a plating film 811 in the opening 75a of the photoresist mask 75 and to form a plating film 821 in the opening 75b. The plating films 811 and 821 are formed such that portions thereof are located on the portion of the electrode film 83 lying on the dielectric layer 43P. The plating film 811 is to be polished later to become another portion of the heat sink 81. The plating film 821 is to be polished later to become another portion of the heat sink 82. Next, the photoresist mask 75 is removed as shown in FIG. 49.

Figure 50:
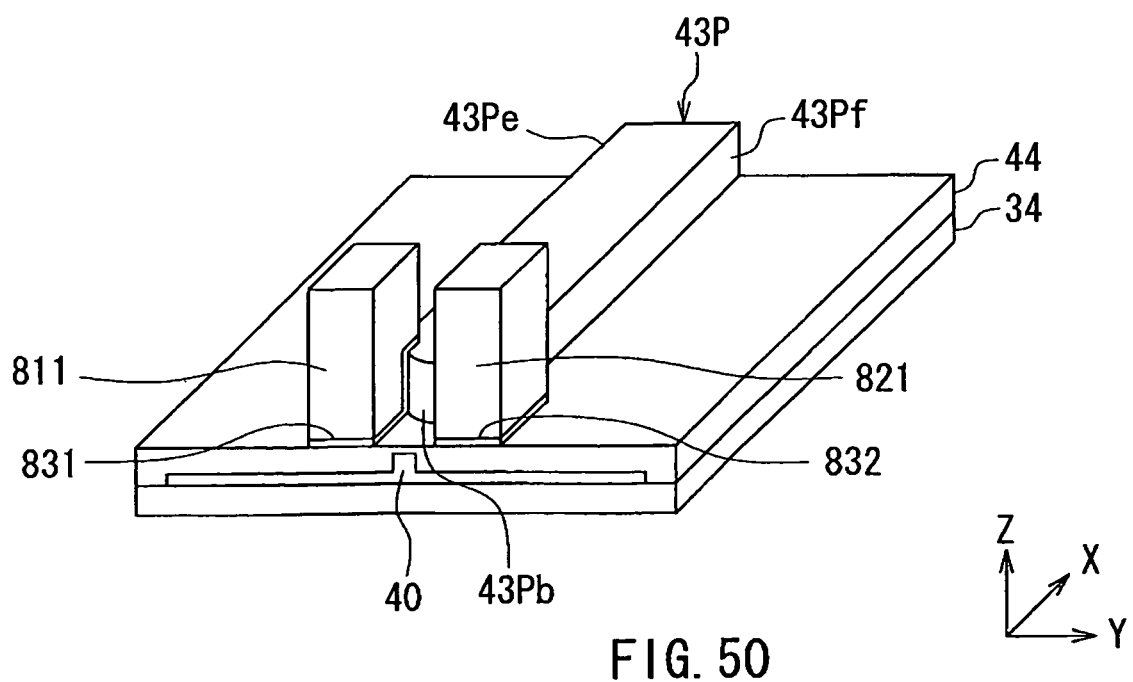
FIG. 50 is a perspective view showing a step that follows the step shown in FIG. 49.

FIG. 50 shows the next step. In this step, the electrode film 83 except the portions thereof lying under the plating films 811 and 821 is removed by ion milling, for example. The electrode film 83 is thereby divided into an electrode film 831 lying under the plating film 811 and an electrode film 832 lying under the plating film 821.

Figure 51:
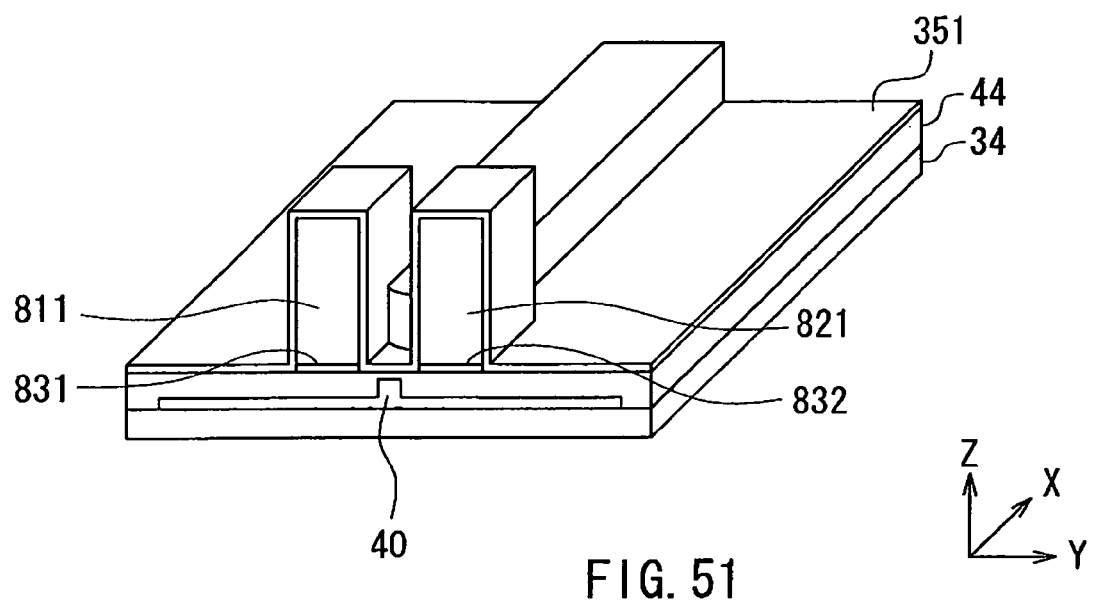
FIG. 51 is a perspective view showing a step that follows the step shown in FIG. 50.

FIG. 51 shows the next step. In this step, an electrode film 351 is formed over the entire top surface of the stack shown in FIG. 50 by sputtering, for example The electrode film 351 includes a portion that is to be etched later to become a portion of the main pole 35. This portion of the electrode film 351 is formed along the top surface of the cladding layer 44, the side surfaces of the plating films 811 and 821, the side surfaces of the electrode films 831 and 832, and the end face 43Pb of the dielectric layer 43P. The electrode film 351 further includes: a pre-bottom-surface portion that includes a portion to become the bottom surface 35d of the main pole 35; a pre-rear-end-face portion that includes a portion to become the rear end face 35b of the main pole 35; a first pre-side-surface portion that includes a portion to become the side surface 35e of the main pole 35; and a second pre-side-surface portion that includes a portion to become the side surface 35f of the main pole 35. The pre-bottom-surface portion is a flat surface parallel to the element-forming surface 11c. The shape of the first pre-side-surface portion is defined by the side surface of the plating film 811. The shape of the second pre-side-surface portion is defined by the side surface of the plating film 821.

Figure 52:
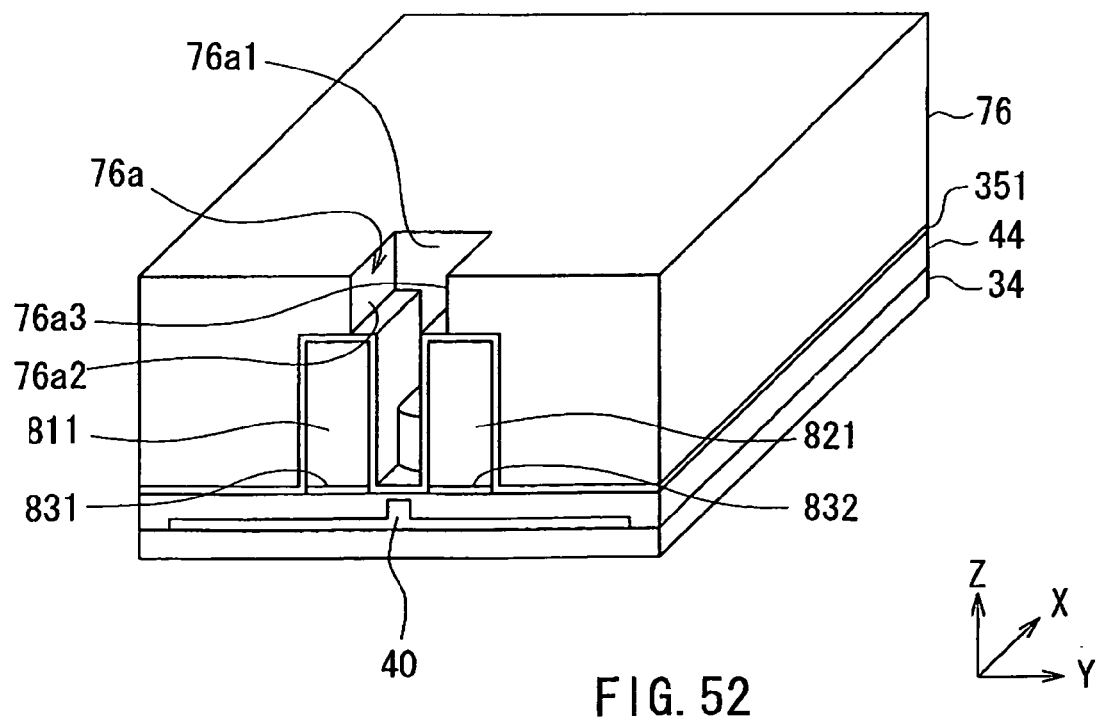
FIG. 52 is a perspective view showing a step that follows the step shown in FIG. 51.

FIG. 52 shows the next step. In this step, a photoresist mask 76 having an opening 76a is formed on the electrode film 351. The opening 76a includes a region where the main pole 35 is to be disposed later. The photoresist mask 76 is formed by patterning a photoresist layer by photolithography. The photoresist mask 76 is formed such that its top surface is at a level higher than the top surfaces of the portions of the electrode film 351 lying on the plating films 811 and 821.

The opening 76a has a wall face 76a1 facing toward the expected position of the medium facing surface, and two wall faces 76a2 and 76a3 perpendicular to the wall face 76a1 and the element-forming surface 11c. The wall face 76a1 is located farther from the expected position of the medium facing surface than is the position where the rear end face 35b of the main pole 35 is to be formed later. The wall faces 76a2 and 76a3 are located outside of the positions at which the side surfaces 35e and 35f of the main pole 35 are to be formed later in the direction parallel to the Y direction.

Figure 53:
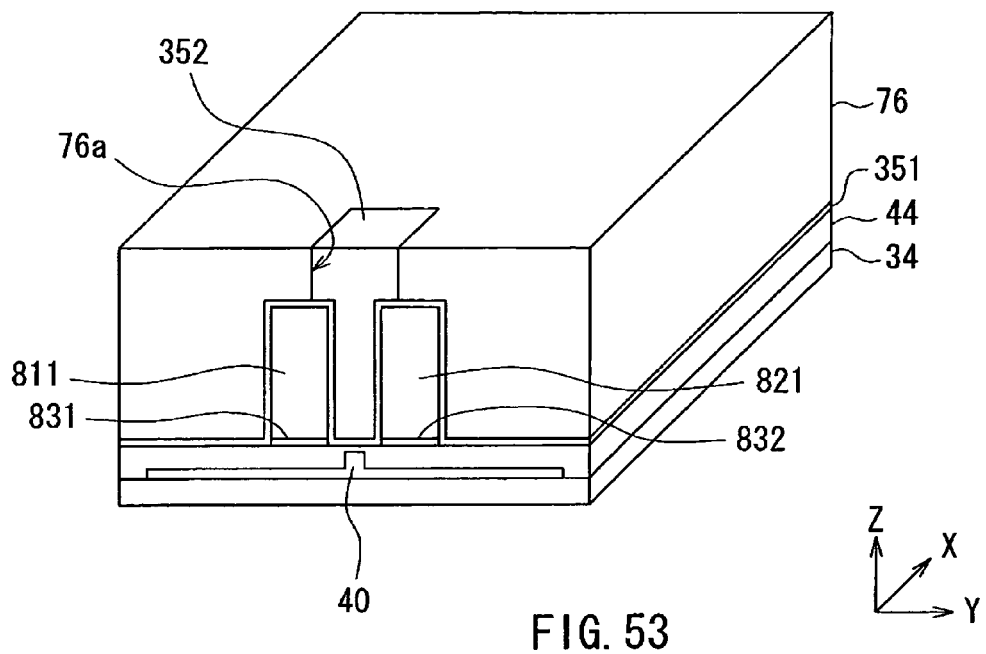
FIG. 53 is a perspective view showing a step that follows the step shown in FIG. 52.
Figure 54:
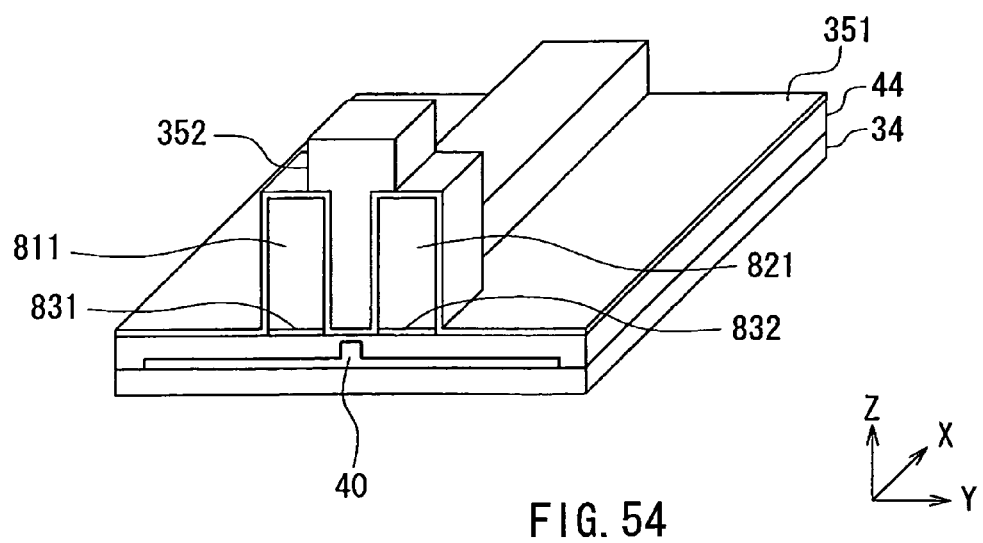
FIG. 54 is a perspective view showing a step that follows the step shown in FIG. 53.

FIG. 53 shows the next step. In this step, a plating film 352 is formed in the opening 76a of the photoresist mask 76 by plating using the electrode film 351 as the electrode. The plating film 352 is formed such that a portion of the plating film 352 is located on the portion of the electrode film 351 lying on the dielectric layer 43P and other portions of the plating film 352 are located on the portions of the electrode film 351 lying on the plating films 811 and 821. The plating film 352 is to be polished later to become another portion of the main pole 35. Next, the photoresist mask 76 is removed as shown in FIG. 54.

Figure 55:
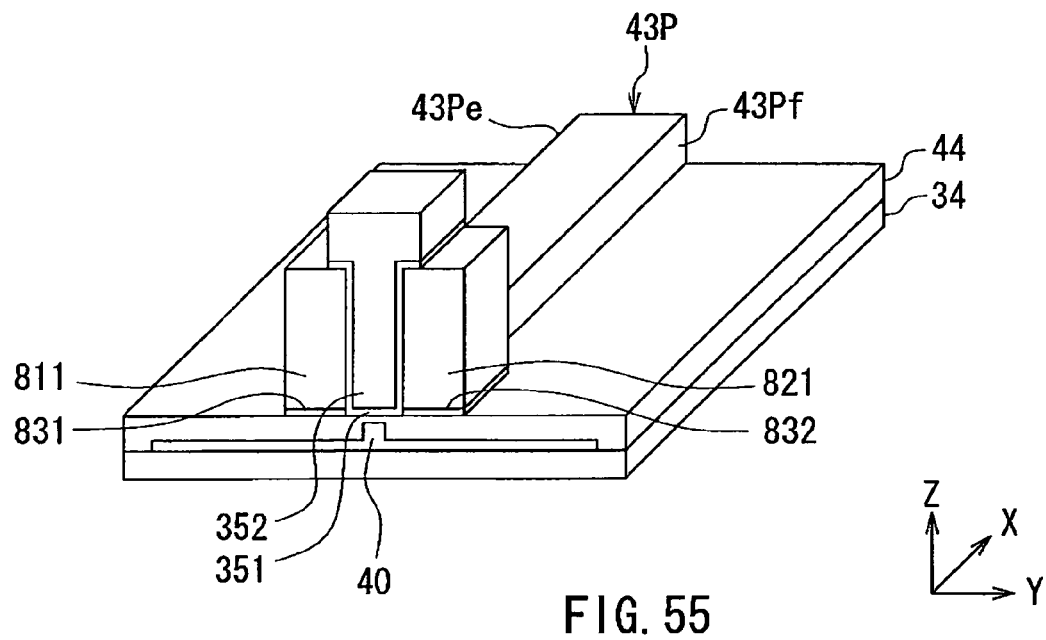
FIG. 55 is a perspective view showing a step that follows the step shown in FIG. 54.

FIG. 55 shows the next step. In this step, the electrode film 351 except the portion thereof lying under the plating film 352 is removed by ion milling, for example.

Figure 56:
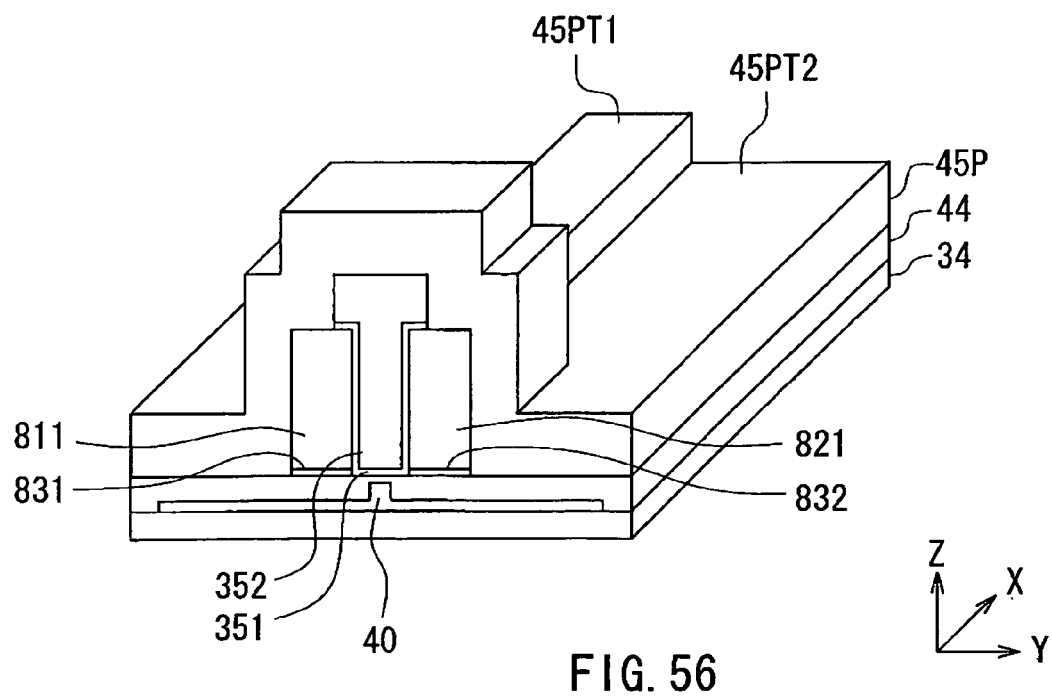
FIG. 56 is a perspective view showing a step that follows the step shown in FIG. 55.

FIG. 56 shows the next step. In this step, as in the step of FIG. 31 of the first embodiment, a dielectric layer 45P is formed over the entire top surface of the stack shown in FIG. 55 by sputtering, for example. In the present embodiment, the convex portion 45PT1 of the top surface of the dielectric layer 45P is the portion located above the dielectric layer 43P and the plating films 352, 811, and 821. The peripheral portions 45PT2 of the top surface of the dielectric layer 45P are the portions located around the dielectric layer 43P and the plating films 352, 811, and 821 and lower than the convex portion 45PT1.

Figure 57:
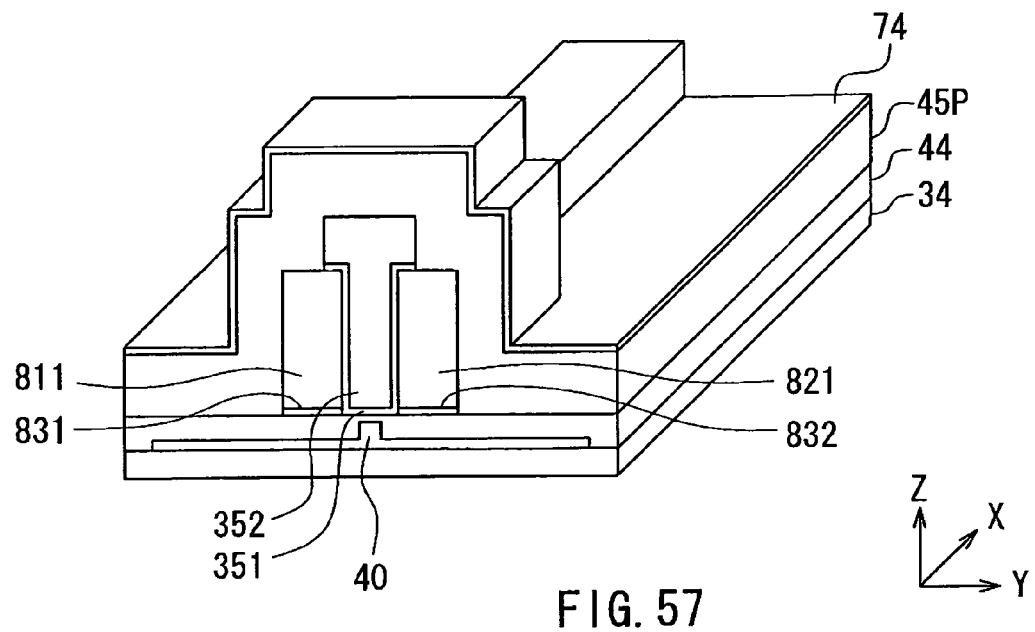
FIG. 57 is a perspective view showing a step that follows the step shown in FIG. 56.

FIG. 57 shows the next step. In this step, as in the step of FIG. 32 of the first embodiment, a stopper film 74 is formed on the dielectric layer 45P by sputtering, for example.

Figure 58:
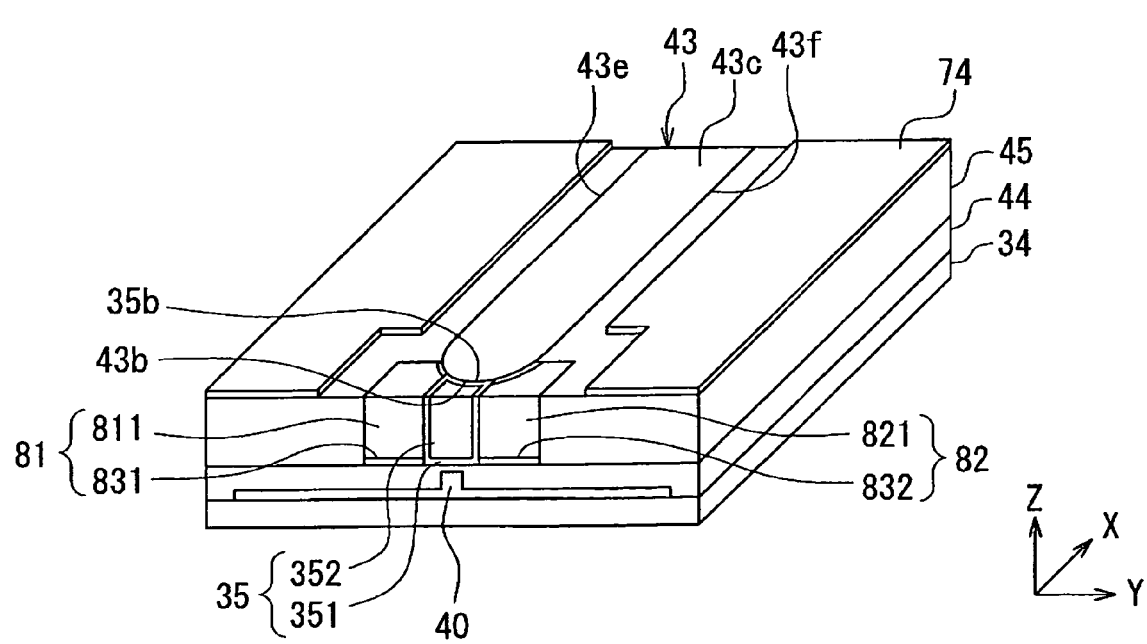
FIG. 58 is a perspective view showing a step that follows the step shown in FIG. 57.
Figure 59:
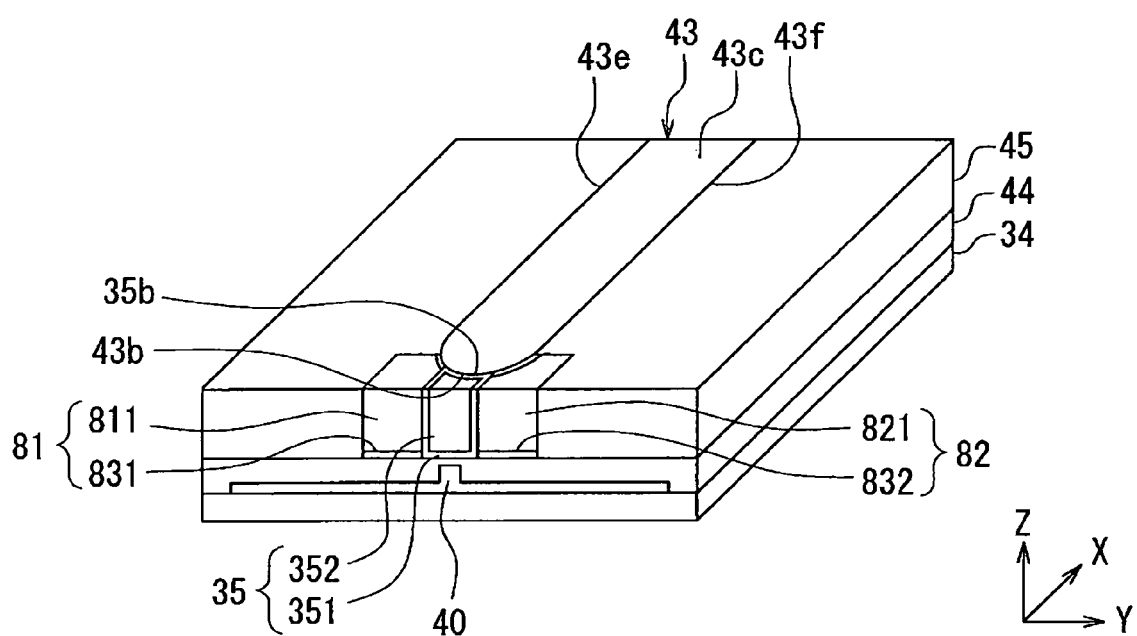
FIG. 59 is a perspective view showing a step that follows the step shown in FIG. 58.

FIG. 58 shows the next step. In this step, as in the step of FIG. 33 of the first embodiment, the plating films 352, 811 and 821 and the dielectric layers 43P and 45P are polished by, for example, CMP, until the portions of the stopper film 74 lying over the peripheral portions 45TP2 of the top surface of the dielectric layer 45P are exposed. This polishing process completes the main pole 35, the core 43, the cladding layer 45, and the heat sinks 81 and 82. The heat sink 81 is composed of the electrode film 831 and the plating film 811. The heat sink 82 is composed of the electrode film 832 and the plating film 821. Next, as shown in FIG. 59, the stopper film 74 is removed by etching.

Modification Examples

Figure 60:
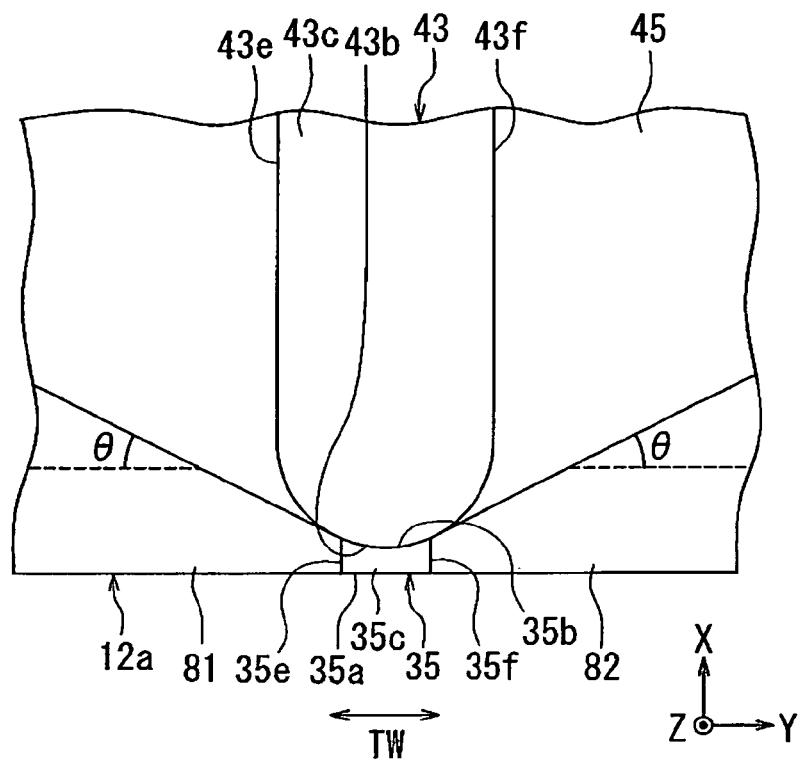
FIG. 60 is a plan view showing the top surfaces of heat sinks of a first modification example of the second embodiment of the invention and the top surfaces of the main pole and the core of the wave guide.
Figure 61:
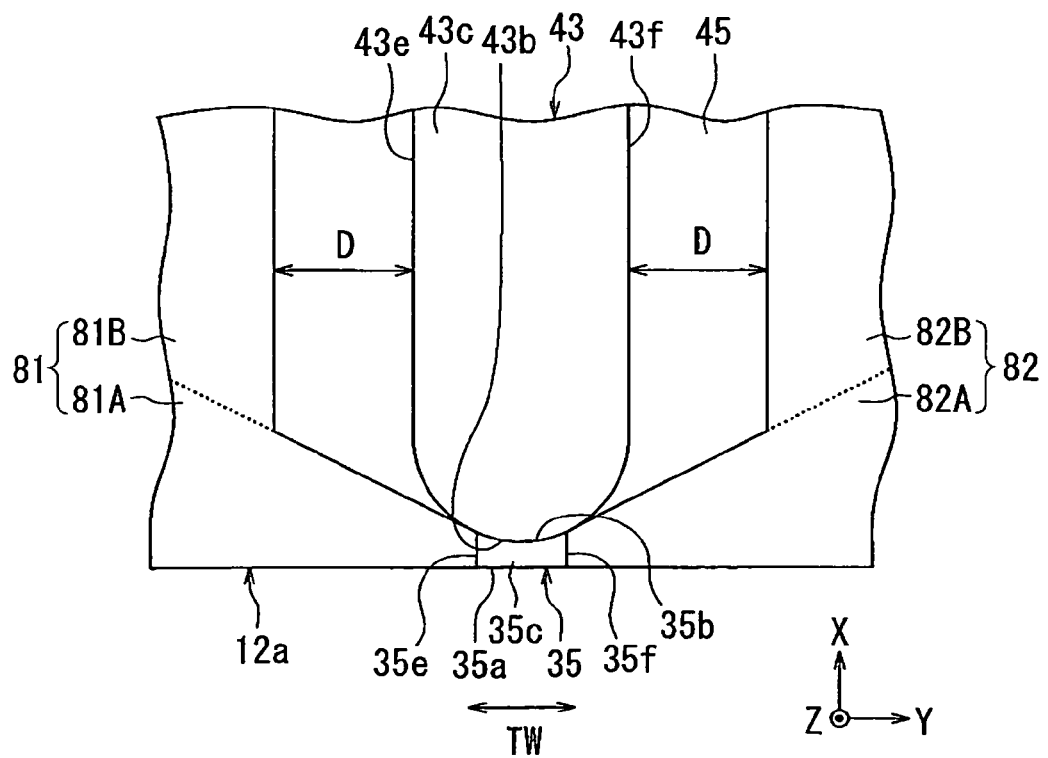
FIG. 61 is a plan view showing the top surfaces of heat sinks of a second modification example of the second embodiment of the invention and the top surfaces of the main pole and the core of the waveguide.

Reference is now made to FIG. 60 and FIG. 61 to describe heat sinks of first and second modification examples of the present embodiment. FIG. 60 is a plan view showing the top surfaces of the heat sinks of the first modification example and the top surfaces of the main pole and the core of the waveguide. FIG. 61 is a plan view showing the top surfaces of the heat sinks of the second modification example and the top surfaces of the main pole and the core of the waveguide.

In the first modification example, the rear end face of the heat sink 81 is inclined with respect to a virtual plane parallel to the medium facing surface 12a. The distance between the medium facing surface 12a and an arbitrary point on the rear end face of the heat sink 81 increases with increasing distance between the main pole 35 and the arbitrary point on the rear end face of the heat sink 81. Likewise, the rear end face of the heat sink 82 is inclined with respect to a virtual plane parallel to the medium facing surface 12a. The distance between the medium facing surface 12a and an arbitrary point on the rear end face of the heat sink 82 increases with increasing distance between the main pole 35 and the arbitrary point on the rear end face of the heat sink 82. Here, as shown in FIG. 60, the angle that each of the rear end faces of the heat sinks 81 and 82 forms with respect to the virtual plane parallel to the medium facing surface 12a will be represented by the symbol $\theta$. The angle $\theta$ is preferably 60 degrees or smaller so that the laser light propagating through the core 43 will not be affected by the heat sinks 81 and 82.

In the second modification example, the heat sink 81 includes a first portion 81A having the same shape as that of the heat sink 81 of the first modification example, and a second portion 81B connected to the first portion 81A and extending in the X direction. The heat sink 82 includes a first portion 82A having the same shape as that of the heat sink 82 of the first modification example, and a second portion 82B connected to the first portion 82A and extending in the X direction. In FIG. 61, the boundary between the first portion 81A and the second portion 81B and the boundary between the first portion 82A and the second portion 82B are shown by respective dotted lines.

The second portion 81B is located at a predetermined distance D from the side surface 43e of the core 43. Likewise, the second portion 82B is located at the predetermined distance D from the side surface 43f of the core 43. The distance D is preferably 0.3 µm or greater so that the laser light propagating through the core 43 will not be affected by the heat sinks 81 and 82.

The first and second modification examples allow the heat sinks 81 and 82 to be greater in volume, thus allowing the heat sinks 81 and 82 to function more effectively.

The remainder of configuration, function and effects of the present embodiment are similar to those of the first embodiment.

The present invention is not limited to the foregoing embodiments, and various modifications may be made thereto. For example, in the foregoing embodiments, the rear end face 35b of the main pole 35 is formed of a curved surface concaved toward the medium facing surface 12a; however, in the present invention, the rear end face 35b may be formed of a combination of a curved surface and a flat surface or a combination of a plurality of flat surfaces.

In the foregoing embodiments, the main pole 35 and the core 43 are disposed above the plasmon generator 40; however, in the present invention, the main pole 35 and the core 43 may be disposed below the plasmon generator 40. In this case, the protruding part 42 of the plasmon generator 40 protrudes downward from the central portion of the base part 41 including the center of the base part 41 in the track width direction TW.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
a medium facing surface that faces a magnetic recording medium;
a main pole that has a front end face located in the medium facing surface and produces a write magnetic field for writing data on the magnetic recording medium;
a waveguide including a core and a cladding, the core allowing light to propagate therethrough; and
a plasmon generator having a near-field light generating part located in the medium facing surface, the plasmon generator being configured so that a surface plasmon is excited on the plasmon generator based on the light propagating through the core and the near-field light generating part generates near-field light based on the surface plasmon, wherein:
the plasmon generator and the core are disposed to align in a direction of travel of the magnetic recording medium;
the core has an end face that faces toward the medium facing surface and that is located away from the medium facing surface;
the main pole is interposed between the end face of the core and the medium facing surface;
the front end face includes a first end and a second end that are opposite to each other in a track width direction which is a direction parallel to the medium facing surface and perpendicular to the direction of travel of the magnetic recording medium;
in a region sandwiched between a first virtual plane passing through the first end and perpendicular to the medium facing surface and to the track width direction and a second virtual plane passing through the second end and perpendicular to the medium facing surface and to the track width direction, an arbitrary cross section of the main pole that passes through an arbitrary point on the front end face and is perpendicular to the medium facing surface and to the track width direction has a length in a direction perpendicular to the medium facing surface; and
a third length is smaller than a first length and a second length and is a minimum of the length of the arbitrary cross section obtained with the arbitrary point varied, where the first length is the length of the arbitrary cross section when the arbitrary point is located at the first end, the second length is the length of the arbitrary cross section when the arbitrary point is located at the second end, and the third length is the length of the arbitrary cross section when the arbitrary point is located at a center of the front end face in the track width direction.

2. The thermally-assisted magnetic recording head according to claim 1, wherein the main pole includes two portions located on opposite sides of the center of the front end face in the track width direction, and in the two portions, the length of the arbitrary cross section increases with increasing distance between the arbitrary point and the center of the front end face in the track width direction.

3. The thermally-assisted magnetic recording head according to claim 2, wherein the two portions are in contact with each other at the center of the front end face in the track width direction, and the length of the arbitrary cross section increases as the arbitrary point shifts toward the first end from the center of the front end face in the track width direction, and increases as the arbitrary point shifts toward the second end from the center of the front end face in the track width direction.

4. The thermally-assisted magnetic recording head according to claim 1, wherein the main pole and the plasmon generator are disposed such that a virtual straight line passing through the center of the front end face in the track width direction and parallel to the direction of travel of the magnetic recording medium passes through the near-field light generating part.

5. The thermally-assisted magnetic recording head according to claim 1, wherein:
in the region sandwiched between the first virtual plane and the second virtual plane, a distance between the medium facing surface and an arbitrary point on the end face of the core varies as the arbitrary point on the end face of the core shifts along the track width direction; and
the main pole further has a rear end face opposite to the front end face, the rear end face having a shape defined by the end face of the core.

6. The thermally-assisted magnetic recording head according to claim 1, wherein the front end face has a length of 60 nm or more in the track width direction.

7. The thermally-assisted magnetic recording head according to claim 1, wherein the first length and the second length are equal, and the third length is 30% or more and less than 100% of the first and second lengths.

8. The thermally-assisted magnetic recording head according to claim 1, wherein the first length and the second length are equal, and the third length is 30% or more and no more than 75% of the first and second lengths.

9. The thermally-assisted magnetic recording head according to claim 1, wherein the first length and the second length are equal, and the third length is 37.5% or more and no more than 50% of the first and second lengths.

10. A head gimbal assembly comprising the thermally-assisted magnetic recording head according to claim 1, and a suspension that supports the thermally-assisted magnetic recording head.

11. A magnetic recording device comprising: a magnetic recording medium; the thermally-assisted magnetic recording head according to claim 1; and a positioning device that supports the thermally-assisted magnetic recording head and positions the thermally-assisted magnetic recording head with respect to the magnetic recording medium.

* * * * *